United States Patent
Kawakami et al.

(10) Patent No.: US 6,661,470 B1
(45) Date of Patent: Dec. 9, 2003

(54) MOVING PICTURE DISPLAY METHOD AND APPARATUS

(75) Inventors: Hidehiko Kawakami, Machida (JP); Hideaki Kawamura, Kyoto (JP); Kazuo Tomida, Fuchu (JP); Yoshio Watanabe, Yokohama (JP); Hiroaki Fukushima, Uji (JP); Masaki Tokoi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/381,637
(22) PCT Filed: Mar. 25, 1998
(86) PCT No.: PCT/JP98/01335
§ 371 (c)(1),
(2), (4) Date: Sep. 27, 1999
(87) PCT Pub. No.: WO98/44479
PCT Pub. Date: Oct. 8, 1998

(30) Foreign Application Priority Data

Mar. 31, 1997 (JP) .............................. 9-096419
Dec. 17, 1997 (JP) .............................. 9-364054
Feb. 17, 1998 (JP) .......................... 10-034490
Mar. 6, 1998 (JP) .......................... 10-055275

(51) Int. Cl.$^7$ ................................. H04N 5/14
(52) U.S. Cl. ................. 348/699; 348/443; 348/701; 345/474
(58) Field of Search ................... 345/63, 474; 348/443, 348/699

(56) References Cited

U.S. PATENT DOCUMENTS 4,691,230 A * 9/1987 Kaneko et al. ............. 348/699
5,784,114 A * 7/1998 Borer et al. ................ 348/443
5,907,316 A * 5/1999 Mikoshiba et al. ......... 345/474
6,144,364 A * 11/2000 Otobe et al. ................. 345/63

FOREIGN PATENT DOCUMENTS

| JP | 7-271325 | 10/1995 |
| JP | 8-123355 | 5/1996 |
| JP | 8-211848 | 8/1996 |
| JP | 8-234694 | 9/1996 |
| JP | 8-298665 | 11/1996 |
| JP | 9-102921 | 4/1997 |
| JP | 9-138666 | 5/1997 |
| JP | 9-274467 | 10/1997 |

OTHER PUBLICATIONS

English language abstract of JP 9–138666.
English language abstract of JP 9–102921.
English language abstract of JP 9–274467.
English language abstract of JP 8–298665.
English language abstract of JP 8–211848.
English language abstract of JP 8–123355.
English language abstract of JP 8–234694.
English language abstract of JP 7–271325.
"Review on Reduction of PDP Moving Picture False Contour", published at p. 66 of the C–408, 1996 issue of The Institute of Electronics, Information and Communication Engineers, Electronics.

* cited by examiner

Primary Examiner—Steven Saras
Assistant Examiner—Uchendu O. Anyaso
(74) Attorney, Agent, or Firm—Greenblum & Bernstein, P.L.C.

(57) ABSTRACT

A method for displaying a moving picture having a proper tone by changing a combination of subfields constituting a field of the moving picture, the subfields each having a different weight of luminance, a motion vector indicating a moved direction of the image and a moved quantity thereof is detected from image data, new image data for providing a tone equivalent to a tone to be received by a retina to the retina when the image moves is generated corresponding to the detected motion vector, and the combination of subfields is determined based on the generated new image data.

38 Claims, 55 Drawing Sheets

FIG. 8

| BLOCK NUMBER | OFFSET VALUE FROM ORIGINAL POINT | | NUMBER OF MOTION PIXELS | |
|---|---|---|---|---|
| | x | y | x | y |
| 1 | 0 | 0 | 1 | 0 |
| 2 | 16 | 0 | 2 | 0 |
| 3 | 32 | 0 | 0 | 1 |
| 4 | 48 | 0 | 0 | 2 |
| ... | ... | ... | ... | ... |
| 40 | 464 | 0 | 2 | −5 |
| ... | ... | ... | ... | ... |
| 1200 | 624 | 464 | −3 | 0 |

FIG. 9

| NUMBER OF MOTION PIXELS | SIGNAL CHANGE LEVEL | CORRECTION AMOUNT | | | | |
|---|---|---|---|---|---|---|
| | | PIXEL X0 | PIXEL X1 | PIXEL X2 | ..... | PIXEL Xn |
| 1 | 127 → 128 | | | | | |
| | 63 → 64 | | | | | |
| | 31 → 32 | | | | | |
| 2 | 127 → 128 | | | | | |
| | 63 → 64 | | | | | |
| | 31 → 32 | | | | | |
| 3 | | | | | | |
| n | | | | | | |

FIRST QUADRANT

FIG. 10

| NUMBER OF MOTION PIXELS | | SIGNAL CHANGE LEVEL | | CORRECTION DATA a0 AT POSITION OF y0 | CORRECTION DATA a1 AT POSITION OF y0+1 | CORRECTION DATA a2 AT POSITION OF y0+2 | ..... | CORRECTION DATA an AT POSITION OF y0+n |
|---|---|---|---|---|---|---|---|---|
| x | y | y0 | y0+1 | | | | | |
| 0 | 1 | 127 63 31 | 128 64 32 | | | | | |
| 0 | 2 | 127 63 31 | 128 64 32 | | | | | |
| | | | | | | | | |
| 0 | n | 127 63 31 | 128 64 32 | | | | | |
| 0 | 1 | 128 64 32 | 127 63 31 | | | | | |
| 0 | 2 | 128 64 32 | 127 63 31 | | | | | |
| | | | | | | | | |
| 0 | n | 128 64 32 | 127 63 31 | | | | | |
| 0 | −1 | 128 64 32 | 127 63 31 | | | | | |
| 0 | −2 | 127 63 31 | 128 64 32 | | | | | |
| | | | | | | | | |
| 0 | −n | 128 64 32 | 127 63 31 | | | | | |
| 0 | −1 | 128 64 32 | 127 63 31 | | | | | |
| 0 | −2 | 127 63 31 | 128 64 32 | | | | | |
| | | | | | | | | |
| 0 | −n | 128 64 32 | 127 63 31 | | | | | |

FIG. 11

| NUMBER OF MOTION PIXELS | | SIGNAL CHANGE LEVEL | | CORRECTION DATA a0 AT POSITION OF x0 | CORRECTION DATA a1 AT POSITION OF x0+1 | CORRECTION DATA a2 AT POSITION OF x0+2 | ..... | CORRECTION DATA an AT POSITION OF x0+n |
|---|---|---|---|---|---|---|---|---|
| x | y | x0 | x0 + | | | | | |
| 0 | 1 | 127 63 31 | 128 64 32 | | | | | |
| 0 | 2 | 127 63 31 | 128 64 32 | | | | | |
| | | | | | | | | |
| 0 | n | 127 63 31 | 128 64 32 | | | | | |
| 0 | 1 | 128 64 32 | 127 63 31 | | | | | |
| 0 | 2 | 128 64 32 | 127 63 31 | | | | | |
| | | | | | | | | |
| 0 | n | 128 64 32 | 127 63 31 | | | | | |
| 0 | −1 | 128 64 32 | 127 63 31 | | | | | |
| 0 | −2 | 127 63 31 | 128 64 32 | | | | | |
| | | | | | | | | |
| 0 | −n | 128 64 32 | 127 63 31 | | | | | |
| 0 | −1 | 128 64 32 | 127 63 31 | | | | | |
| 0 | −2 | 127 63 31 | 128 64 32 | | | | | |
| | | | | | | | | |
| 0 | −n | 128 64 32 | 127 63 31 | | | | | |

FIG. 18
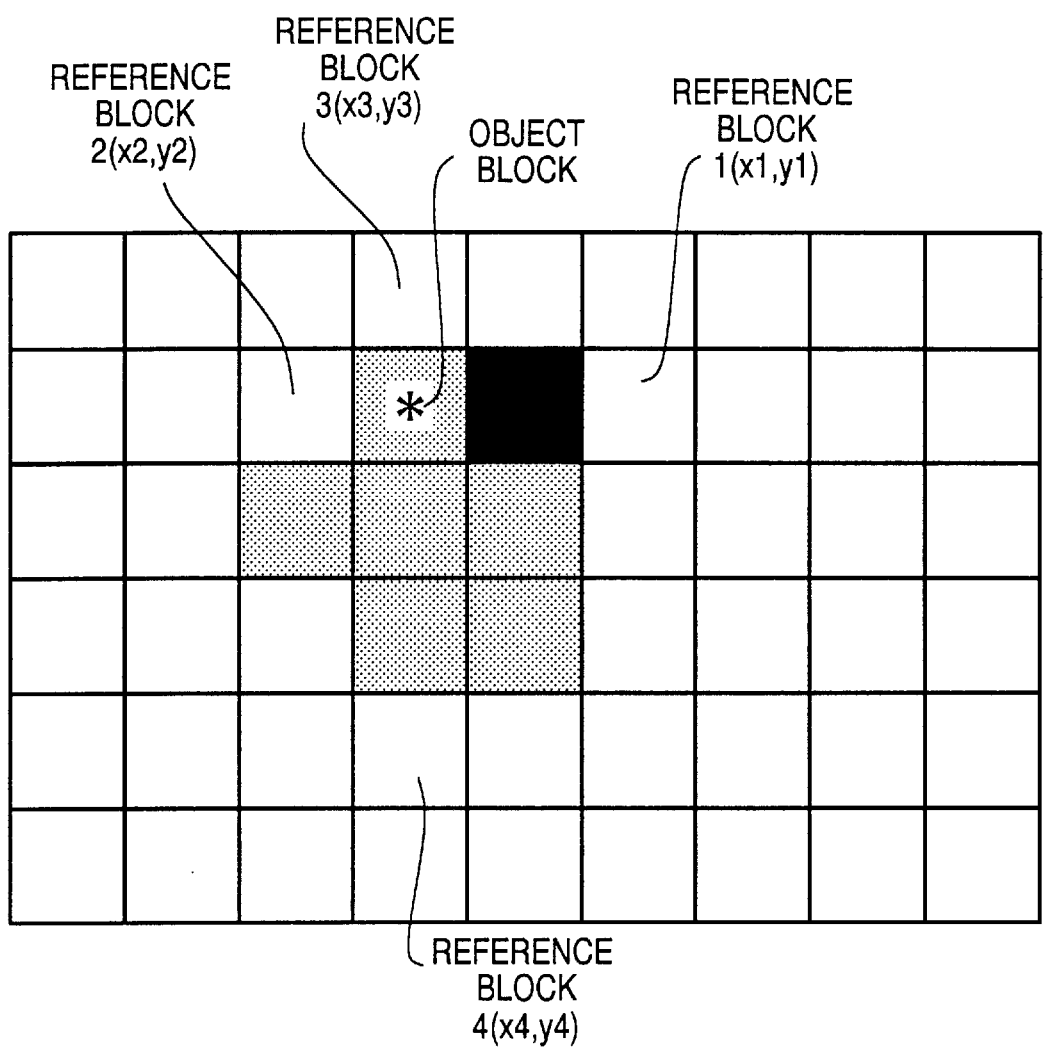
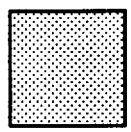 =UNDEFINED BLOCK (FLAG=1)
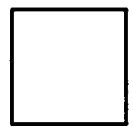 =KNOWN BLOCK (FLAG=−1)
 =BLOCK WITH VALUE OF "0" (FLAG=0)
∗ =OBJECT BLOCK

FIG. 26

| THRESHOLD GROUP(A) | | THRESHOLD GROUP(B) | |
|---|---|---|---|
| THRESHOLD VALUE | IDENTICTION CODE(3 BITS) | THRESHOLD VALUE | IDENTICTION CODE(3 BITS) |
| (1) WHEN PIXEL VALUE IS a1<Y<a2 | 1 | (9) WHEN PIXEL VALUE IS h1<Y<h2 | 1 |
| (2) WHEN PIXEL VALUE IS b1<Y<b2 | 2 | (10) WHEN PIXEL VALUE IS j1<Y<j2 | 2 |
| (3) WHEN PIXEL VALUE IS c1<Y<c2 | 3 | (11) WHEN PIXEL VALUE IS k1<Y<k2 | 3 |
| (4) WHEN PIXEL VALUE IS d1<Y<d2 | 4 | (12) WHEN PIXEL VALUE IS m1<Y<m2 | 4 |
| (5) WHEN PIXEL VALUE IS e1<Y<e2 | 5 | (13) WHEN PIXEL VALUE IS n1<Y<n2 | 5 |
| (6) WHEN PIXEL VALUE IS f1<Y<f2 | 6 | (14) WHEN PIXEL VALUE IS p1<Y<p2 | 6 |
| (7) WHEN PIXEL VALUE IS g1<Y<g2 | 7 | (15) WHEN PIXEL VALUE IS q1<Y<q2 | 7 |
| (8) WHEN PIXEL VALUE IS OUT OF THRESHOLD RANGE | 0 | (16) WHEN PIXEL VALUE IS OUT OF THRESHOLD RANGE | 0 |

FIG. 35
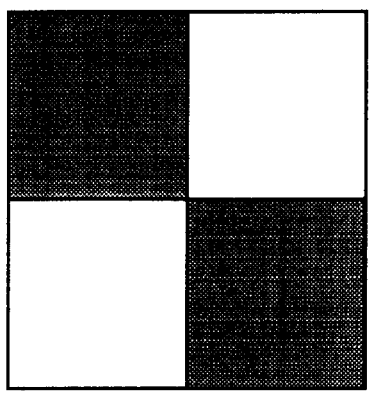
(a)
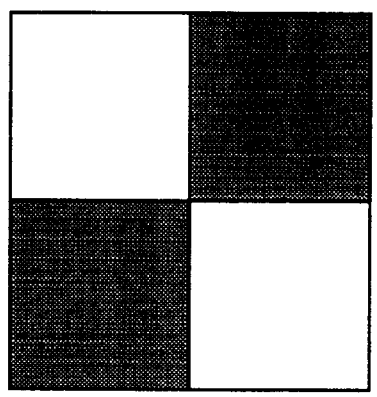
(b)
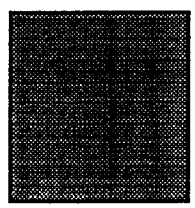
:A CHARACTERISTIC
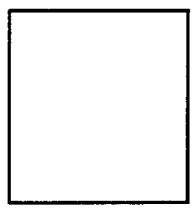
:B CHARACTERISTIC

FIG. 44
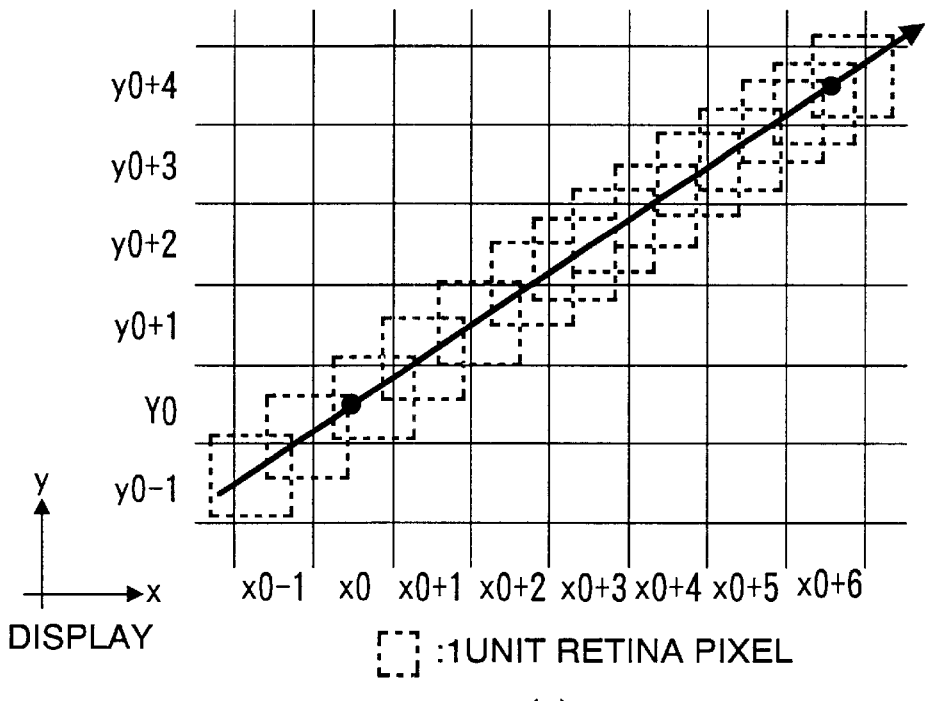
(a)
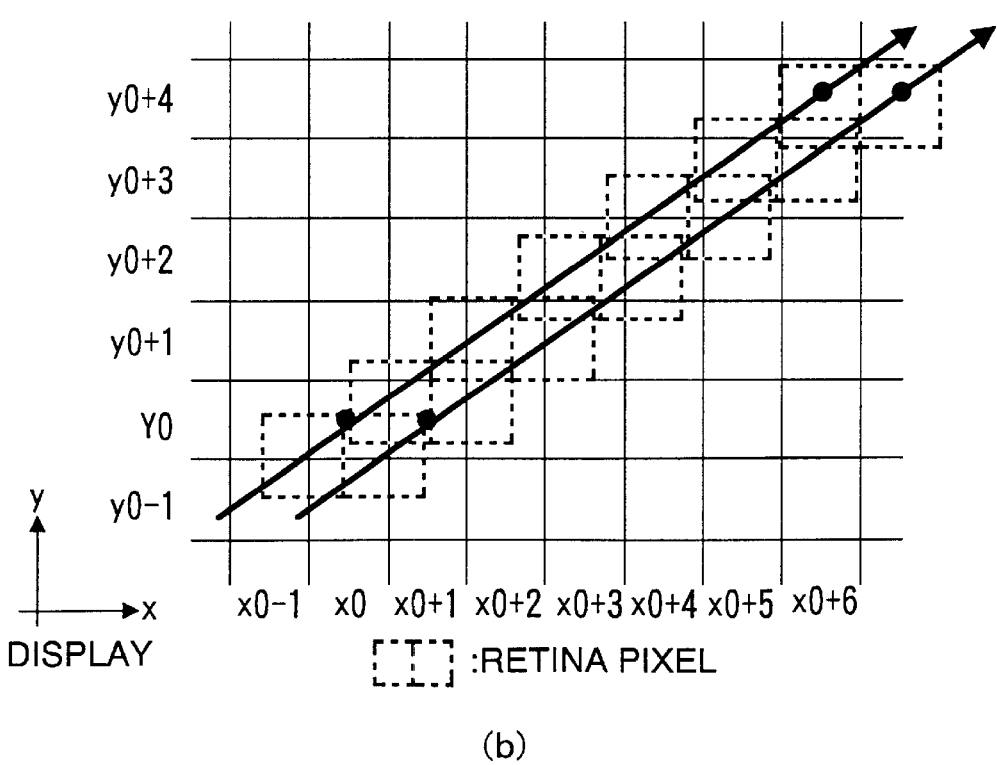
(b)

FIG. 46
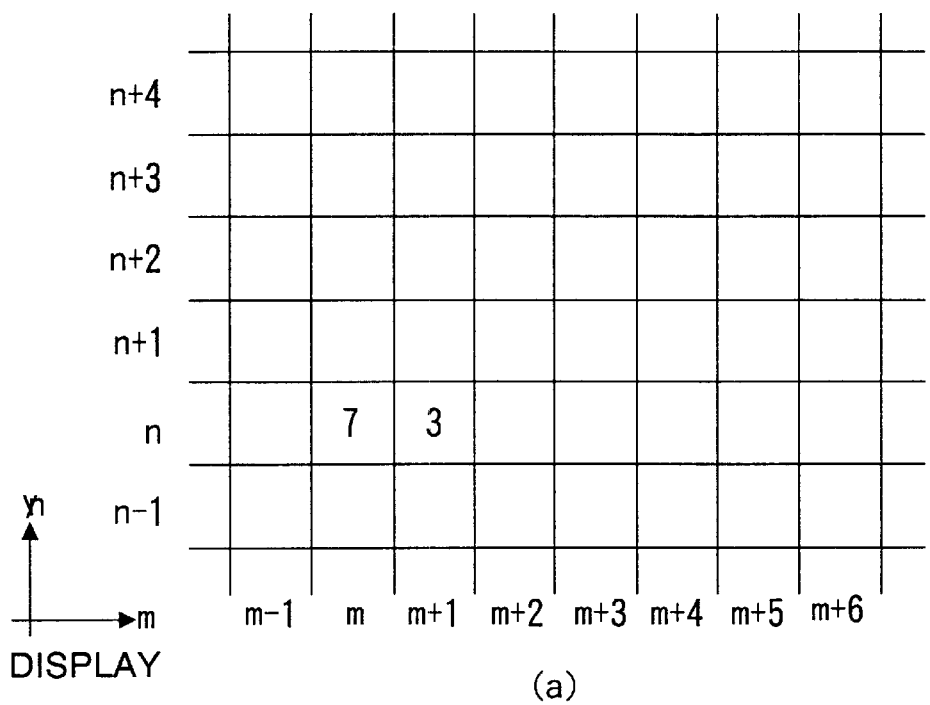
(a)
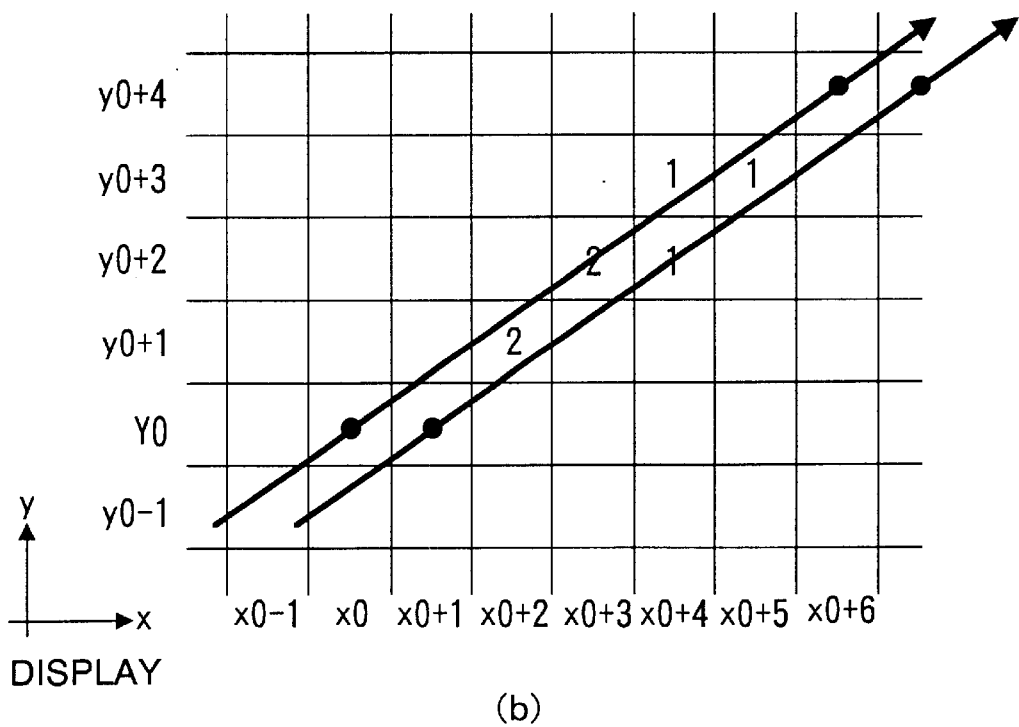
(b)

FIG. 47
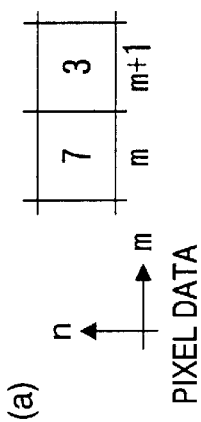
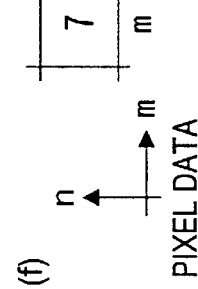

FIG. 49
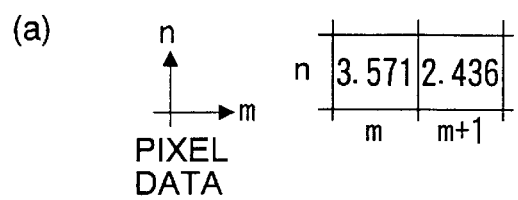
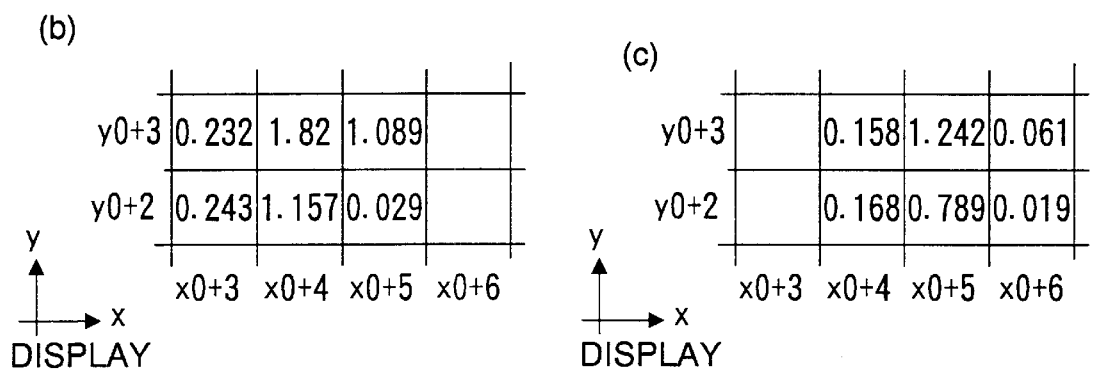
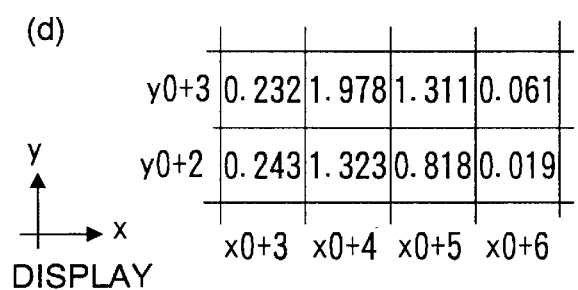
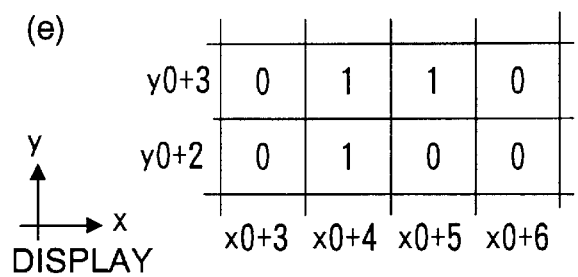

FIG. 52
(a)
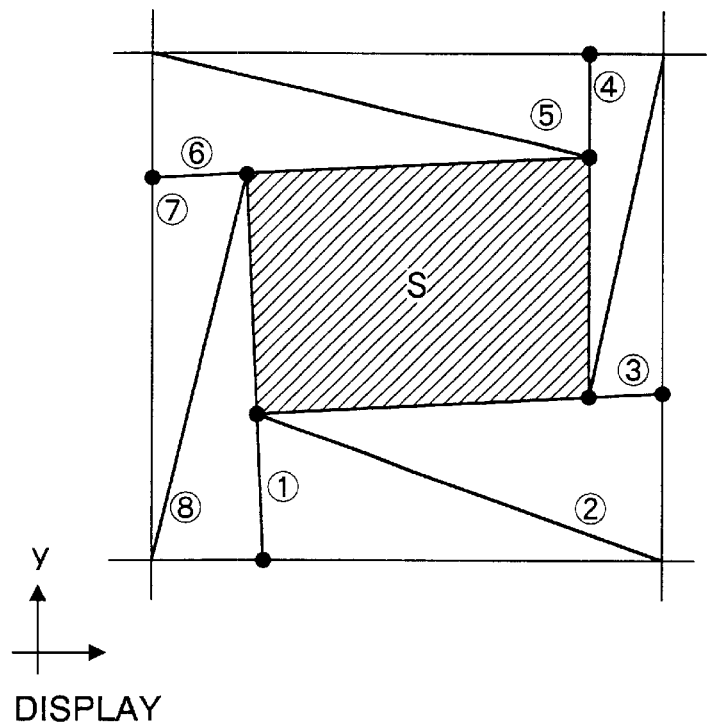
(b)
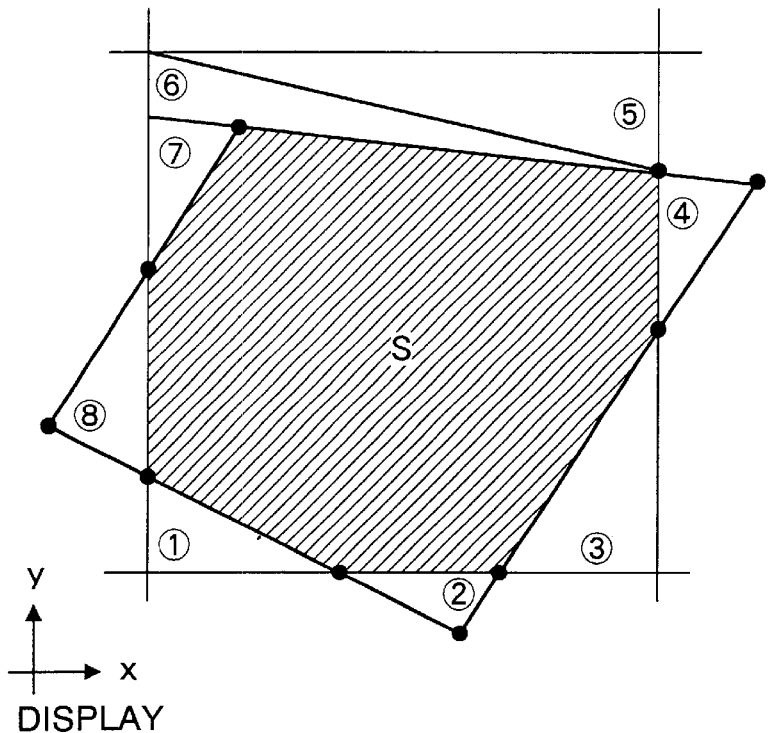

FIG. 53
(a)
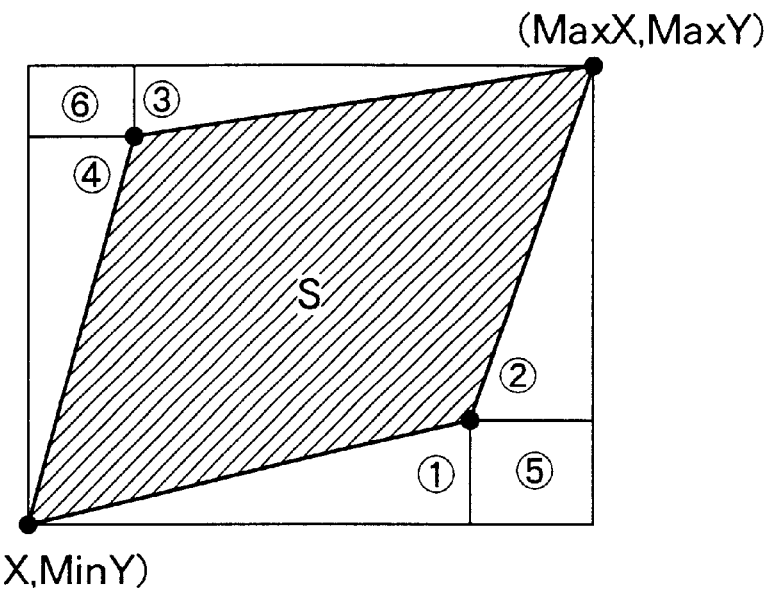
(b)
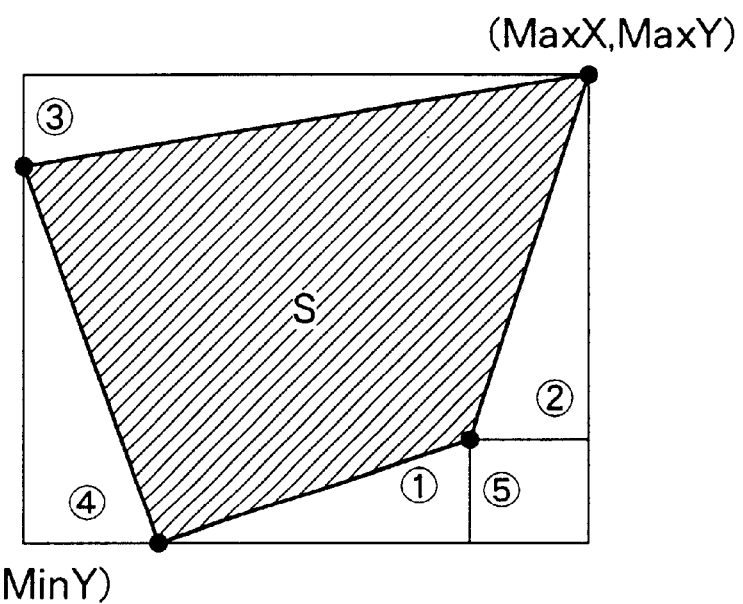

FIG. 54
(a)
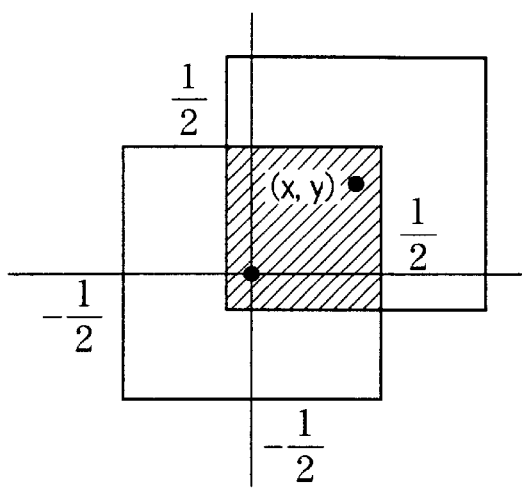
(b)
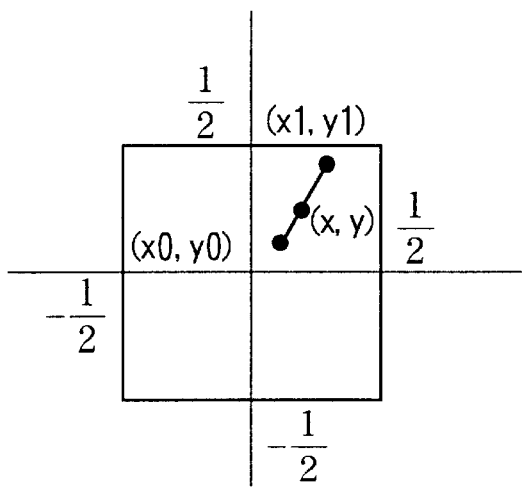
(c)
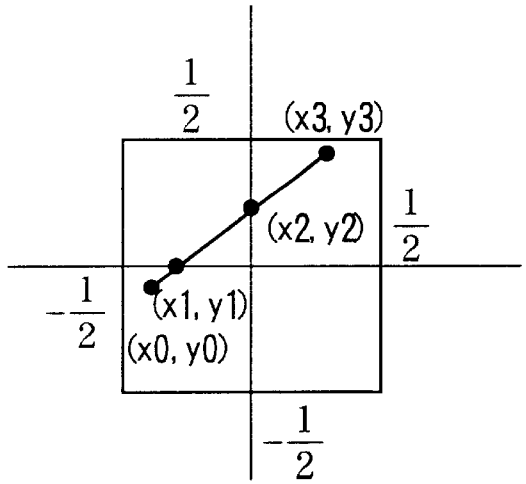

MOVING PICTURE DISPLAY METHOD AND APPARATUS

TECHNICAL FIELD

The present invention relates to moving picture display method and apparatus for effectively restraining a false contour generated when a moving picture is displayed in a plasma display panel (hereinafter referred to simply as "PDP").

BACKGROUND ART

Thin typed matrix panels such as a PDP, an EL display device, a fluorescent character display tube, a liquid crystal display device, etc., have begun to be presented in order to respond to the demand of the recent large-sized display device. Particularly, in such thin typed display devices, PDP is largely expected as a direct-viewing-typed display device with a large screen.

As one of PDP halftone display methods, there is an intra-field time division method. In this method, one field comprises N screens (hereinafter referred to as "subfields") each having a different luminance weight. They are called SF0, SF1, SF2, ..., SF(N−1) in order of increasing the luminance weight, and luminance weight ratios of the subfields are $2^0, 2^1, 2^2, \ldots, 2^{N-1}$, respectively. A halftone luminance in one field can be controlled by selecting the presence or absence of pixel light-emission in the subfields. The luminance that greets human eyes can be expressed by a total sum of luminance of the pixel light-emission in the respective subfields based on human visual characteristics (persistence characteristics). The number of tone revels, which can be expressed by this display method, is the number of subfields in one field, that is, N power of 2.

FIG. 1 shows a display sequence in one field using the above-mentioned halftone display method. One field comprises eight (N=8) subfields each having a different luminance weight. The respective subfields are called SF7, SF6, ..., SF0 in order of decreasing the luminance weight. Here, SF7 is called the most significant bit (MSB) side, and SF0 is called the least significant bit (LSB) side.

With respect to the ratios of the number of pixel light-emission in the subfields, when SF0 is "1", SF1, SF2, ..., SF6, SF7 are "2","4", ..., "64", "128", respectively. When the number of subfields is 8, it is possible to provide up to 256 tone levels.

The halftone display method using the above-explained subfield method is excellent in the point that multi-levels of tone can be provided even by a binary display device, which can only provide only two tone levels "1" and "0" such as PDP. The driving of PDP using the subfield method can realize the image quality, which is substantially the same as the TV image of a cathode ray tube type.

However, for example, when a moving picture of an object whose contrast is gradually changed is displayed, the so-called false contour, which is peculiar to a PDP image and does not appear on the TV image of the cathode ray tube type, is generated.

The generation of the false contour is a phenomenon, which is caused by human visual characteristics. More specifically, when the image signal level has 256 tone levels, the color, which is different from the color to be originally displayed, appears in a stripe form along a boundary of N power of 2 such as 128, 64, 32, 16 as if the tone was lost. However, when a still image is displayed, an observer does not feel such a false contour. The feature of the false contour is recognized at only a moving portion and the periphery of the above signal levels The principle of generating the false contour by the subfield half tone display ark method will be explained with reference to FIGS. 2(a) and 2(b). FIG. 2(a) shows a case in which the number of subfields in a field is 8 and they are arranged in order of increasing the luminance weight, that is, SF0, SF1, SF2, ..., SF7. It is assumed that a moving picture is moved three pixels in one filed when the signal level at a certain pixel position changes from 127 to 128. FIG. 2(b) shows a change of luminance, which the observer receives when the observer watches the moving picture on the screen.

Thus, in the case that the signal level 127 (pixel light-emission from SF0 to SF6) and the signal level 128 (pixel light-emission in only SF7) are adjacent to each other, a tone difference is 1 LSB (1/256). A value of pixel light-emission that the observer feels on the eye's retina is an integral value of the number of the pixels when the image is shifted by a nonuniform pixel light-emission time. In other words, the pixel light-emission in the respective subfields to be produced at the same pixel position is generated at the different pixel position in the moving picture. Therefore, the halftone luminance of the pixels cannot be expressed simply by the total sum of the respective subfields, and this is the reason why the observer feels the image as a false contour in one's eyes.

As shown in FIG. 2(b), when the moving picture is scrolled from the left side of the display screen to the right side, the observer feels the boundary portion between the above signal levels as a light line. Conversely, when the moving picture is scrolled from the right side to the left side, the observer feels the signal level boundary portion as a dark line by a spatial separation of the subfields.

On the other hand, in the display method in which the subfields are arranged in order of decreasing the luminance weight, that is, SF7, SF6, SF5, ..., SF0, when the moving picture is scrolled from the left side of the display screen to the right side, the observer feels the signal level boundary portion as a dark line. Conversely, when the moving picture is scrolled from the right side to the left side, the observer feels the signal level boundary portion as a light line. Namely, the appearance of the false contour differs, depending on the moved direction of the moving picture on the display screen.

Moreover, the generation of the false contour also depends on the motion velocity of the moving picture. The faster the motion velocity, the larger the range where the false contour is generated becomes. For example, in a case of the moving picture in which ten pixels are shifted in one field, the false contour extends to ten pixels.

Conventionally, various kinds of proposals are disclosed as measurements against the false contour. Japanese Unexamined Patent Publication No. 7-271325 discloses a technique in which the display order of the subfields is rearranged in order such that the false contour becomes inconspicuous instead of the order of simple increasing a pulse number ratio such as, 1, 2, 4, 8, 32, 64, 128. For example, the subfields are displayed in order such that the subfield having the longest display period in the subfields is arranged at the center of the field. Or, the display order of the subfields is changed for each field.

However, the advantages obtainable from the rearrangement of the subfields and the change of the light-emission sequence in the subfields for each field are extremely limited, and these measurements cannot deal with the false contour in the moving picture whose motion velocity is fast.

Japanese Unexamined Patent Publication No. 8-123355 discloses a technique of restraining the false contour using the motion detection. More specifically, an amount of motion and a direction are detected from two continuous moving picture in the field and an image corresponding to a background. Then, an amount of motion correction is obtained based on the detected value and a time divisional ratio in a unit time of each subfield, and the light-emitting pattern of the corresponding subfield is shifted by the amount of correction.

In Japanese Unexamined Patent Publication No. 8-211848, the following technique is disclosed. Specifically, a motion vector is detected for each pixel block by display data between the fields, and a head subfield in the field displays data corresponding to input data. Then, the subsequent subfields move display data so as to display an image by use of a value obtained by multiplying the motion vector by a value, which is obtained by dividing delay time from each head subfield by a field cycle.

However, there is a case in which the complete matching with a visual light quantity cannot be made only by the shift of the light-emitting pattern of the subfield and the change of display data in accordance with the above-mentioned motion quantity as described later. From the visual experiment, it was found that the generation of the false contour could not be prevented only by moving subfield data based on the motion quantity. Also, in the false contour control using the motion detection, a decisive fact of preventing the false contour depends on how accurately the motion quantity is detected. However, the above prior art does not sufficiently disclose the specific structure of the practical motion detection According to the false contour correction method disclosed in Japanese Unexamined Patent Publication No. 8-234694, concerning the pixel unit data corresponding to the same pixel unit, the previous value of a pixel unit at least one frame period before and the present value of a pixel unit are compared with each other. Then, when the digit places of the most significant bits of both pixel light-emission logical values are different from each other, correction data is added/subtracted to/from the present value.

However, in the above false contour correction method, there is possibility that a contrary effect will be brought about if the motion direction of the moving picture cannot be specified. For example, when the bit digit place is detected in an upper direction, correction data is subtracted. However, if the above calculation is carried out while the image is moving left, there is a case in which the false contour is oppositely emphasized and the contrary effect is brought about. Similarly, when the bit digit place is detected in a lower direction, correction data is added. However, if the above calculation is carried out while the image is moving in the opposite direction, the contrary effect is brought about. Further, there is a problem in which the above method cannot deal with the moving picture having high velocity.

Thus, in the conventional technique of restraining the false contour, there is the problem in which the detection accuracy of the motion vector is insufficient so that the false contour generated in the moving picture having high velocity and the image whose density is flat can not be sufficiently prevented.

DISCLOSURE OF INVENTION

In consideration of the above-mentioned problem, the present invention has been made. An object of the present invention is to provide moving picture display method and moving picture display apparatus for excellent picture quality which largely restrain the generation of the false contour of a moving picture observed by eyes in a display apparatus which performs a tone display according to a subfield method.

The object of the present invention is to provide, in a moving picture display method for displaying necessary tones by changing the combination of subfields composing one field image, which is composed of a plurality of subfields having a different weight of luminance, the moving picture display method comprising the steps of detecting a motion vector indicating a moved direction of the image and a shift quantity thereof from image data, generating newly image data for providing a tone equivalent to a tone, which a retina receives, to the retina when the image shifts in accordance with the detected motion vector, and determining the combination of subfields based on the newly generated image data.

Also, the present invention provides the moving picture display method in which a pixel density of a target pixel is distributed to an image region influenced by the target pixel moved for a subfield period, and the presence or absence of light-emission of the subfield in the respective pixels whose density is distributed from peripheral pixels is determined in accordance with the total sum of pixel density.

According to the present invention, the motion vector of the image is detected, and image data to be displayed is distributed and arranged along the moved direction of the detected motion vector so as to structure subfield drive data. The contribution rate of pixel light-emission time in each subfield section and that of the light quantity entering each retina position from the path of the movement of the light of sight on the screen are calculated from the vector value in accordance with the number of motion pixels and the motion direction at real time when the light of sight follows the shift pixel on the display image. Then, new subfield data is produced from the output data. As a result, image data is converted in accordance with the number of shift pixels whose motion has been correctly detected and the moved direction thereof, and there is an advantage in which the generation of the false contour can be prevented.

In the present invention, since the distribution of the image data is performed for each subfield sequentially, subfield processing can be largely reduced, and a calculation speed can be improved.

Also, the present invention provides the moving picture display method in which the pixel position to which the image data is distributed and the distribution rate are calculated based on the moved direction and the shift quantity of the detected motion vector.

According to the present invention, there is an advantage in which the light quantity entering the retina can be correctly obtained.

Also, the present invention provides the moving picture display method in which the motion vector of the image is detected, a four-corner motion vector showing the moved directions of the four corners for each pixel and the shift quantity thereof is detected based on the detected motion vector, and image data to be displayed is distributed and arranged along the detected four-corner motion vector so as to structure the subfields.

According to the present invention, even when the shape of the pixel is distorted with the motion of the pixel, the shape can be correctly grasped, and the pixel area and the contribution rate can be correctly obtained.

Moreover, the present invention provides the moving picture display method in which the motion of a pixel close to the signal level at which the false contour is generated is captured, and present image data is corrected in accordance with the motion of the pixel.

According to the present invention, since the motion of the pixel is captured at a level close to the signal level at which the false contour is generated, a local change of the image can be speedily detected without being influenced by deviation of a pixel value distribution. Since it is enough to detect a motion which occurs extremely locally with respect to the motion of a pixel causing the false contour, calculation time and the circuit structure can be simplified.

Also, the present invention provides the moving picture display method in which each of a present field image and a previous field image is made to be binary with a threshold value close to the signal level at which the false contour is generated, the binary images are compared so as to detect the number of shift pixels of the moved pixels and the moved direction thereof, and the motion pixel having the signal level at which the false contour is generated in the present field image is corrected in accordance with the number of shift pixels and the moved direction of the motion pixels.

According to the present invention, the present field image and a previous field image are made to be binary with the threshold value close to the signal level at which the false contour is generated. As a result, the feature of the original image is reflected even in a small region, and the motion of the pixel causing the false contour can be detected. Since the correction is made in accordance with the number of shift pixels of the pixels whose motion has been detected and the moved direction thereof, the generation of the false contour can be prevented.

Moreover, the present invention provides the moving picture display method in which when the motion vector is detected from the present field image and the previous field image in a block unit, the motion vector is detected from a correlation value of identification codes provided to the present field image and the previous field image in accordance with the pixel level.

According to the present invention, since the motion vector is detected from the correlation value of the identification codes provided to the present field image and the previous field image in accordance with the pixel level, the motion vector can be detected with high accuracy. Moreover, image data is corrected using the motion vector with high accuracy, thereby restraining the generation of the false contour and providing the high quality display.

Furthermore, the present invention provides the moving picture display method in which a density gradient of the image is detected, and a flat portion of the density gradient is subjected to data distribution processing of the present field image independent of the motion detection.

According to the present invention, the generation of the false contour in the flat portion of the density gradient can be sufficiently restrained by the known data distribution processing, and the processing speed is high. Therefore, the advantage of the known data distribution processing and that of the present invention can be effectively combined.

BRIEF DESCRIPTION OF THE DRAWINGS

FIG. 8 is a structural view of a motion vector table;

FIG. 9 is a structural view of a correction table;

FIG. 10 is a table structural view showing first and second quadrants in the correction table;

FIG. 11 is a table structural view showing third and fourth quadrants in the correction table;

FIG. 18 is a view showing the block relationship in the undefined block processing;

FIG. 26 is a view showing an example of providing identification codes in the second embodiment of the present invention;

FIG. 35 is a view showing one example of patterns in the pixel distribution method;

FIG. 44(a) is a view showing a state in which a visual point moves on the display;

FIG. 44(b) is a view showing state in which two-pixel image data move and a retina pixel moves in accordance with image data;

FIGS. 46(a) and 46(b) are views showing data before an image processing and a result of the processing;

FIG. 47 is a view showing processing in a first subfield section;

FIG. 49 is a view showing processing in a third subfield section;

FIGS. 52(a) and 52(b) are views showing that retina pixels are overlapped at a certain position on the display;

FIGS. 53(a) and 53(b) are views showing retina pixels, a rectangle surrounding all retina pixels, and minimum and maximum coordinates of the rectangle;

FIGS. 54(a), 54(b) and 54(c) are views explaining how to obtain a contribution rate;

BEST MODE FOR CARRYING OUT THE INVENTION

Embodiments of the present invention will be specifically described with reference to the accompanying drawings.
(First Embodiment)

Figure 1:
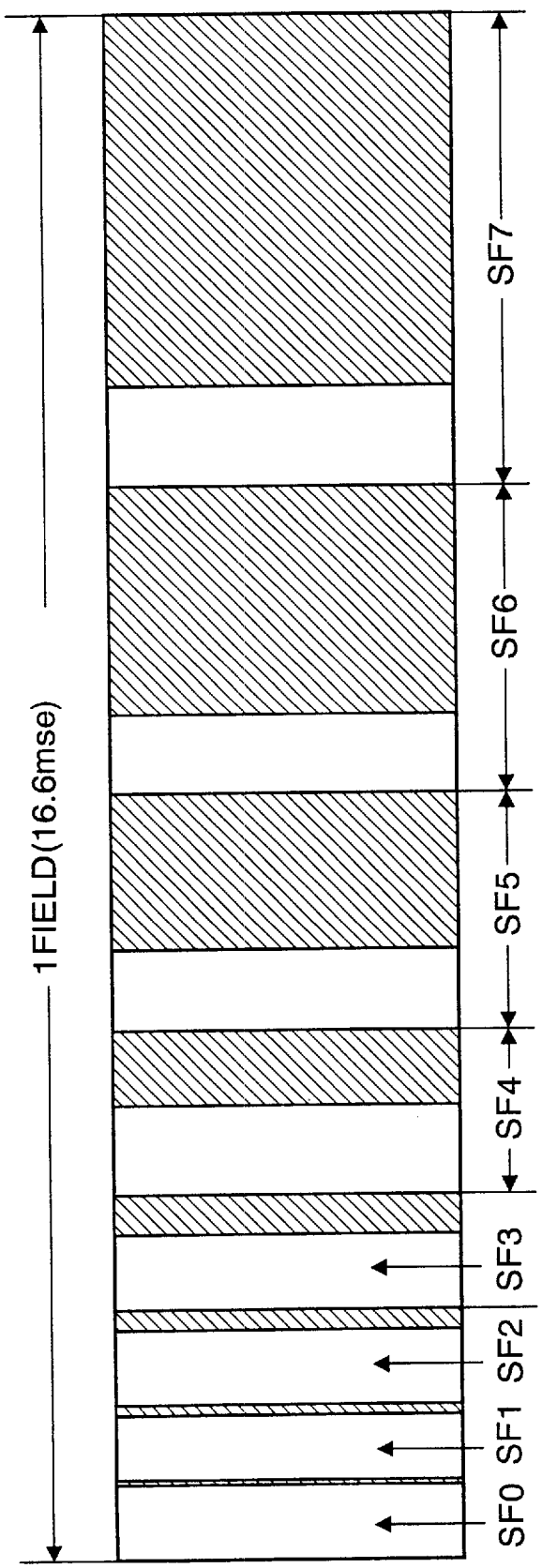
FIG. 1 is a view showing a luminance ratio of subfields.
Figure 2:
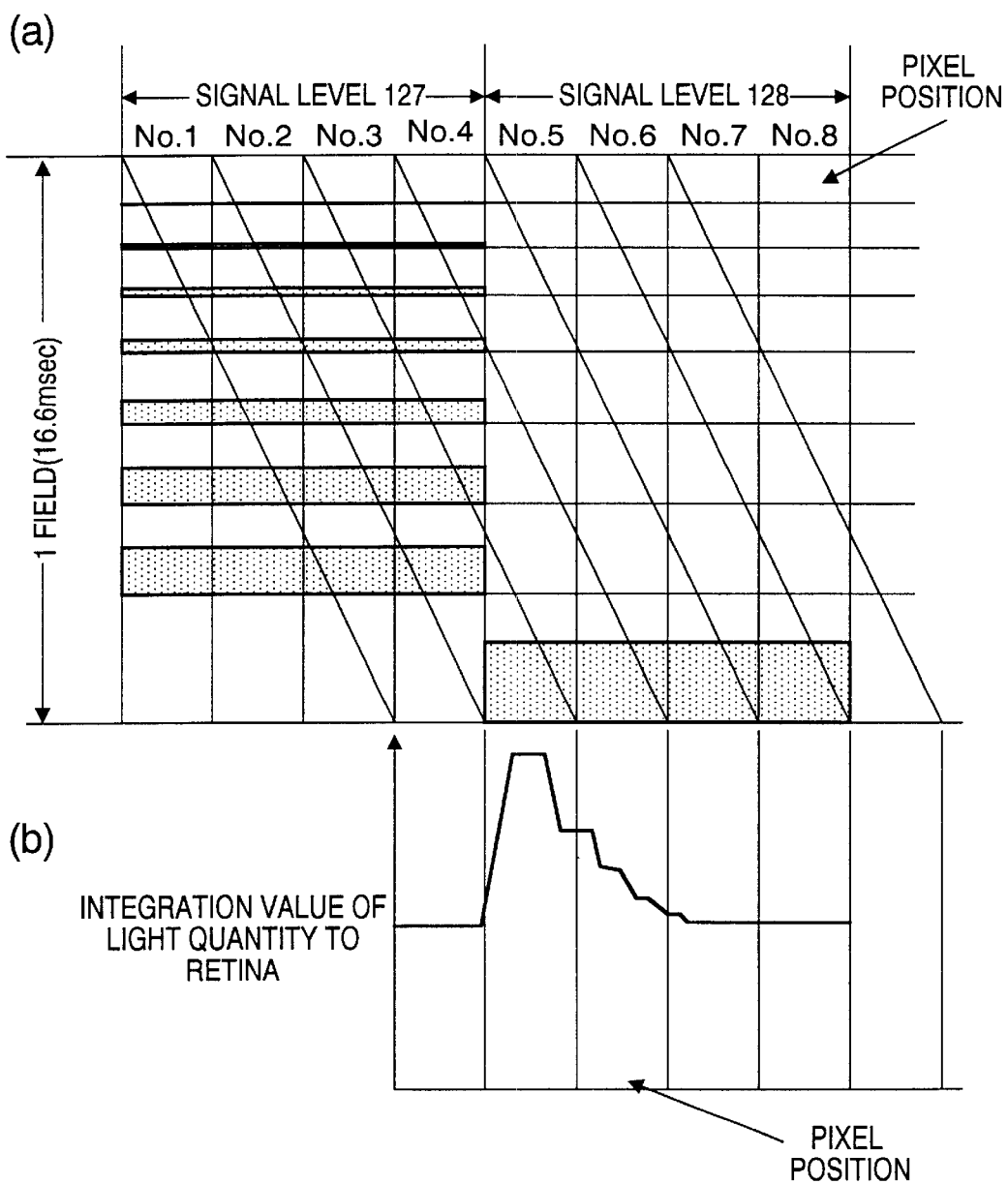
FIGS. 2(a) and 2(b) are views showing the principle of generating a false contour in a subfield method.
Figure 3:
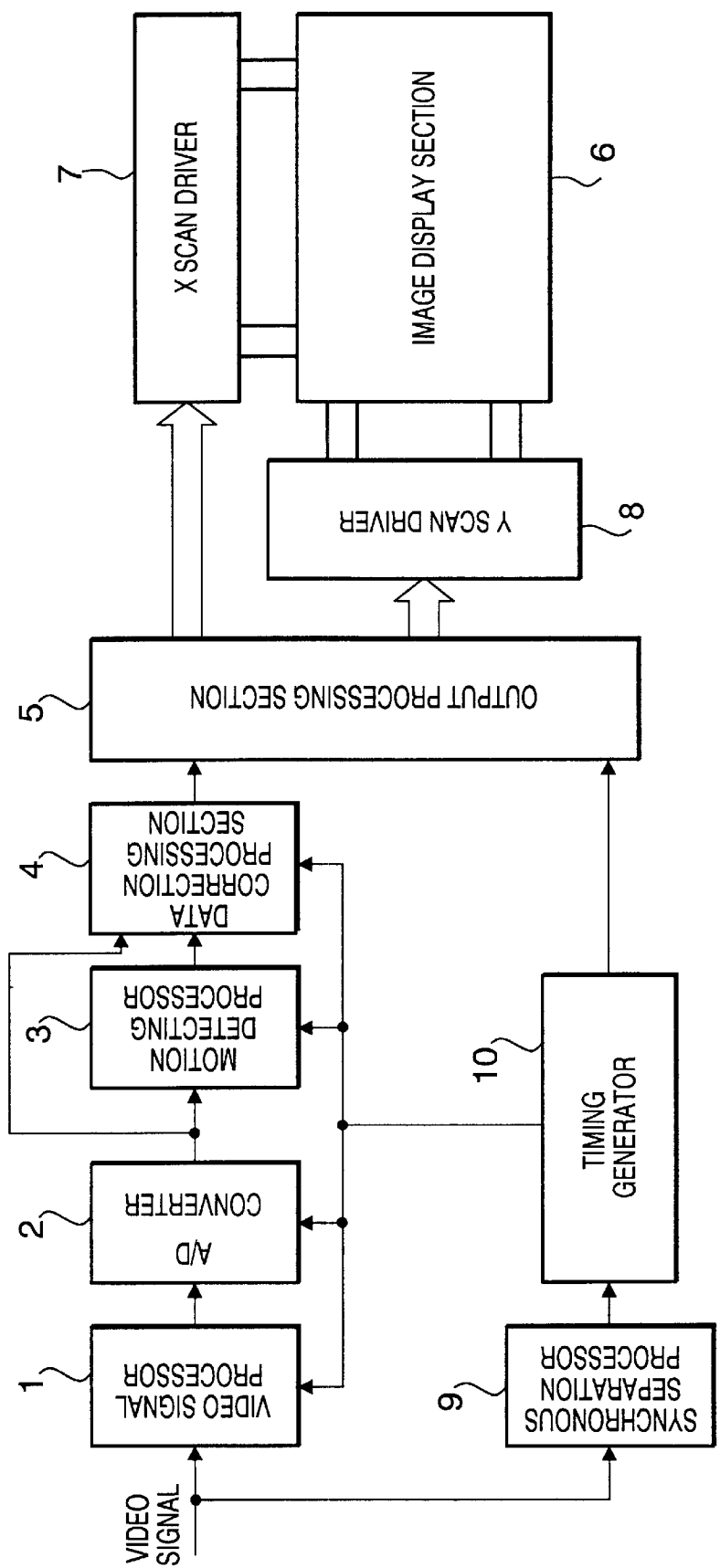
FIG. 3 is a general structural view of a tone image display apparatus of a first embodiment of the present invention.

FIG. 3 shows a general configuration of a tone display device to which the moving picture display method of the present invention is applied. In this tone display device, a video signal processor 1 separates a video signal into the respective color components R, G and B, and an A/D converter 2 converts these color components to digital image of R, G and B, thereafter inputting these digital image to a motion detection section 3. In the motion detection section 3, smoothing processing, a multi-hierarchical binary processing, block matching processing, and majority/integration decision processing are carried out so as to detect the number of motion pixels and the moved direction respect to an inputted image. Information on the number of motion pixels, the moved direction, and detection block, which have been detected by the motion detection section 3, are input to a data correction processing section 4 having a correction table in which an amount of correction is set in accordance with the number of motion pixels and the moved direction. Then, each tones of pixels generating a false contour is corrected and output to an output processing section 5. The output processing section 5 converts tone data of each pixel to the number of pulses corresponding to a voltage applied time width so as to provide to an X scan driver 7 and a Y scan driver 8. Thereby, a halftone display is performed on an image display section 6 composed of PDP.

Note that a synchronous separation processor 9 separates a synchronous signal from the video signal, and that a timing generator 10 generates a timing signal synchronized with an input video signal so as to provide to each section.

Figure 4:
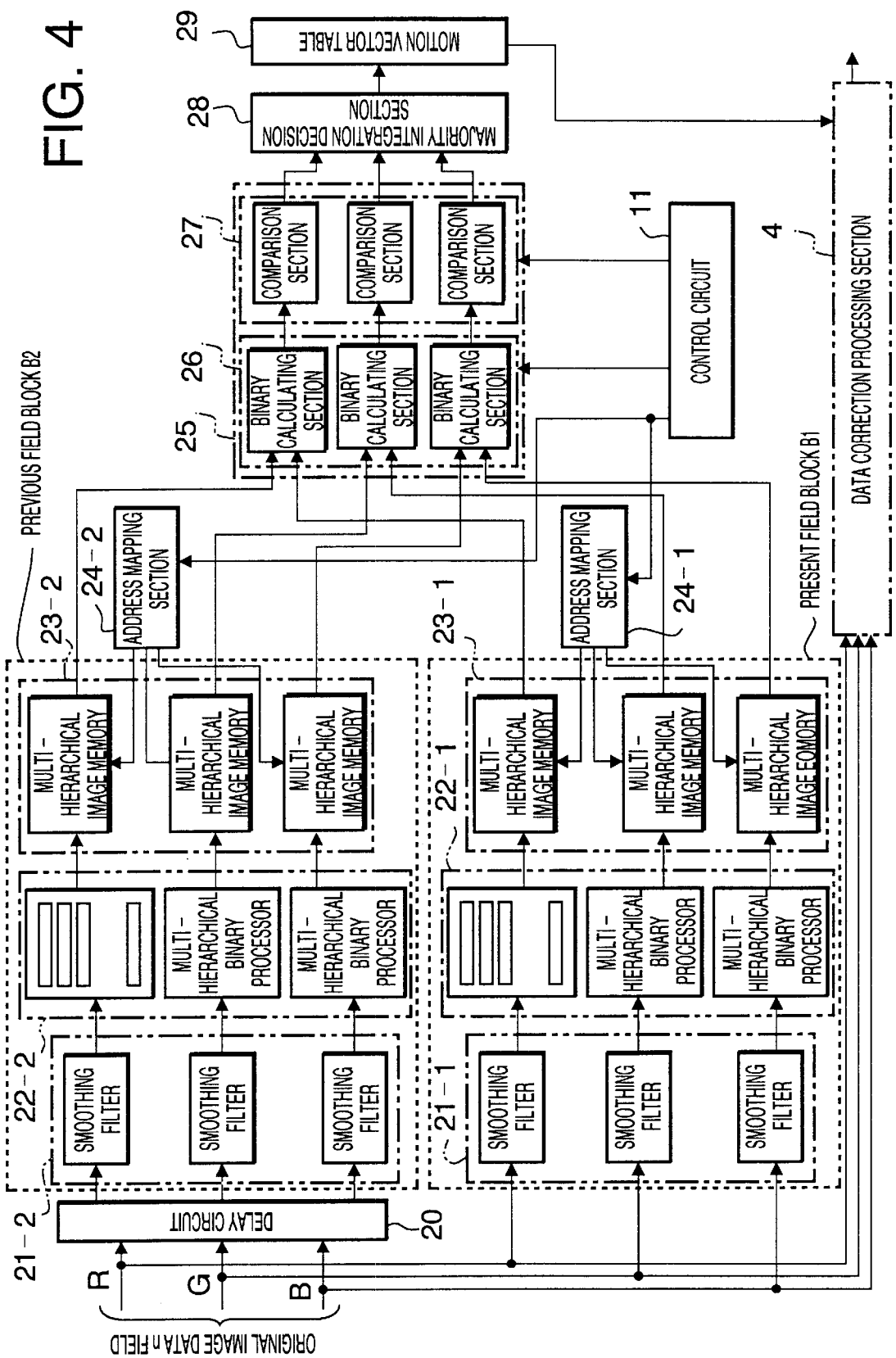
FIG. 4 is a functional block diagram of a motion detection section according to the first embodiment.

The specific configuration of the motion detection section 3 is shown in FIG. 4. Original image data input from A/D converter 2 is input to a present field block B1, while being delayed for one field by a delay circuit 20 to be input to a previous field block B2. In the present field block B1, original image data of the present field is input to a smoothing filter block 21-1 having three smoothing filters of R, G and B. Then, inputted original image data is subjected to smoothing processing for each color, thereby removing noise components included in the original image. The original image data subjected to the smoothing processing is input to a multi-hierarchical binary block 22-1 having a multi-hierarchical binary processing section provided for each color of R, G and B to subjected to binary process using a plurality of threshold values for each color. Here, the threshold values are set at a level close to a signal level at which the false contour is generated. For example, in the case of displaying 256-level by 8 bits, the threshold values are set from 31 to 32, 63 to 64, 127 to 128, and the values including their opposite signal levels. Binary image data obtained for each threshold value is stored in an image memory for each color in a multi-hierarchical image memory block 23-1.

The previous field block B2 which processes an original data in a previous field which is present one field before the current field has the same configuration as the present field block B1. More specifically, the one-field previous original image data is subjected to smoothing processing for each color in a smoothing filter block 21-2, and then subjected to binary processing using a plurality of threshold values for each color in a multi-hierarchical binary block 22-2 having a multi-hierarchical binary processing section provided for each color of R, G and B. Multi-hierarchical image data obtained for each threshold value is stored in an image memory for each color in a multi-hierarchical memory block 23-2.

In the block matching processing for detection of a pixel motion, an address mapping section 24-1 performs an address mapping for obtaining an address of a detection block KB to be fetched from the present field image, and an address mapping section 24-2 performs an address mapping for obtaining an address of a reference block RB to be fetched from the previous field image. Image data of each of the detection block KB and the reference block RB is input to a motion vector detector 25.

The motion vector detector 25 comprises a binary calculation block 26 having respective binary calculators for each color and a comparison detection block 27 having respective comparators for each color, and obtains the motion of images for inter-field by block matching.

A majority/integration decision section 28 determines the number of motion pixels and the moved direction of each detection block KG, and registers the determination result to a motion vector table 29.

A data correction processing section 4 corrects pixel data of the false contour portion using the motion vector table 29 and a correction table prepared based on a visual experiment in advance.

The specific operation of tone display apparatus configured as described above will be described below.

Figure 12:
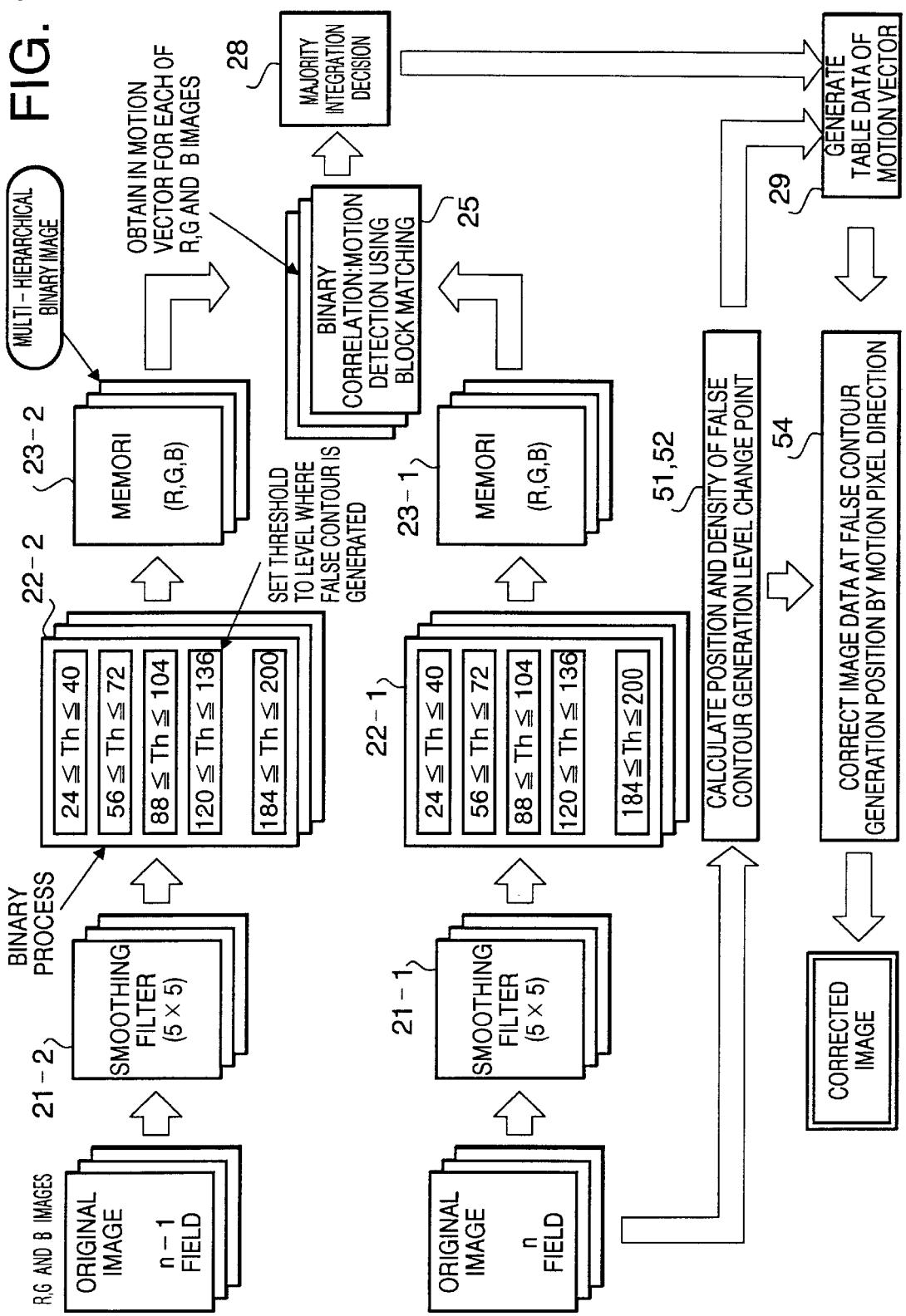
FIG. 12 is a view showing a general processing flow of the tone image display apparatus of the first embodiment of the present invention.

FIG. 12 is a view conceptually extracting the processing contents in each block in the motion detection section 3 shown in FIG. 4. The following will explain the processing contents in each block in the motion detection section 3 shown in FIG. 12.

Each of the present field image and the previous field image is subjected to binary processing using the threshold value, which is set at the signal level at which the false contour is generated.

Here, the concept of the multi-hierarchical binary image will be explained with reference to FIG. 13.

Figure 13:
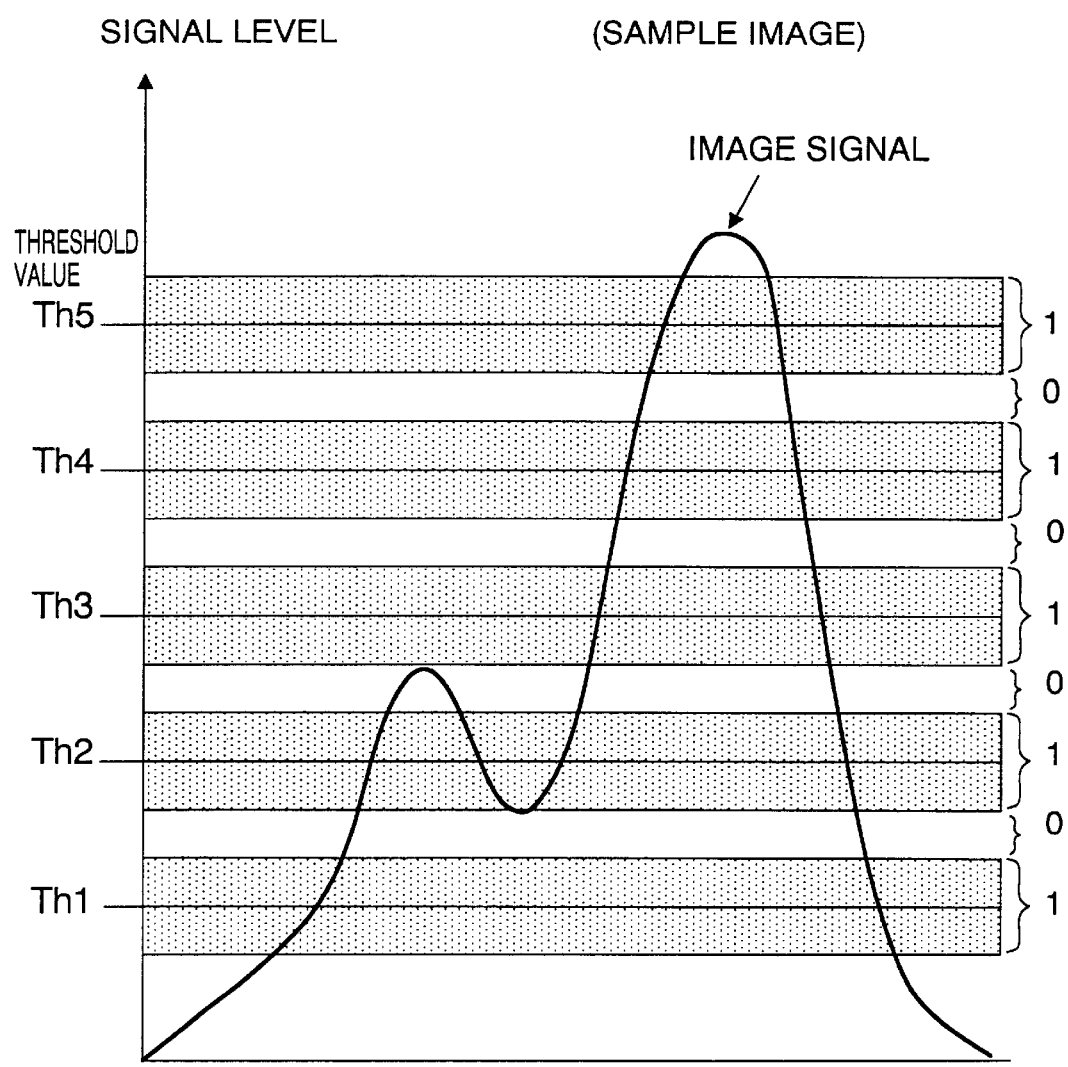
FIG. 13 is a view showing the relationship between a multi-hierarchical image and a threshold value on a sample image.
Figure 14:
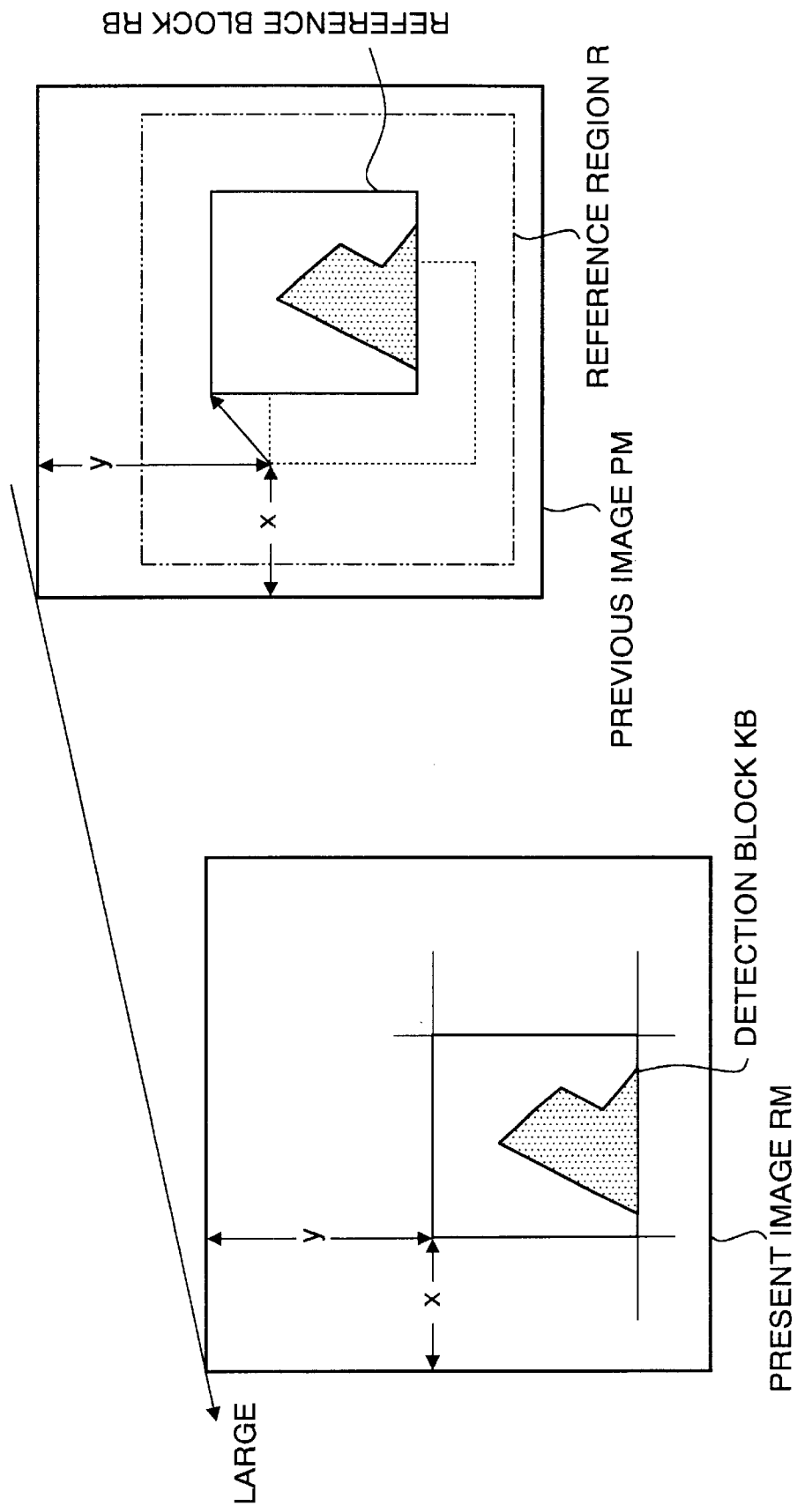
FIG. 14 is a conceptual view of a block matching.

In FIG. 13, a horizontal axis denotes a pixel position, and a vertical axis denotes a pixel value. A variation range of the pixel value is divided into (n+1) sections by n threshold values Th1 to THn (n=5 in this figure), and a binary pixel value is allocated to be different between the adjacent sections. The respective pixels are made to be binary in accordance with which section the pixel value belongs to.

According to the above binary method, it is possible to express a local change of the image without being influenced by deviation of the pixel value distribution. For this reason, the binary image reflects the feature of the original image even in a small amount of regions such as the block for the motion vector detection. Since it is enough to detect a motion which occurs extremely locally with respect to the motion of a pixel causing the false contour, calculation time and the circuit structure can be simplified.

Next, the following will explain the block matching method in the motion vector detector 25.

The block matching method is used as a method for obtaining the motion of the images for field-interval. According to this method, the detection block KB is set at a size having 16 horizontal pixels and 16 vertical pixels, and the reference block RB is set at the same size as the detection block size KB. At this time, if a reference region R containing the reference block RB is set to have 48 horizontal pixels and 48 vertical pixels, the number of the motion pixels in the horizontal direction (x-direction) can be detected from −16 pixels to +16 pixels. Similarly, the number of the motion pixels in the vertical direction (y-direction) can be detected from −16 pixels to +16 pixels. When the moving picture moves on the display screen, a conspicuous false contour appears at a portion where the inter-field motion is at near 6 to 15 pixels. Therefore, as the capability of detecting the number of motion pixels, the above-mentioned degree is needed. As shown in FIG. 12, the image motion between the present field and the previous field is obtained in a rectangular block unit. With respect to detection blocks KB obtained by dividing the present field into a plurality of reference regions R, each block KB is compared to respective reference block RB contained in the reference regions R in the previous field in order to determine the degree of block matching with reference block RB and find the most matched block. Then, the amount of motion during this time is obtained as a motion vector.

At this point, the degree of the block matching is determined by a predetermined evaluation function value. Then, the detection of the motion vector is performed by searching a reference block RB with the minimum evaluation function value among from a large number of reference blocks RB contained in the reference region R.

In the case where the structure based on the above method is applied to a tone image, a large amount of calculations such as a subtraction, a comparison are performed for the evaluation function value using the pixel values expressed by multi-values (e.g. 8 bits). For this reason, the number of reference blocks RB, which can be evaluated in a real time process, is limited, causing a case where the reference blocks RB, which provided the correct motion vector, were not evaluated, with the problem that the detection accuracy of the motion vector was decreased.

For restraining the false contour in PDP, since the signal level at which the false contour is generated is known, the image close to the portion where the false contour is generated is made to be binary in order to obtain the motion of the image close to the portion. Then, the motion vector of the binary image is obtained, thereby improving calculation time and accuracy. The motion vector of the image having no false contour generated can be ignored.

Figure 5:
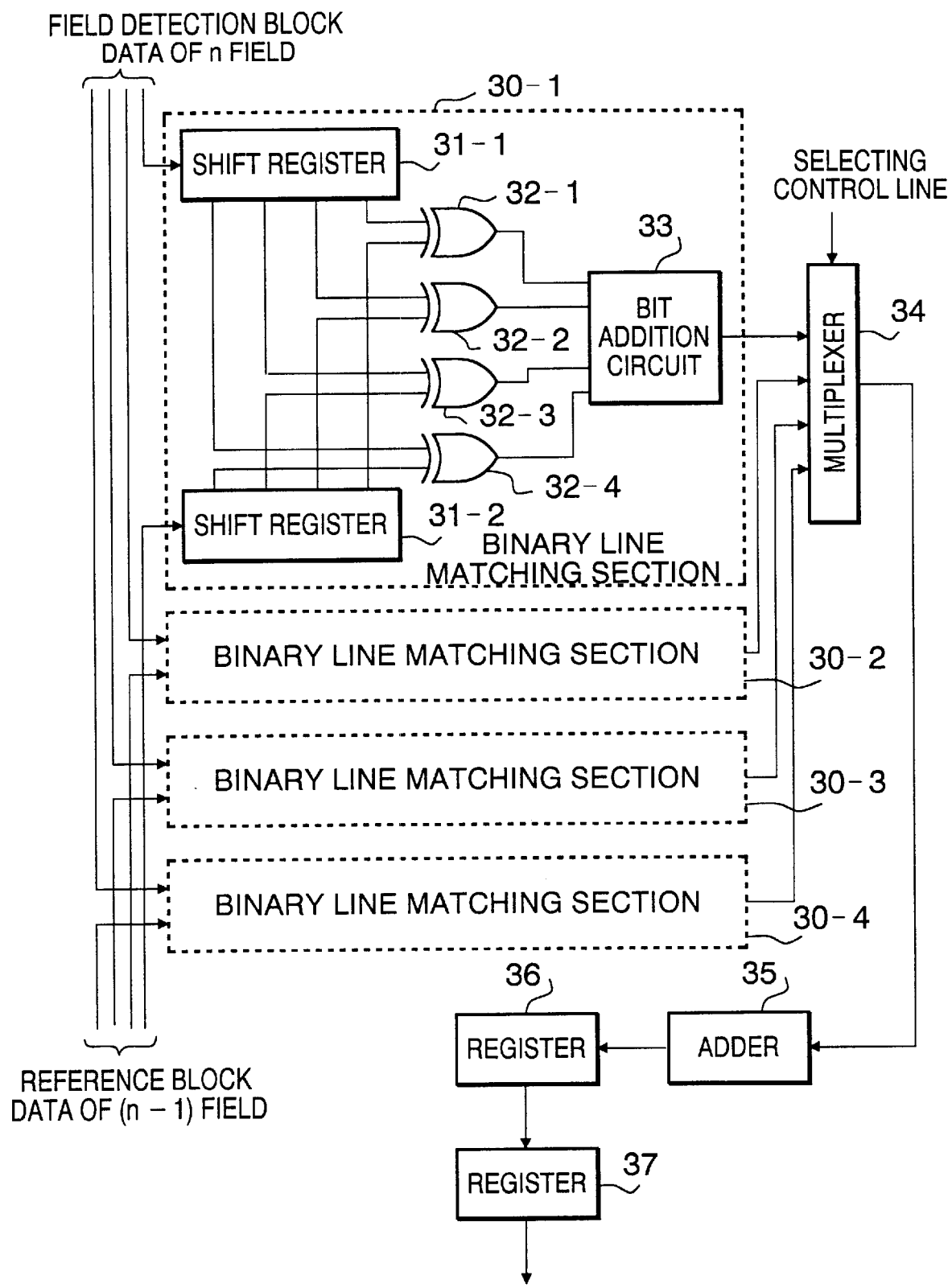
FIG. 5 is a circuit diagram of a calculator in binary in the motion detection section.

In a binary calculation block 26, an evaluation function showing a matching degree is calculated. FIG. 5 shows the configuration of a binary calculating section in the case where a size of the detection block KB is 4×4 pixels. Note that the size of the detection block KB is 16×16 pixels and a size of the reference region R is 48×48 pixels, the explanation hereinafter will be made using the size of 4×4 pixels in order to simplify the explanation.

The binary calculating section comprises binary line matching sections 30-1, 30-2, 30-3, 30-4 for detecting inter-field matching for respective four lines in the block. The binary line matching section 30-1 evaluates the line matching of the first line between the present field and the previous field. Line data of the first line of the detection block KB is input to a shift register 31-1, and line data of the first line of the reference block RB is input to a shift register 31-2. The shift registers 31-1 and 31-2 can store data of four pixels. Then, pixel data at the same pixel position are respectively output from two shift registers and input to exclusive-OR circuits 32-1, 32-2, 32-3, 32-4. Outputs from the exclusive-OR circuits are added by a bit addition circuit 33, and the result is input to a multiplexer 34.

The binary line matching sections 30-2, 30-3, 30-4 have the same configuration as the binary line matching section 30-1. The binary line matching portions 30-2, 30-3, 30-4 evaluate the line matching of the second to fourth lines respectively, and input bit addition values, serving as line evaluation values, to the multiplexer 34 respectively. The outputs from the binary line matching sections 30-1, 30-2, 30-3, 30-4 are selectively input to an adder 35 through the multiplexer 34, and stores an addition value, obtained by adding evaluation values of four lines, in a register 36 as a block evaluation value for one block. A register 37 is used to control the outputs.

In the above binary calculating section, data of the detection block KB and that of the reference block RB, which are supplied from the multi-hierarchical image memory through a signal line, are input to the binary line matching sections 30 by a scanning line unit. In the respective line matching portions 30-1 to 30-4, binary data for each pixel is fetched using the shift registers 31-1 and 31-2. Then, a match/mismatch of the pixels at the same position in the blocks are evaluated by the exclusive-OR circuits 32-1 to 32-4. When the mismatch is evaluated, the value 1 is supplied to a bit addition circuit 33, and when the match is evaluated, the value 0 is supplied thereto.

The bit addition circuit 33 calculates the total sum of these values. The bit addition value indicates the number of mismatch pixels for each scanning line. The total sum is output to the binary line matching portion 30 through the signal line, and supplied to the multiplexer 34. The multiplexer 34 sequentially selects the output from the bit addition circuit 33 for each line using a selective control signal provided from a selective control line, thereby supplying the output to the adder 35 through the signal line. A total sum of the input values is obtained by the adder 35 and the register 36, the number of mismatch pixels between the blocks is obtained as a valuation function value.

Next, the following will explain an operation of a comparative detection block 27.

Figure 6:
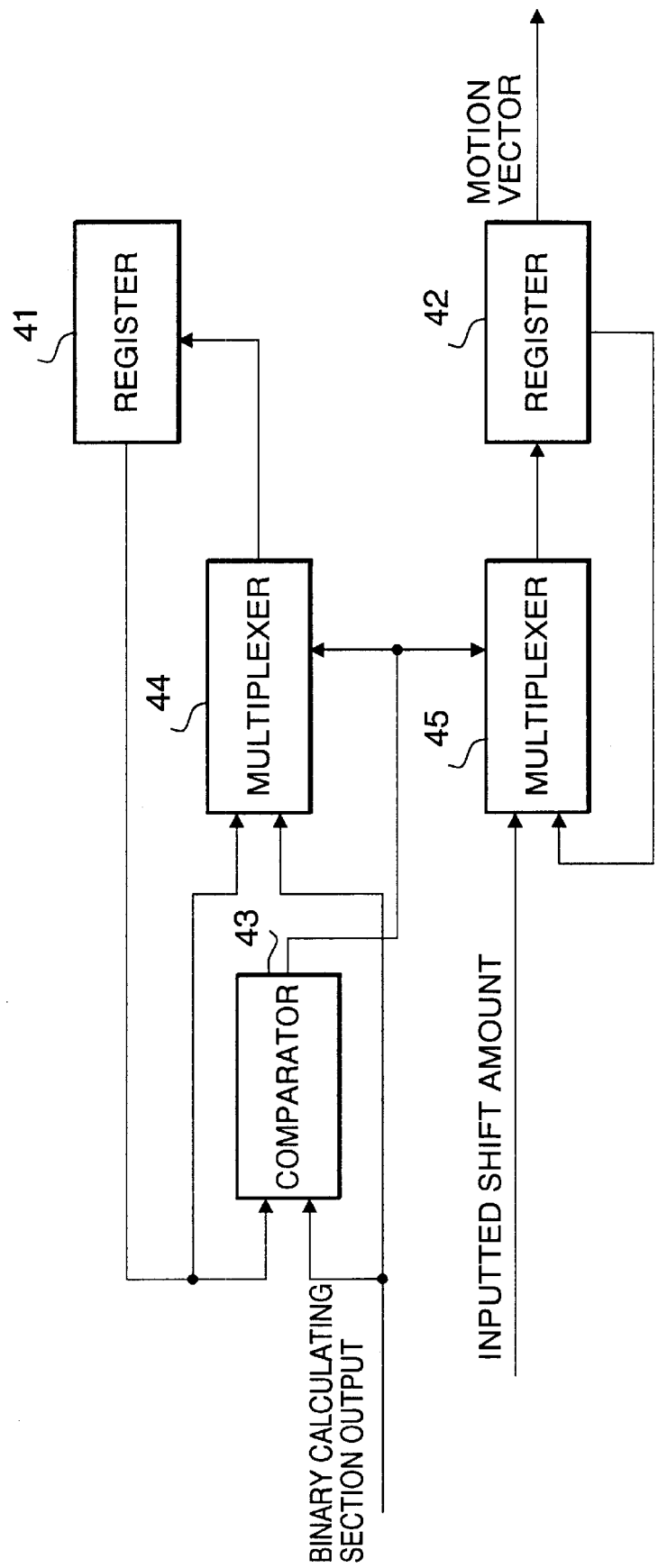
FIG. 6 is a structural view of a comparison section in the motion detection section.

FIG. 6 shows the configuration of a comparison section in the comparative detection block 27. The comparison section comprises a register 41 for storing the minimum evaluation function value, a register 42 for storing an moved amount of the reference block RB showing the minimum evaluation function value, a comparator 43 for comparing the present minimum evaluation function value with an output from the binary calculating section to be compared this time, multiplexers 44 and 45.

In the comparison section, the minimum value of the evaluation function value at each time is stored in the register 41, and the moved amount of the reference block RB corresponding to the minimum value is stored in the register 42. The comparator 43 compares the evaluation function value supplied through the signal line with the minimum value of evaluation function value supplied from the register 41, and the comparison result is provided to two multiplexers 44 and 45 through the signal line as a selective control signal. When the input from the binary calculating section is small, the multiplexer 44 updates the content of the register 41 with the evaluation function value input from the binary calculating section, and the multiplexer 45 updates the content of the register 42 with the moved amount input from the binary calculating section. The moved stored in the register 42 is finally provided to a majority/integration decision section 28 as a motion vector of the detection block KB.

The following will explain an operation of the majority/integration decision section 28.

The majority/integration decision section 28 carries out processing for calculating the detection block, in which no motion has been detected by the comparison between the detection block of each of components of R, G and B and the reference block, that is, the undefined block from information of the known blocks there around. Also, the majority/integration decision section 28 carries out integration/calculation processing for obtaining one motion vector from motion vector information of the detection block of each of components of R, G and B.

The motion vector detector 25 detects a motion vector in each detection block KB obtained by dividing the present field into a plurality of blocks, and inputs the information on the detected motion vectors to the majority/integration decision section 28. The majority/integration decision section 28 executes the undefined block processing and the majority decision processing to determine the number of motion pixels and the motion direction in each detection block KB, and registers the determination result into a motion vector table 29.

Figure 15:
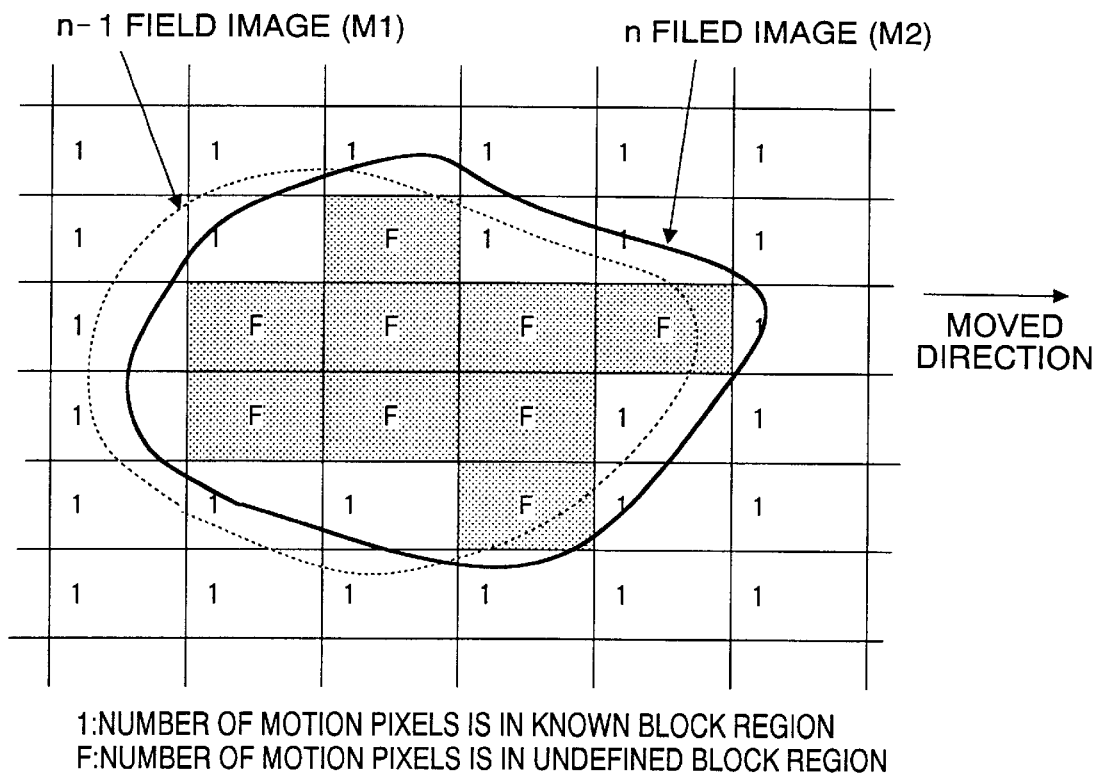
FIG. 15 is a conceptual view of a known block KT process.
Figure 16:
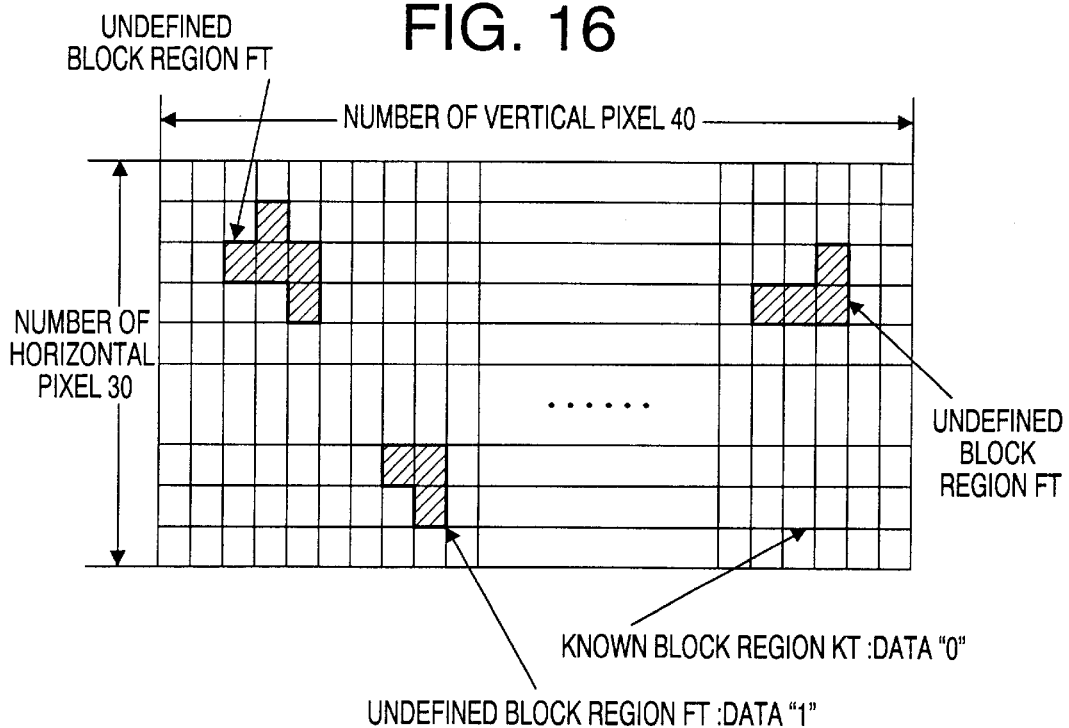
FIG. 16 is a view showing the specific examples of the known block and an undefined block in an undefined block processing.
Figure 17:
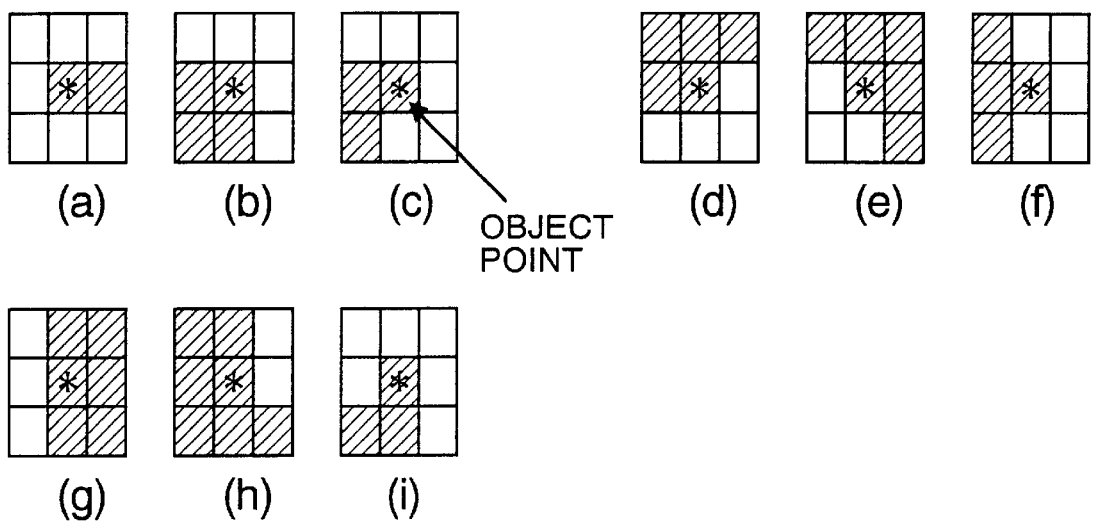
FIG. 17 is a view showing the specific examples of an edge detection window.

The following will explain the undefined block processing executed by the majority/integration decision section 28 with reference to FIGS. 15 to 17.

When the multi-hierarchical binary image is divided into blocks, in the case an edge portion of the image is present in the block, the number of motion pixels can be obtained. However, in the case where all image data in the block are in "1" regions and the regions are adjacent to each other, the number of motion pixels cannot be found in the block region.

In such a case, the number of motion pixels in this block region is set to be undefined (e.g., flag is set at 1) at the time of detecting the motion vector, and is temporarily registered as distinguished from the other blocks. Then, the number of motion pixels and the direction thereof in an undefined block FT region sandwiched by the known block KT region are obtained from the known block KT. Since the undefined block FT region has the same motion as the known block KT region, the same value of the umber of motion pixel as in the around known block KT is adopted.

As a specific method, an image map method is considered. For example, in the case of the so-called VGA type having the binary image size of 640 pixels in the horizontal direction and 480 pixels in the vertical direction, when the detection block KB for the motion vector is composed of 16×16 pixels, the number of blocks is 1200, which is obtained by divided horizontal 40 regions and vertical 30 regions, as shown in FIG. 16. As a result, the undefined block FT can be obtained from the shape of the known block KT surrounding the undefined block FT as an image map of 40×30 pixels. Here, the undefined block FT is set as a region of binary image data "1" and the known block KT is set as a region of binary image data "0."

In this method, there is used an edge detection window operator of 3×3 as shown in FIG. 17. FIG. 17 shows nine examples of the combinations of 3×3 edge detection patterns. A block image of 40×30 is scanned through the window. Then, if there is a portion matching with the edge pattern on a basis of a notice point, the portion is regarded as a boundary portion between the undefined block FT region and the known block KT region, and the undefined block FT is replaced with the known block KT. The number of motion pixels of the undefined block FT is equal to that of the known block KT including the notice point.

Next, the following will explain a linear interpolation method, which is a high accurate method.

FIG. 18 shows the relationship between the blocks including the undefined blocks according to this method. The steps of the linear interpolation method in this case are carried out as follows:

In FIG. 18, the search of known block of a flag "−1" is performed to the right direction from a object block as a base. If such a block is present, the motion vector of the block is extracted, and the block is set as a reference block 1. At this time, the motion vector at the position of the reference block 1 is shown by (x1, y1), and a distance from the object block is set as d1. Note that a motion vector is represented by the number of motion pixels and a motion direction of motion pixels (+/−).

Next, the search of (the) known block of a flag "−1" is performed to the left direction from the object block as a base. If such a block is present, the motion vector of the block is extracted, and the block is set as a reference block 2. At this time, the motion vector at the position of the reference block 2 is shown by (x2, y2), and a distance from the object block is set as d2.

Moreover, the search of known block of a flag "−1" is performed to the upper direction from the object block as a base. If such a block is present, the motion vector of the block is extracted, and the block is set as a reference block 3. At this time, the motion vector at the position of the reference block 3 is shown by (x3, y3), and a distance from the object block is set as d3.

Finally, the search of known block with a flag "−1" is performed to the lower direction from the object block as a base. If such a block is present, the motion vector of the block is extracted, and the block is set as a reference block 4. At this time, the motion vector at the position of the reference block 4 is shown by (x4, y4), and a distance from the object block is set as d4.

Thus, the weight to each reference block is calculated from the distance between the reference block, which is extracted by searching in the right, left, upper and lower directions, and the object block. Then, the motion vector of the object block is obtained in accordance with the following equations for the linear interpolation method using the weights and the motion vectors of the reference blocks.

From FIG. 18, the weight to each reference block is given by the following equations.

$$W1=(d1/(d1+d2+d3+d4))^{-1}$$
$$W2=(d2/(d1+d2+d3+d4))^{-1}$$
$$W3=(d3/(d1+d2+d3+d4))^{-1}$$
$$W4=(d4/(d1+d2+d3+d4))^{-1} \qquad (1)$$

Then, the motion vector (mx, my) of the object block to be obtained by the linear interpolation is given by the following equations.

$$mx=((x1 \times w1)+(x2 \times w2)+(x3 \times w3)+(x4 \times w4))/A \qquad (2)$$
$$my=((y1 \times w1)+(y2 \times w2)+(y3 \times w3)+(y4 \times w4))/A \qquad (3)$$

where, A=w1+w2+w3+w4

The above equations are repeated the number of times corresponding to the number of blocks, and the motion vector of the undefined block can be obtained by the linear interpolation.

Figure 19:
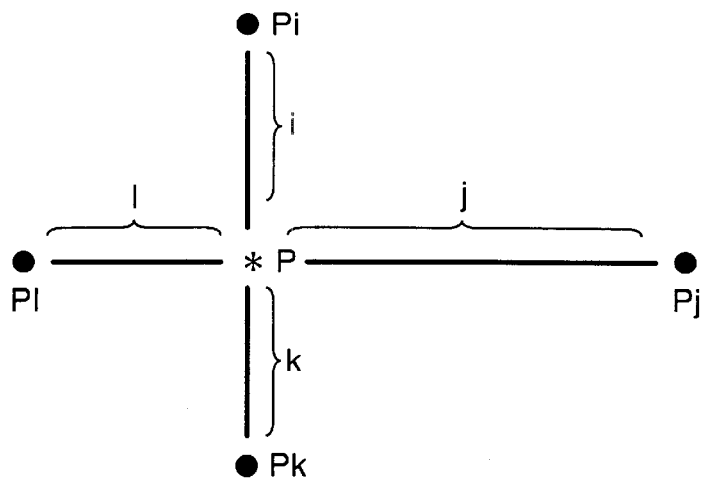
FIG. 19 is a view showing the positional relationship of a linear interpolation in the undefined block processing.

FIG. 19 is a graph showing the positional relationship of the linear interpolation.

Here, if i, j, k and, l are respective distances from the notice point P, and Pi, Pj, Pk and, Pl are respective values of point separated from P by i, j, k, and l, the interpolation equations of the object block position P are expressed as follows:

$$Ii=(i/(i+j+k+l))^{-1}$$
$$Ij=(j/(i+j+k+l))^{-1}$$
$$Ik=(k/(i+j+k+l))^{-1}$$
$$Il=(l/(i+j+k+l))^{-1} \qquad (4)$$

where the weight to each point is I.

Therefore, the value (Px, Py) of the point to be obtained is given as follows:

$$Px=((Pix \times Ii)+(Pjx \times Ij)+(Pkx \times Ik)+(Plx \times Il))/A$$
$$Py=((Piy \times Ii)+(Pjy \times Ij)+(Pky \times Ik)+(Ply \times Il))/A \qquad (5)$$

Here, the following equation (6) is obtained.

$$A=(Ii+Ij+Ik+Il) \qquad (6)$$

As mentioned above, the motion vector of the undefined block FT for each of R, G and B images is obtained from the number of motion pixels of the known block KT by the equations. Next, the motion vector value of each block is obtained from the motion vector of each of R, G, and B by the integration processing such as the majority decision.

Here, the specific content of the integration process using the majority decision processing will be explained with reference to the flowchart of FIG. 20.

The motion directions and the numbers of motion pixels of the respective blocks of R, G, and B images should be the same since these blocks are the same with respect to the R, G and B images. In some cases, however, a calculation error is generated due to the binary calculation and comparison section in the block of the object image.

To deal with such a case, the number of motion pixels in x and y directions for each block is input (S1), and it is determined whether or not x and y moved directions match with each other for each of R, G and B images (S2). In this case, in a correction/selection of the moved direction (S3), it is determined whether or not the polarity of moved directions of motion pixels in the x and y directions of each block of R, G, and B respectively output from the binary calculation/comparison detection blocks 26 and 27. The x and y motion directions has a polarity based on the coordinate axes of the first to fourth quadrants. Then, it is determined whether or not the reference marks are the same as each other with respect to R, G and B. With respect to x and y directions of the motion direction in each of R, G and B images, the majority decision processing is provided to the polarity of the corresponding block and those of the block adjacent thereto. Then, the result of the majority decision processing is registered in the motion vector table 29 (S6) as the motion direction. The accuracy of the motion direction is improved by such means.

Similarly, in a correction/selection of the number of pixels (S5), it is determined whether or not the number of motion pixels of R, G and B images in the x and y directions respectively output from the binary calculation/comparison detection blocks 26 and 27 are the same as each other with respect to R, G and B images (S4). If the number of motion pixels of the respective R, G and B images is completely different from each other, there is adopted an average value of values obtained by performing the weighting on each number of motion pixels from the central value to closer value in order. The average value is registered to the vector table 29 as the number of motion pixels (S6). The average value is normally obtained by counting fractions of 5 and over as a unit and disregarding the rest.

For example, it is assumed in the R, G and B images that the numbers of motion pixels in the x direction are 6, 5, and 2, and that the weights are 2, 3, and 1, respectively. The number of motion pixels in the x direction is a value, which is obtained by dividing (2×6+3×5+1×2) by (2+3+1), that is, five pixels.

This can be applied to the case where two same numbers are present as the number of motion pixels for each of R, G and B images. For example, it is assumed in R, G, and B images that the numbers of motion pixels in the x direction are 2, 5, and 2, and that the weights are 2, 3, and 1, respectively. The number of motion pixels in the x direction is a value, which is obtained by dividing (3×2+1×5+2×2) by (3+1+2), that is, three pixels. The number of motion pixels in the y direction may be performed in the same way as in the x direction.

Next, the following will explain the integration processing for improving the accuracy of the motion vector.

Figure 21:
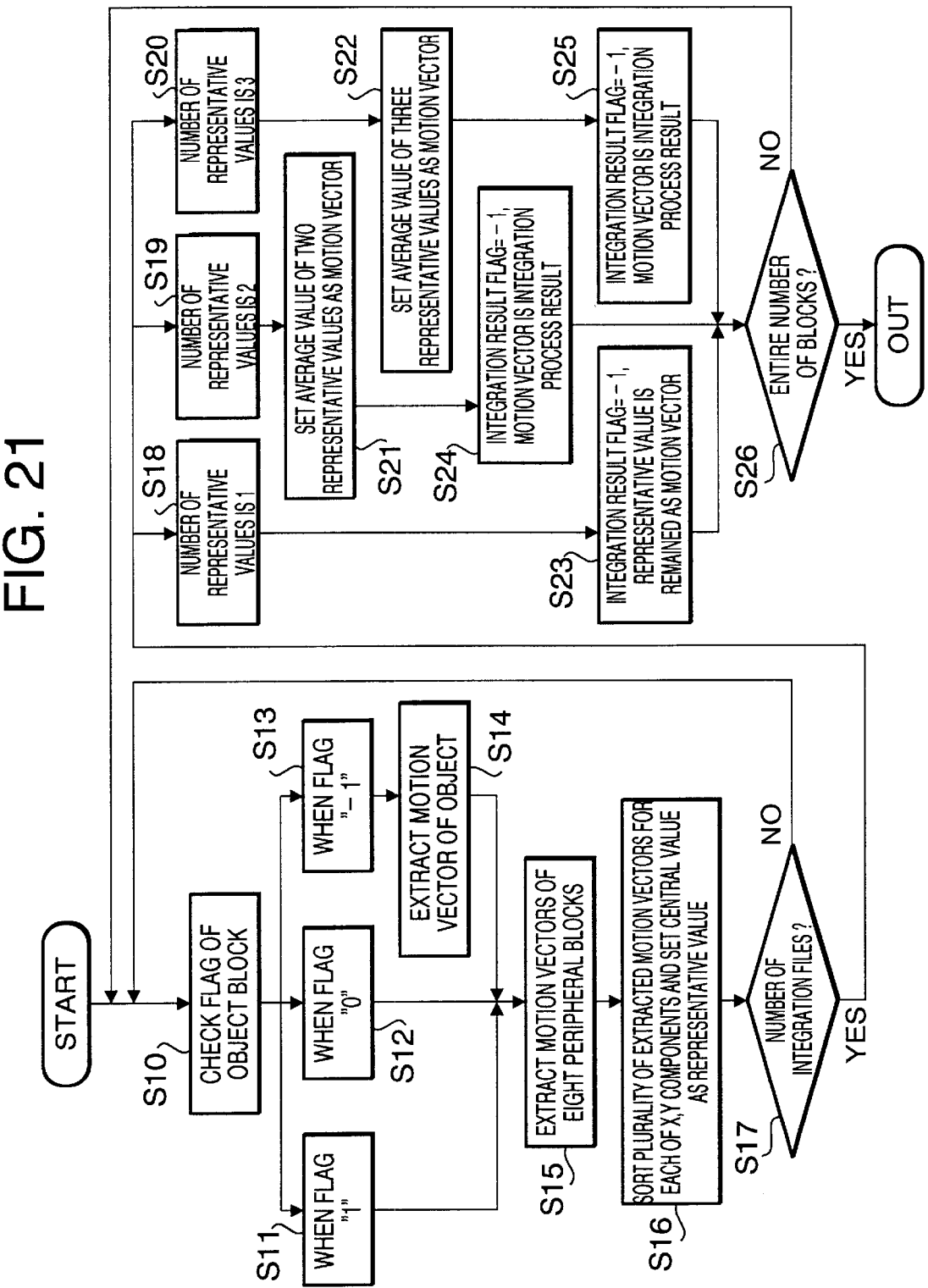
FIG. 21 is an operation flowchart of an integration processing.

FIG. 21 is an flowchart for obtaining one motion vector from the motion vector value of each of the R, G, and B images.

Figure 20:
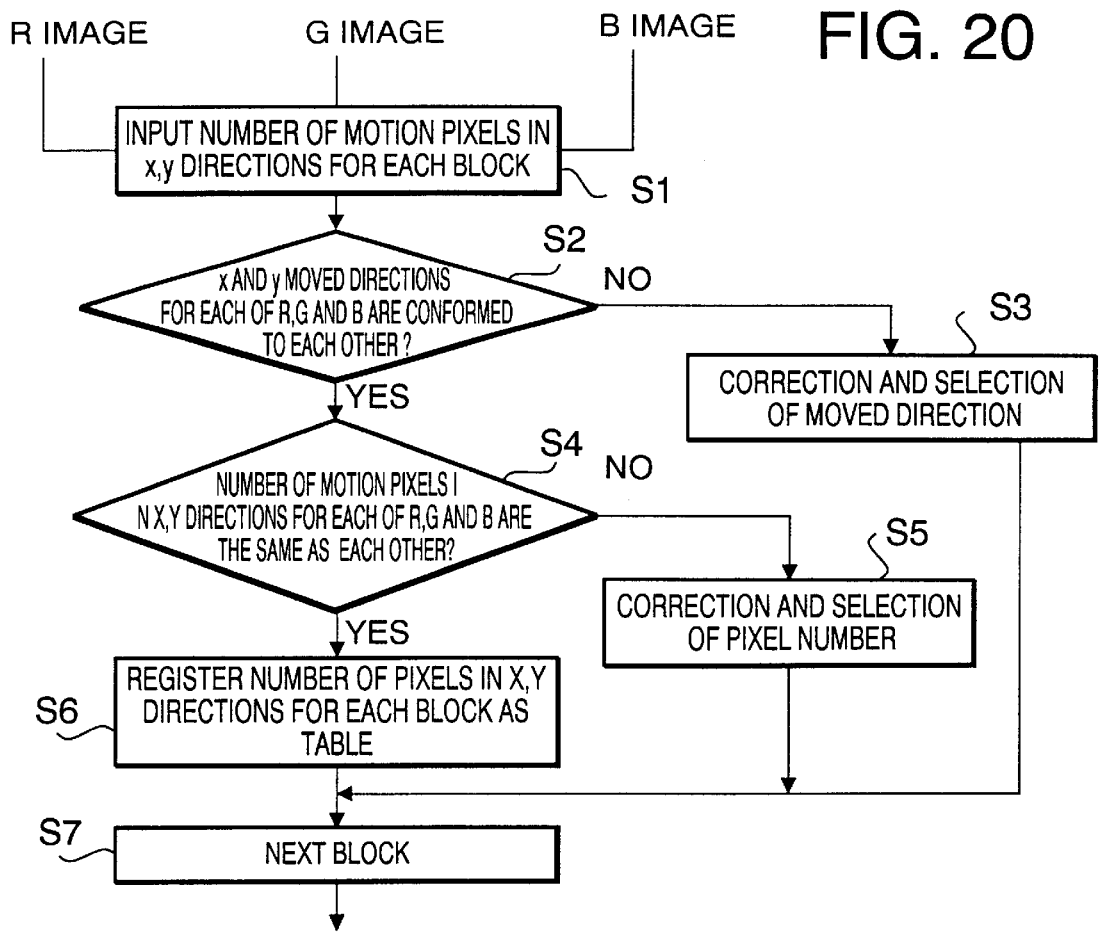
FIG. 20 is a flowchart of a majority decision processing.

In the integration processing shown in FIG. 20, there is generated a block in which the obtained value of the motion vector does not match the real value in the point of the accuracy because of the calculation processing for only the object block of each of the R, G, and B images. This examination result suggests the points that whether the object block is the undefined block or the known block must be clarified, and the motion vectors of the peripheral blocks surrounding the object block must be taken into consideration in order to improve the accuracy.

Therefore, as shown in the flowchart of FIG. 21, in this integration processing, the flag of the object block is checked (S10). When the flag is '1' (S11) and '0' (S12), no motion vector of the object block is extracted. Only when the flag is '−1' (S13), the motion vector of the object block is extracted (S14). Thereafter, motion vectors of peripheral eight adjacent blocks surrounding the object block are extracted (S15), and the extracted motion vectors are sorted for each of x and y components, and a central value among from those values is set as a representative value (S16).

The above processing is executed up to the number of R, G and B images to be integrated (S17), and the following processing is executed corresponding to the number of representative values. The representative values are represented respectively for each component of R, G and B. When the number of representative values is one (S18), the motion vector value of the object block, as an integration result, is set at flag=−1 and the representative value remains unchanged (S23). When the number of representative values is two (S19), that is, the case where the number of object blocks is an even number, the average value of two representative values is obtained (S21). The motion vector value of the object block, as an integration result, is set at flag=−1, and the average value calculation result is adopted (S24). When the number of representative values is three (S20), the average value of three representative values is obtained (S22). The motion vector value of the object block, as an integration result, is set at flag=−1, and the average value calculation result is adopted (S24). This processing is executed until the total number of blocks (S26), thereby obtaining the motion vector value of the object block.

Figure 22:
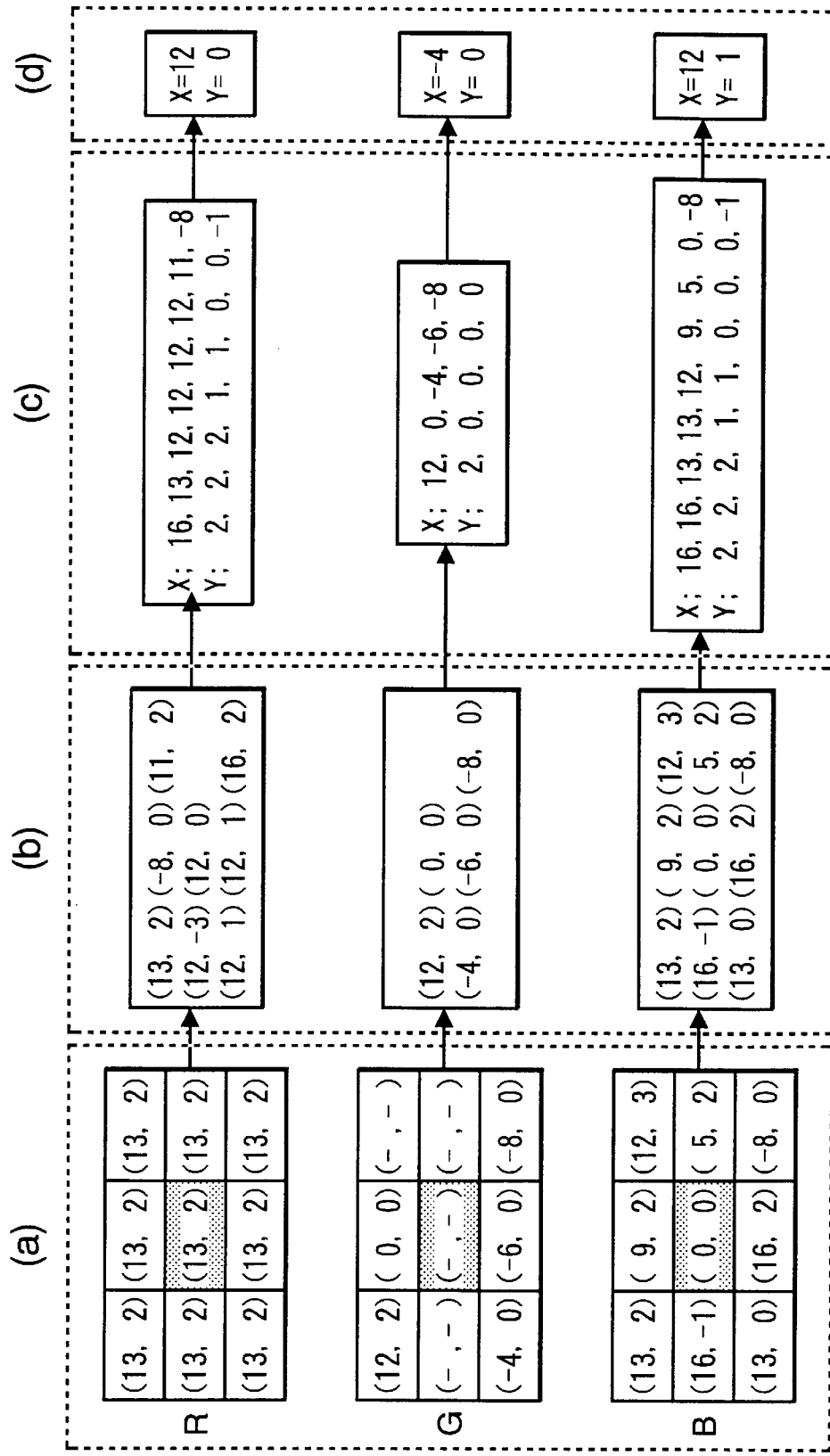
FIG. 22 is a view showing the calculation of the integration process.

Moreover, FIG. 22 shows examples of the integration processing for obtaining one motion vector from motion vectors of the object block and the eight adjacent blocks.

FIG. 22(*a*) shows an example in which motion vector values of the object block and the eight adjacent blocks are extracted with respect to the motion vector of each of the R, G and B images. At this time, the block marked by mesh lines is the object block. The blocks marked by (−, −) in the figure show blocks in the area (flag=0) where no motion vector is detected.

FIG. 22(*b*) shows a time when blocks having effective motion vector are extracted using the R, G and B vectors.

FIG. 22(*c*) shows steps of sorting the R, G and B motion vectors for each of x and y directions in order of decreasing the numeral value, respectively.

FIG. 22(*d*) shows examples of calculating the representative values of the R, G and B motion vectors of R, G and B images, respectively. In this case, when the number of data of the motion vectors is an odd number, the central value is selected among from arranged values, and when the number of data is an even number, the average value of two central values is calculated. At this time, the motion vector value is obtained by discarding the fractional portion of the number. In this way, the respective representative values of R, G and B images are obtained.

By use of the above result, the integration processing is carried out in the manner shown in FIG. 21. Namely, when the number of representative values is one, the representative value remains unchanged. When the number of representative values is two, the average value of two representative values is adopted. When the number of representative values is three, the average value of three representative values is adopted. The calculation of the average value is obtained by counting fractions of 0.5 and over as a unit and disregarding the rest in any case.

The result of the motion vector in this case can be given by the following equation:

$X=(12+12-4)/3=7$ $Y=(1+1+0)/3=1$ (7)

Therefore, the motion vector in the X direction is '7', and the motion vector in the Y direction is '1'.

According to the result of the above integration processing, in the VGA type having 640×480 pixels, since the detection block has 16×16 pixels, the total number of detection blocks is 1200. The averaged error obtained by this integration processing is improved about 20% as compared with the system previously mentioned, extreme variations in the motion vector are not shown, and there can be obtained the result in which the entire motion vector can be correctly reflected.

Thus, the respective numbers of the motion pixels obtained for the R, G and B images are integrated into one value for each block, and registered into the motion vector table as the number of motion pixels.

Next, the following will explain the processing content of the correction processing block 4.

Figure 7:
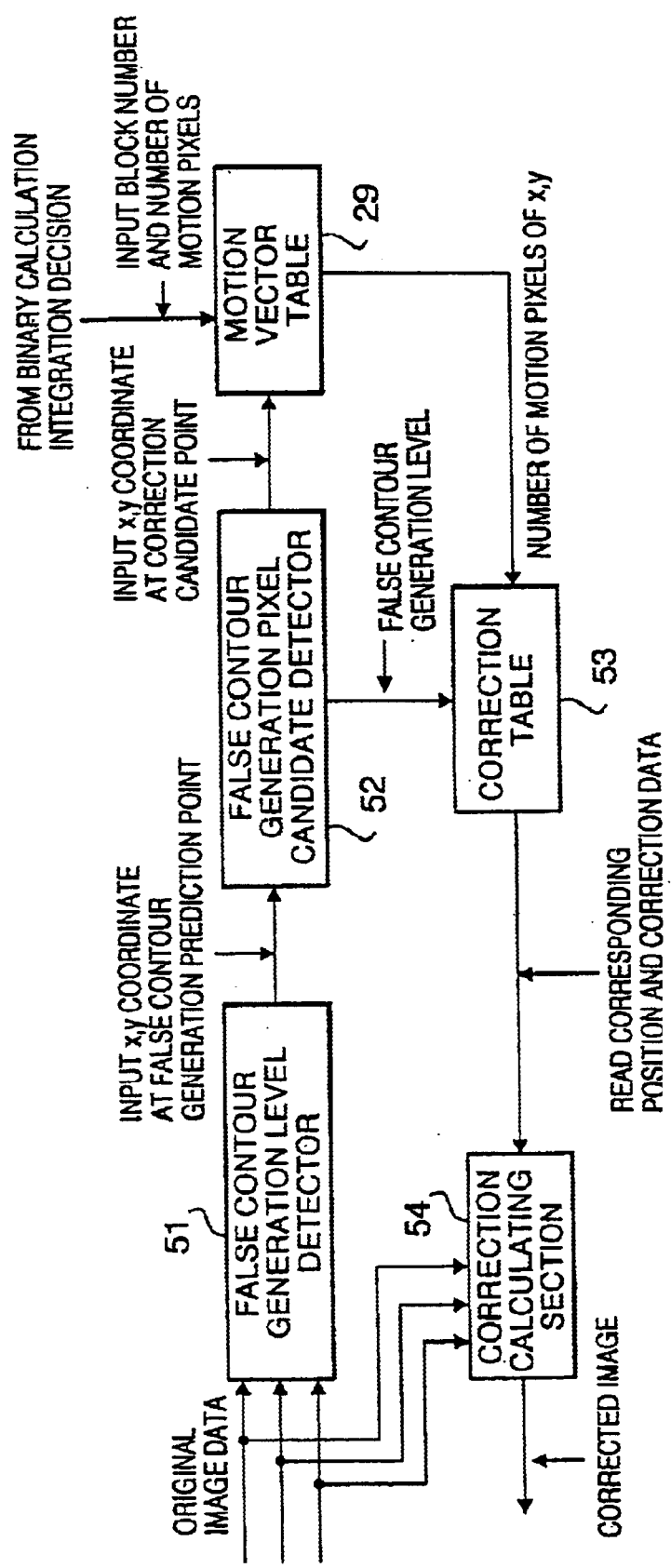
FIG. 7 is a structural view of a data correction processing section.

The configuration of the data correction processing section 4 is shown in FIG. 7. Motion vector information of each detection block KB of the present field is registered in the motion vector table 29.

The structure of the motion vector table 29 is shown in FIG. 8. FIG. 8 presents an example of the motion vector table in the case of the VGA type, which can display the image having 640 pixels in the horizontal direction and 480 pixels in the vertical direction. In this case, if the detection block has 16 pixels in the horizontal direction and 16 pixels in the vertical direction, the total number of blocks is 1200, and the number of motion pixels and the direction of each block are registered in table with respect to each block. Here, the upper left portion of each block is set as an origin of coordinates. The block number of the detection block KB, an offset value from the origin of the detection block KB, and the number of motion pixels (including the moved direction) from the previous field of the detection block KB are registered in order of the detection block in which the motion detection of the present field image has been finished.

FIG. 9 shows a partial structure of a correction table 53, and FIGS. 10 and 11 show the specific table structure. The correction table 53 has correction data registered thereto in a state that the motion direction in the detection block KB is divided into first to fourth quadrants. In the first quadrant, each correction data is registered corresponding to the number of motion pixels in the x direction (+ direction) as the horizontal direction. In the second quadrant, each correction data is registered corresponding to the number of motion pixels in the y direction (+ direction) as the vertical direction. In the third quadrant, each correction data is registered corresponding to the number of motion pixels in the x direction (− direction) as the horizontal direction. In the fourth quadrant, each correction data is registered corresponding to the number of motion pixels in the y direction (− direction) as the vertical direction.

FIG. 10 is a matrix table showing that correction data with respect to the motion to the + direction and − direction the first and third quadrants corresponds to the change of the signal level and the position.

Similarly, FIG. 11 is a matrix table showing that correction data with respect to the motion to + and − directions in the x direction, i.e., the motion to the second and fourth quadrants, corresponding to the change of the signal level and the position thereof. In this explanation, correction data is not written.

In the correction processing block 4, original image data of the present field is input to a false contour generation level detector 51. The false contour generation level detector 51 detects x and y coordinates of a false contour generation predictive point where the generation of the false contour is predicted by the signal level of each pixel from the present field image. As mentioned above, since the signal level at which the false contour is generated is close to the signal level boundary of N power of 2, the pixels close to the signal level boundary of N power of 2 are extracted.

All false contour generation predictive points detected in the false contour generation level detector 51 are provided to a false contour generation pixel candidate detector 52. The false contour generation pixel candidate detector 52 specifies the pixel position, which is recognized as a false contour at a real display in view of visual characteristics, from the false contour generation predictive points as a candidate of false contour generation pixel. In specifying the pixel position recognized as a false contour at the real display, the generation density at the false contour generation predictive point is considered.

As the processing for this case, it is possible to detect the density of the candidate point by the window operator of 3×3 or 5×5 around the x and y coordinates at the false contour generation predictive point. It is possible to determine whether or not the correction processing is performed by the number of detection points when the candidate point is isolated at one point.

The false contour is actually generated at the false contour generation pixel candidate when the detection block KB, to which the false contour generation pixel candidate belongs, actually shifts.

When the detection block KB, to which the false contour generation pixel candidate belongs, is the shift block, the detection block number and the number of motion pixels in the x and y directions are extracted from the motion vector table 29 to be provided to the correction table 53. In the correction table 53, an amount of correction is registered corresponding to the number of motion pixels. The correction table 53 is made by the amount of correction predetermined from the visual experiment using the PDP according to the structures of FIG. 10 and FIG. 11.

Correction data specified by the false contour generation level, which is output from the false contour generation pixel candidate detector 52, and the number of motion pixels in the x and y directions, which is extracted from the motion vector table 29, is extracted from the correction table 53, and provided to a correction calculating section 54. In correcting original image data, since correction data for the pixel having the false contour generation level and a motion is provided from the correction table 53 corresponding to the number of pixels and the moved direction thereof, the correction calculating section 54 corrects the signal level to adjust to the visual light amount.

Thus, according to the constitution of the present invention, since the motion detecting processor and the data correcting processor are separated, while having the subordinate relationship therebetween, flexible correction processing can be carried out.

(Second Embodiment)

Figure 23:
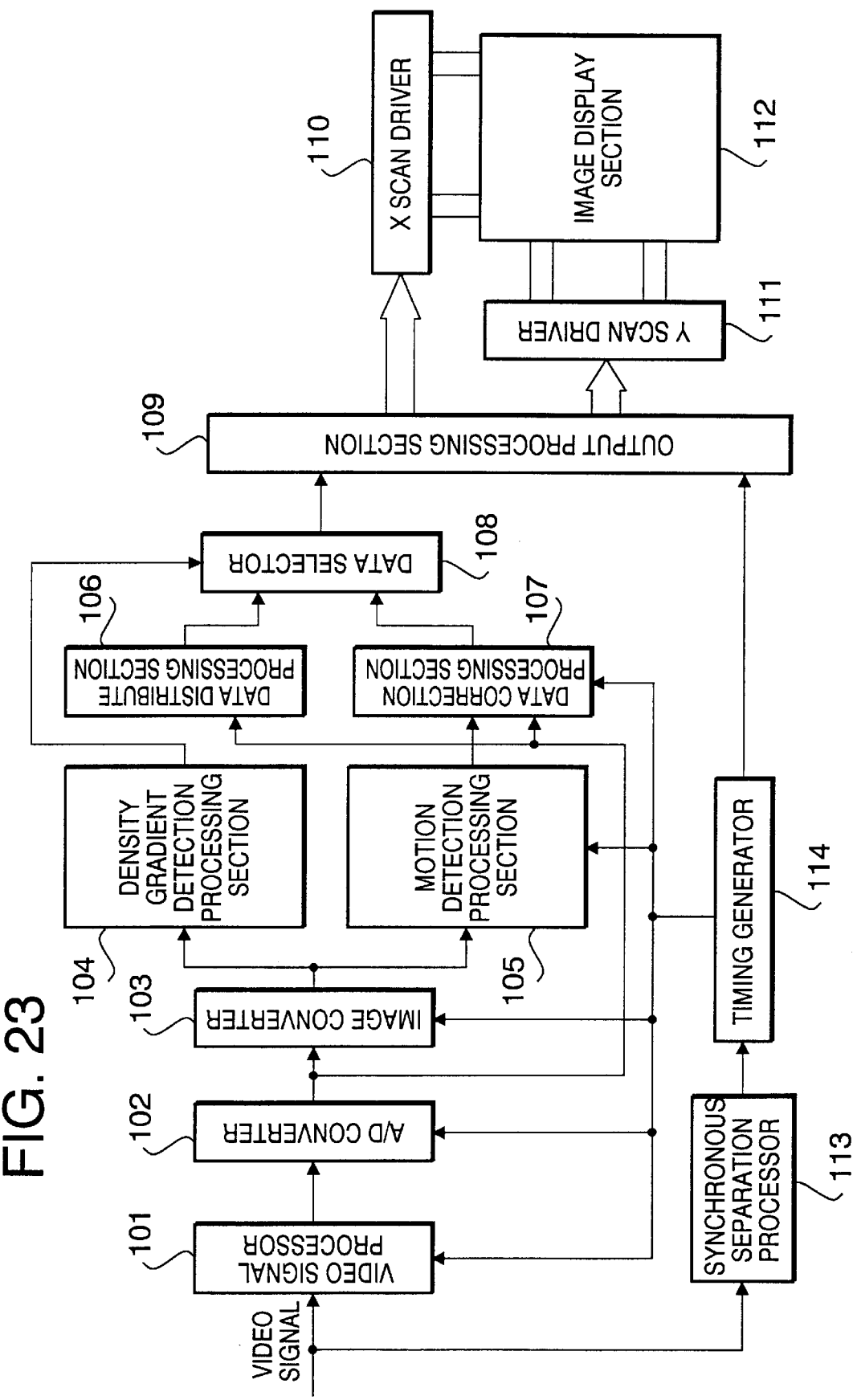
FIG. 23 is a general structural view of the tone image display apparatus according to the second embodiment of the present invention.

FIG. 23 is a general configuration diagram of a tone image display device of a second embodiment of the present invention to which the motion detecting method and the moving picture display method are applied. In the tone image display device in FIG. 23, a video signal processor 101 separates a video signal into the respective color components of R, G and B. An A/D converter 102 converts the video signal to image data of R, G and B, thereafter inputting to an image converter 103, a data distribute processing section 106 and a data correction processing section 107. The image converter 103 converts the respective signals of R, G and B to equivalent luminance signals (Yt) and further carries out the conversion to the present field image and the previous field image and smoothing processing. Then, these image signals are input to a motion detection section 105 and a density gradient detection section 104. The density gradient detection section 104 detects the so-called solid area where a flat portion of the density gradient in the image by use of morphology processing such as an image density difference detection, a binary process, expansion and contraction. The motion detection section 105 carries out threshold processing, block matching processing, and integration determination processing, thereby detecting the number of motion pixels and the moved direction thereof in input images. Information on the number of motion pixels, the moved direction and detection block, which have been detected by the motion detection section 105, are input to a data correction processing section 107. In the data correction processing section 107, combinations of subfield patterns of input pixel position data are calculated based on the result of the number of the motion pixels and the moved direction thereof. Then, reconstruction of subfield data adaptable to the visual light quantity is performed. Thereby, tone data of pixels where the false contour is corrected.

On the other hand, the data distribute processing section 106 carries out data processing which does not depend on the motion detection, such as an error diffusion method. A data selector 108 performs the switching of data to be applied, specifically selects output data from the data distribute processing section 106 or output data from the data correction processing section 107 for each block of the image corresponding to the detection signal from the density gradient detection section 104. The output data is input to an output processing section 109. The output processing section 109 converts tone data of each pixel to the number of pulses corresponding to the voltage apply time to provide it to an X scan driver 110 and a Y scan driver 111. Thereby, the halftone is displayed on an image display 112, which is composed of PDP.

Note that a synchronous separation processor 113 separates a synchronous signal from the video signal, and that a timing generator 114 generates a timing signal synchronized with the input video signal so as to provide to each section.

The following will explain an operation of the tone image display apparatus configured as described above.

The video signal processor 101 separates the video signal into the respective color components of R, G and B. The A/D converter 102 converts the video signal to image data of R, G and B so as to provide it to the image converter 103, the data distribute processing section 106 and the data correction processing section 107.

Figure 24:
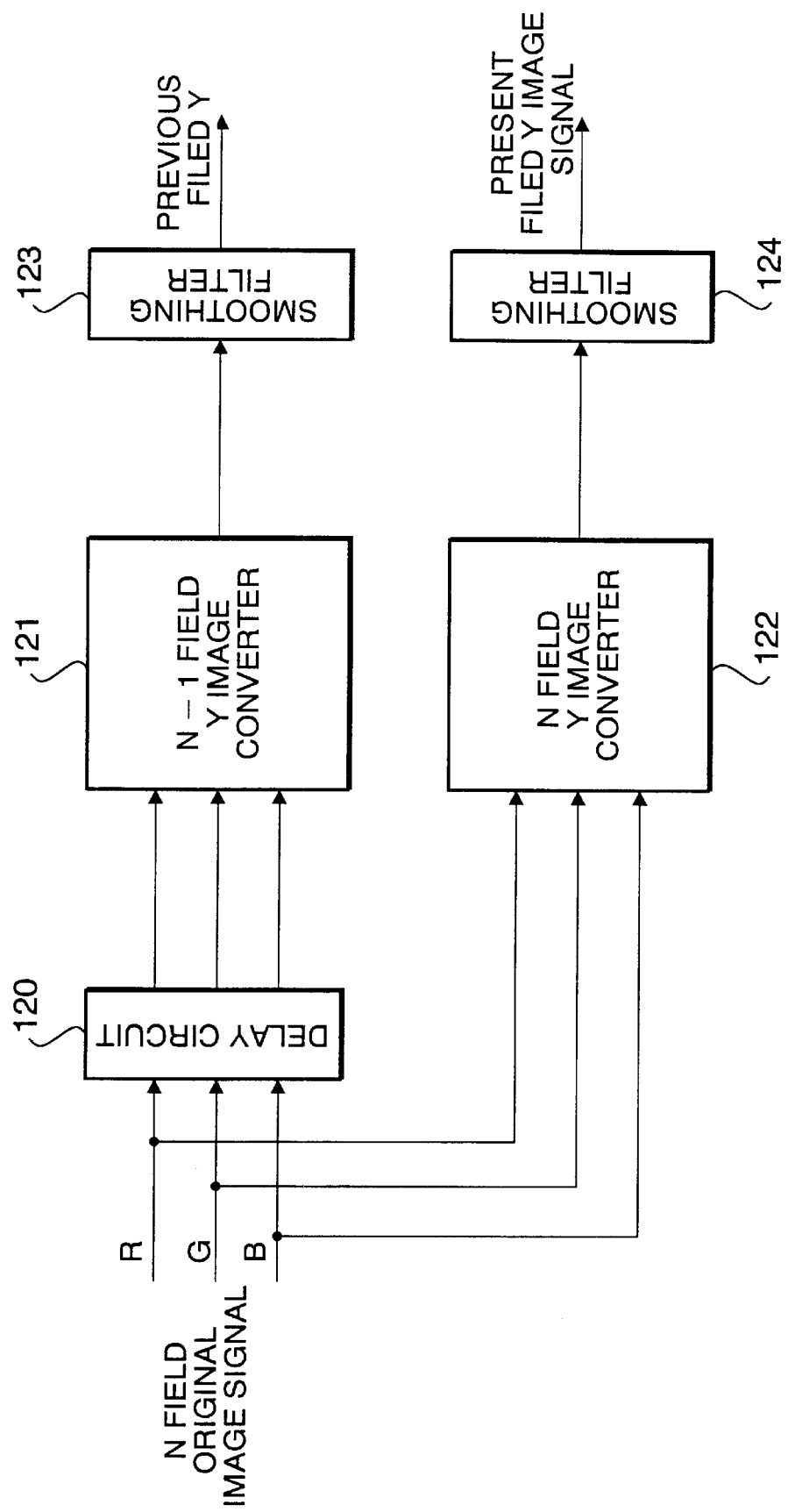
FIG. 24 is a block diagram of a configuration of an image converter in the tone image display apparatus of the second embodiment of the present invention.

The specific block configuration diagram of the image converter 103 is shown in FIG. 24, and the operation will be explained. The original image signals of R, G and B input from the A/D converter 102 are delayed for one field by a delay circuit 120, thereafter these signals are input to an N−1 field Y image converter 121. The N−1 field Y image converter 121 converts each of the input original image signals of R, G and B to an equivalent luminance signal ($Yt_{(N-1)}$) shown in equation (8).

$$Yt_{(N-1)} = (R+G+B)/3 \qquad (8)$$

The N−1 field image signal, that is, previous field Yt image signal is input to a smoothing filter 123 to remove a noise component included in the original image.

Similarly, the original image signals of R, G and B are input to an N field Y image converter 122. The N field Y image converter 122 converts each of the input original image signals of R, G and B to an equivalent luminance signal ($Yt_{(N)}$) shown in equation (9).

$$Yt_{(N)} = (R+G+B)/3 \qquad (9)$$

The N field image signal, that is, present field Yt image signal is input to a smoothing filter 124 to remove a noise component included in the respective original images.

By the way, the conversion of R, G and B signals to normal luminance (Y) signals is generally performed using the following equation (10):

$$Y_{(GEN)} = 0.2998(R) + 0.5968(G) + 0.1144(B) \qquad (10)$$

In equation (10), however, the experiment showed that the ratio of each of R and B signal components to the Y signal component was low so that the motion of the image in the vicinity of the portion where the false contour was generated was correctly detected.

According to the present invention, the contribution ratio of each of the R, G and B signals to the Yt signal is equalized. As a result, the motion detection vector can accurately detected as compared with the system in which the motion detection is obtained for each of the R, G and B signals. Moreover, the use of the conversion system to the Yt signal has the features in which the circuit scale can be decreased to ⅔ as compared with the system in which the motion detection is obtained for each of the R, G and B signals and the cost reduction and the high-speed calculation can be realized. The Yt image signal is hereinafter referred to simply as a Y signal.

Figure 25:
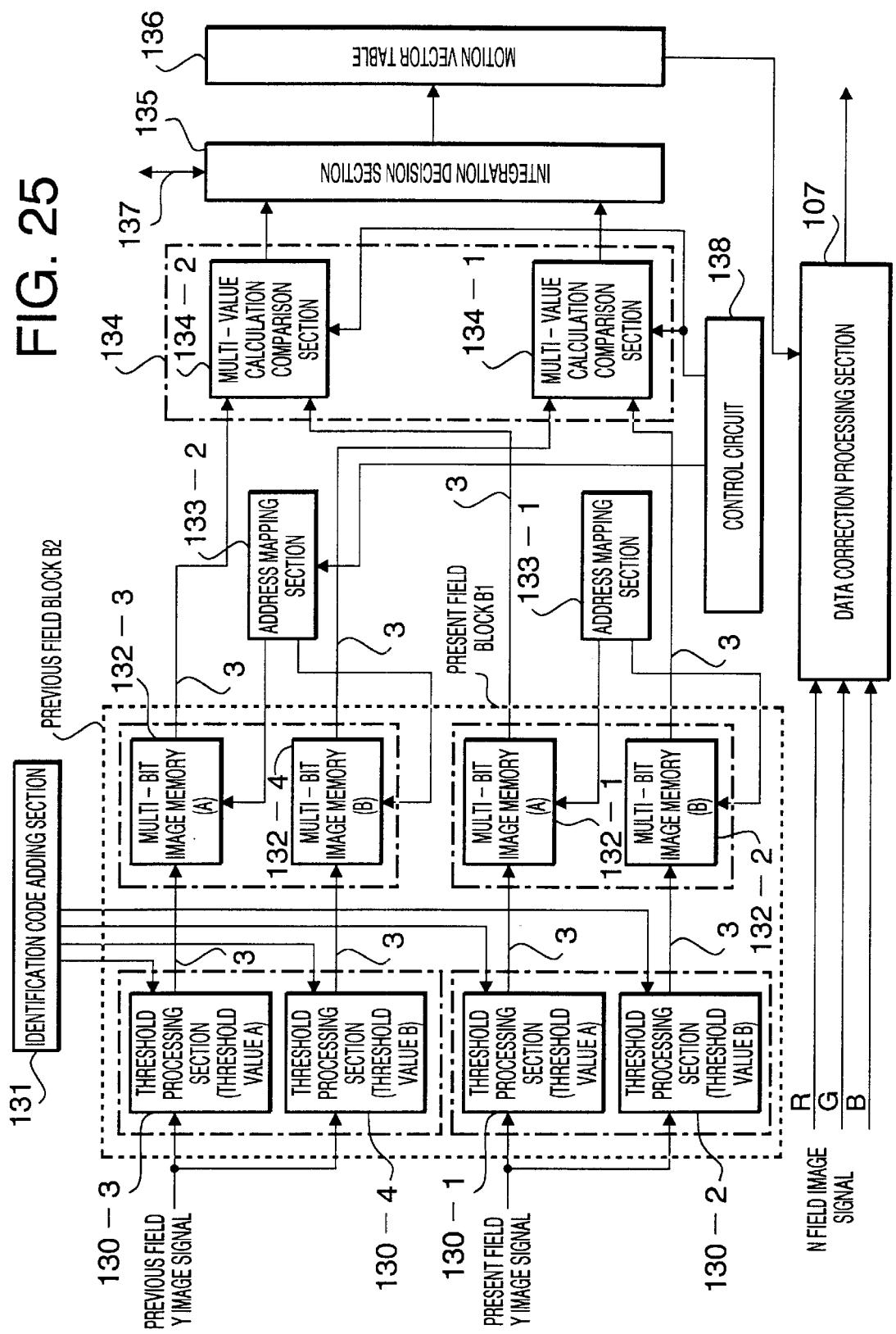
FIG. 25 is a block diagram of a configuration of the motion detection section in the tone image display device of the second embodiment of the present invention.

The specific block diagram of the motion detection section 105 is shown in FIG. 25, and the operation will be explained. The motion detection section 105 generates identification codes to the present field Y image signal and the previous field Y image signal in two threshold groups having a different threshold level, respectively, thereby converting the present field Y image signal and the previous field Y image signal to multi-bit images (identification code images). The multi-bit images are once stored in an image memory. In connection with the multi-bit images read from the image memory, the motion vector is obtained for each threshold group, and an integration determination section 135 integrates the motion vectors from two threshold groups.

In the threshold process in the present field block B1, the present field Y image signal input from the image converter 103 is input, Y image signal threshold processing sections 130-1 and 130-2 generate identification codes to the present field Y image signal in the divided region in accordance with the pixel level, thereby outputting the multi-bit image. At this time, the generation of multi-bit image from the Y image signal occurs in two threshold groups (threshold groups (A) and (B) in FIG. 26,), that is, the divided region in accordance with the pixel level. Then, an identification code adding section 131 adds the identification code of 3 bits to the Y image signal by in accordance with each of the divided regions of threshold values a1 to g2 and h1 to q2. Note that an identification code "0" is added to the Y image signal if the Y image signal is out of the range of the divided area. In the example shown in FIG. 26, since each of the identification code is set to 3 bits, eight kinds of divided regions can be selected and these regions are classified into threshold groups A and B, respectively.

These two threshold groups (A and B) are allocated to the present field Y image signal and the previous field Y image signal, respectively, and the generation of the identification codes are carried out. Then, the block matching process is performed for each identification code. As a result, the motion vector can be detected with higher accuracy than the conventional block matching using two images. Multi-hierarchical image data obtained for each threshold group is stored in each of multi-bit image memories 132-1 and 132-2.

A previous field block B2 has the same structure as in the above-explained present field block B1. Specifically, in threshold processing sections 130-3 and 130-4, the identification code adding section 131 adds identification code to the previous field Y image signal input as mentioned above for each of the threshold groups (A and B) according to the pixel level. Then, multi-bit tone image data (identification code image) obtained for each threshold group is stored in each of multi-bit image memories 132-3 and 132-4.

Note that the divided regions of each of the threshold groups A and B may be set to be overlapped each other or not to be overlapped each other.

In the block matching process for detecting the motion vector, an address mapping section 133-1 performs the address mapping of the detection block KB to be cut from the present field image. Then, an address mapping section 133-2 performs the address mapping of the reference block RB to be cut from the previous field image. Image data of each of the detection block KB and the reference block RB is input to a motion vector detector 134.

The motion vector detector 134 comprises multi-bit calculation and comparison sections 134-1 and 134-2 provided for each of the threshold groups A and B. The inter-field image motion can be obtained by the block matching.

An integration/determination section 135 determines the number of motion pixels and the moved direction of each detection block KB, and registers the determination result to a vector table 136.

The density gradient detection section 104 detects the flat portion of the density gradient of the Y image signal. Specifically, the density gradient detection section 104 detects the density difference in the Y image signal, and extracts a portion where the density difference is smaller than the set value. Then, isolation noise is removed by the morphology process so as to detect a flat area.

The data correction processing section 107 performs calculation obtaining the combination of the subfield patterns for inputted position of pixel based on the motion vector table 136 in which the number of the motion pixels and the moved direction are stored. Then, reconstruction of subfield data adjusting to the visual light quantity is performed, and tone of pixels where the false contour is generated is corrected.

The data distribute processing section 106 distributes the Y image signal to improve the quality of the image without causing any troubles when the motion detection is performed by e.g., an error diffusion method, a pixel distribution method.

The data selector 108 performs the switching of whether output data from the data distribute processing section 106 is used or output data from the data correction processing section 107 is used for each block of the image in accordance with the detection signal from the density gradient detection section 104.

The output data is input to the output processing section 109. The output processing section 109 converts tone data of each pixel to the number of pulses corresponding to the voltage applied time to be sent to the X scan driver 110 and the Y scan driver 111. Thereby, the halftone is displayed on the image display 112 having PDP.

Figure 27:
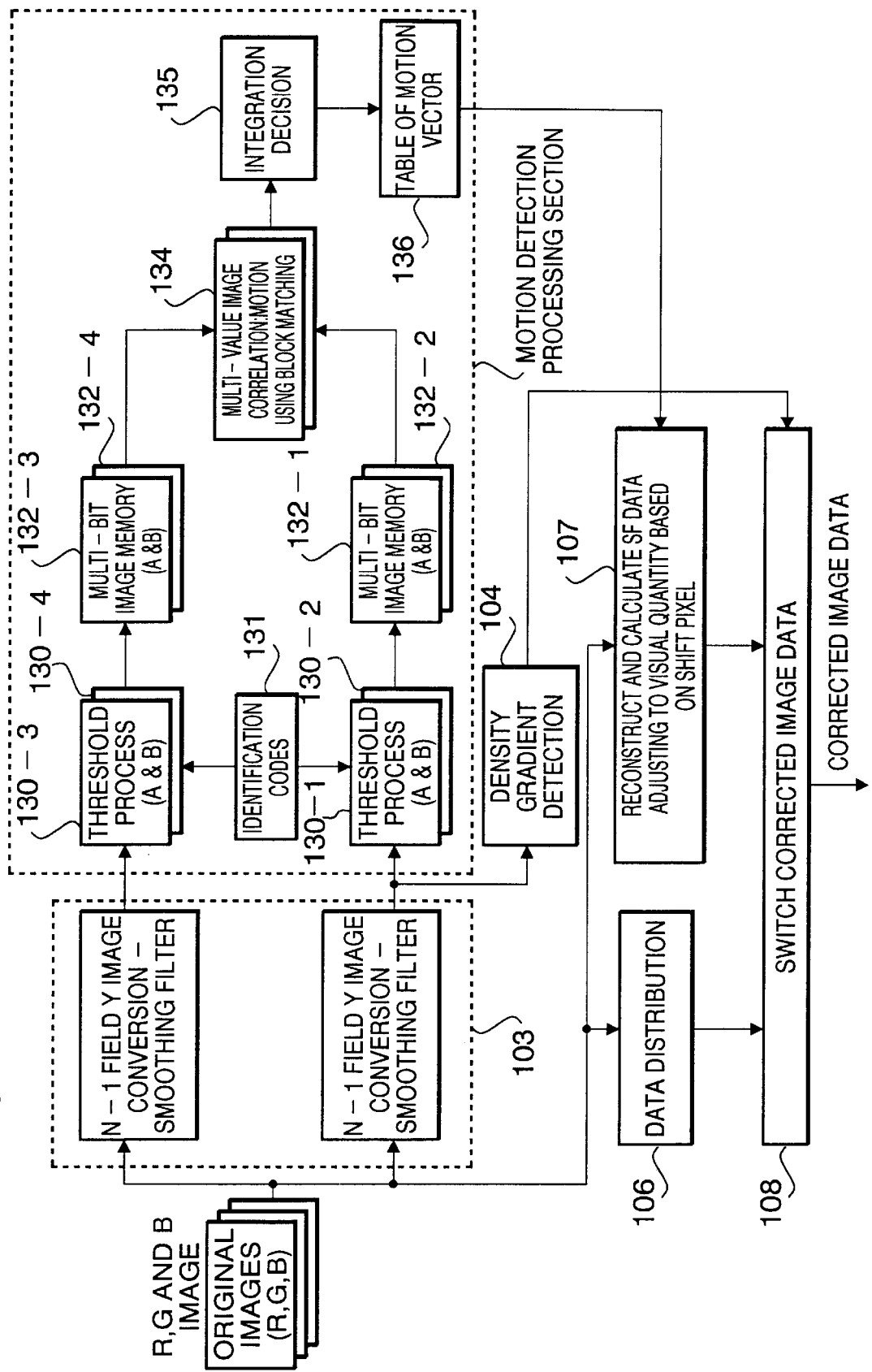
FIG. 27 is a view showing a general processing flow of the tone image display apparatus of the second embodiment of the present invention.

Next, the motion detection section 105, the density distribution detection section 104, the data distribute processing section 106, the data correction processing section 107, and the data selector 108 will be specifically explained with reference to FIG. 27.

First of all, the motion detection section 105 will be specifically described.

Figure 28:
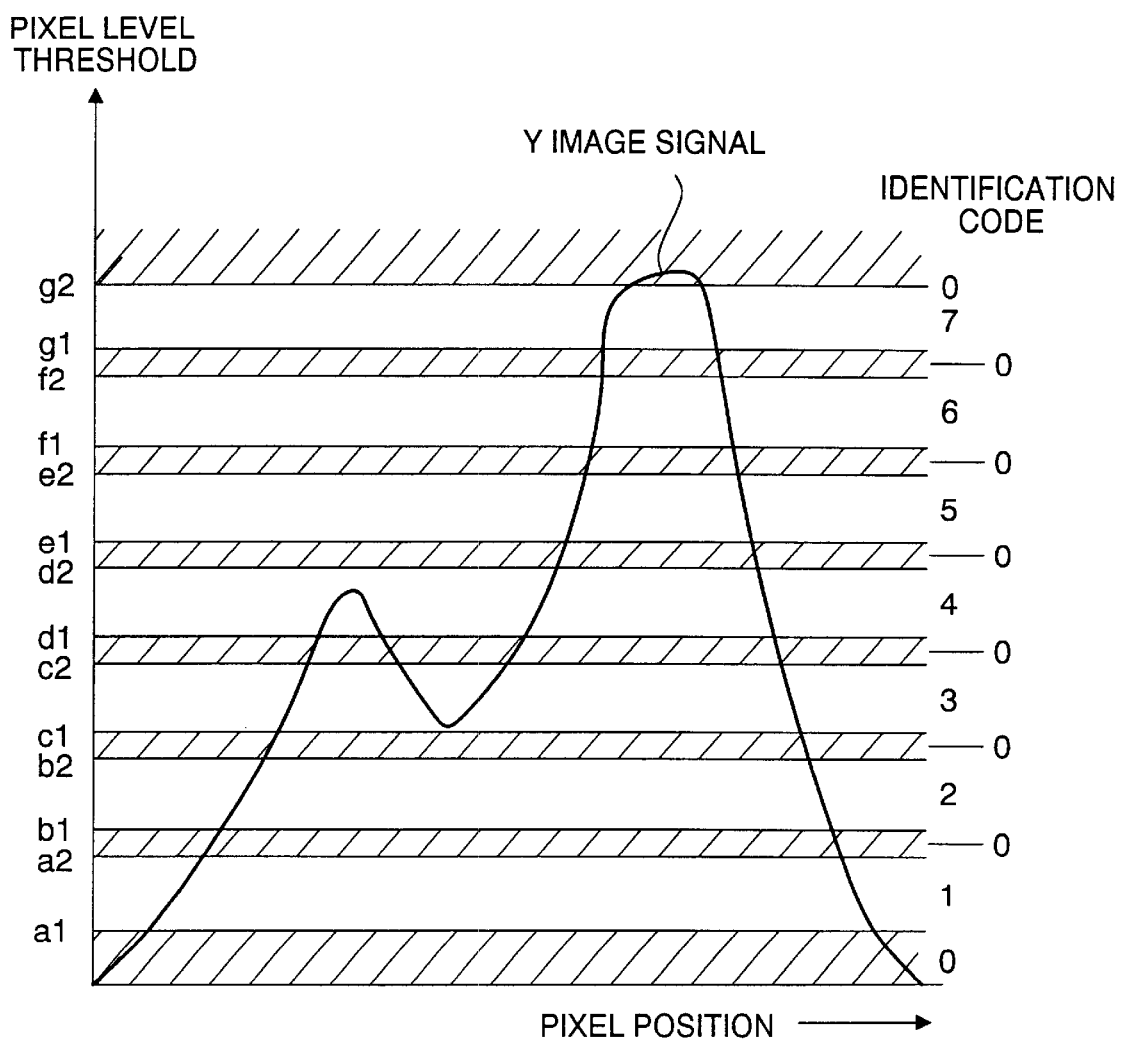
FIG. 28 is a view showing the relationship between the multi-hierarchical image and the threshold value on a sample image in the second embodiment of the present invention.

The threshold processing sections 130-1 to 130-4 performs identification coding process to the present field Y image signal and the previous Y image signal in the respective set divided regions. Here, the concept of the identification coding (multi-bit image) will be explained with reference to FIG. 28. In FIG. 28, a horizontal line denotes a pixel position and a vertical line denotes a pixel level. The pixel level of the Y image signal is divided to (n) regions based on n threshold a1 to g2 (n=8 in the figure) shown in FIG. 26. Then, a different threshold value is provided to each region such that the respective threshold values are not be overlapped with each other in the adjacent regions. The identification code is assign to each pixel, depending on which region the pixel value belongs to. Then, as mentioned above, the input signal levels are grouped into two threshold groups A and B based on the identification code allocated for each threshold code, and the present field image and the previous field image are converted to the multi-bit images (identification code images). Note that "0" is provided to the pixel as an identification code if the pixel value of the oblique lined region is out of the threshold range.

This threshold process can show the local change of the image without being influenced by the deviation of the pixel value distribution. Therefore, the motion vector for each of the identification codes (1 to 7) reflects the characteristic of the original image even in the small amount of regions such as a block. The motion of the pixel where the false contour is generated may be detected extremely locally, with the result that calculation period and the circuit structure can be simplified.

Multi-bit image data of the present field and that of the previous field, which are subjected to the identification coding process by the multi-bit threshold processing sections 130-1 to 130-4, are stored to the multi-bit image memories 132-1 to 132-4, respectively, and subjected to a next block matching process.

The block matching process in the motion vector detector 134 can execute the block matching process explained in the first embodiment.

The conventional block matching using the binary image is determined by the evaluation function value. Then, the detection of the motion vector is performed by searching the minimum evaluation function value to be given from a large number of reference blocks RB contained in the reference region R. Actually, as shown in equation (11), the maximum coincidence point of the pixel number counted value was obtained between the binary image gt (x, y) of the detection block KB and the binary image gt−1 (x, y) of the reference block by an exclusive-OR operation. Then, the obtained maximum coincidence point was used as a motion vector of the detection block KB, $$Dnt(i,j)=\Sigma\Sigma\{g_t(x,y)\oplus g_{t-1}(x-1,y-1)\} \quad (11)$$

At this time, the position (i,j) where Dnt is minimized is defined as a motion vector of each detection block. This is equal to the case of finding the location where the correlation value is maximized in the reference region RB for each detection block KB.

According to the block matching in the embodiment of the present invention, not only the coincidence of the number of pixels but also the identification code as detection information are referred at the same time, thereby making it possible to largely improve the detection accuracy of the motion vector. This can be expressed by the following equation (12).

$$Dnt(i,j) = \sum_i \sum_j \sum_{k=1}^{7} \{g_{tk}(x,y) \oplus g_{(t-1)k}(x-1, y-1)\} \quad (12)$$

Here, k is the identification code given by the threshold process as shown in FIG. 26, and k can have the values from 0 to 7 if it is expressed by 3 bits as explained above.

The block matching process of the multi-bit calculation and comparison sections 134-1 and 134-2 will be explained with reference to the flowchart shown in FIG. 29.

First, regarding the present field multi-bit image (identification code image) as an input image, the number of pixels for each identification code in the detection block is counted (S1). At this time, when the identification codes are all the same in the detection block (S2), the flag is set to 1. When the identification codes are all 0 (S3), the flag is set to "0." When a plurality of identification codes exists in the detection block (S4), the flag is set to "−1" (S7).

Thus, the reason of setting the flag in accordance with the identification code of the detection block is to sort the case of the motion vector process in the integration process to be explained later. Therefore, only when the plurality of codes exists in the detection block, the correlation process with all reference blocks in the reference area is carried out so as to obtain the motion vector (mx, my) (S8). This process is repeated with respect to all blocks (S9).

Figure 29:
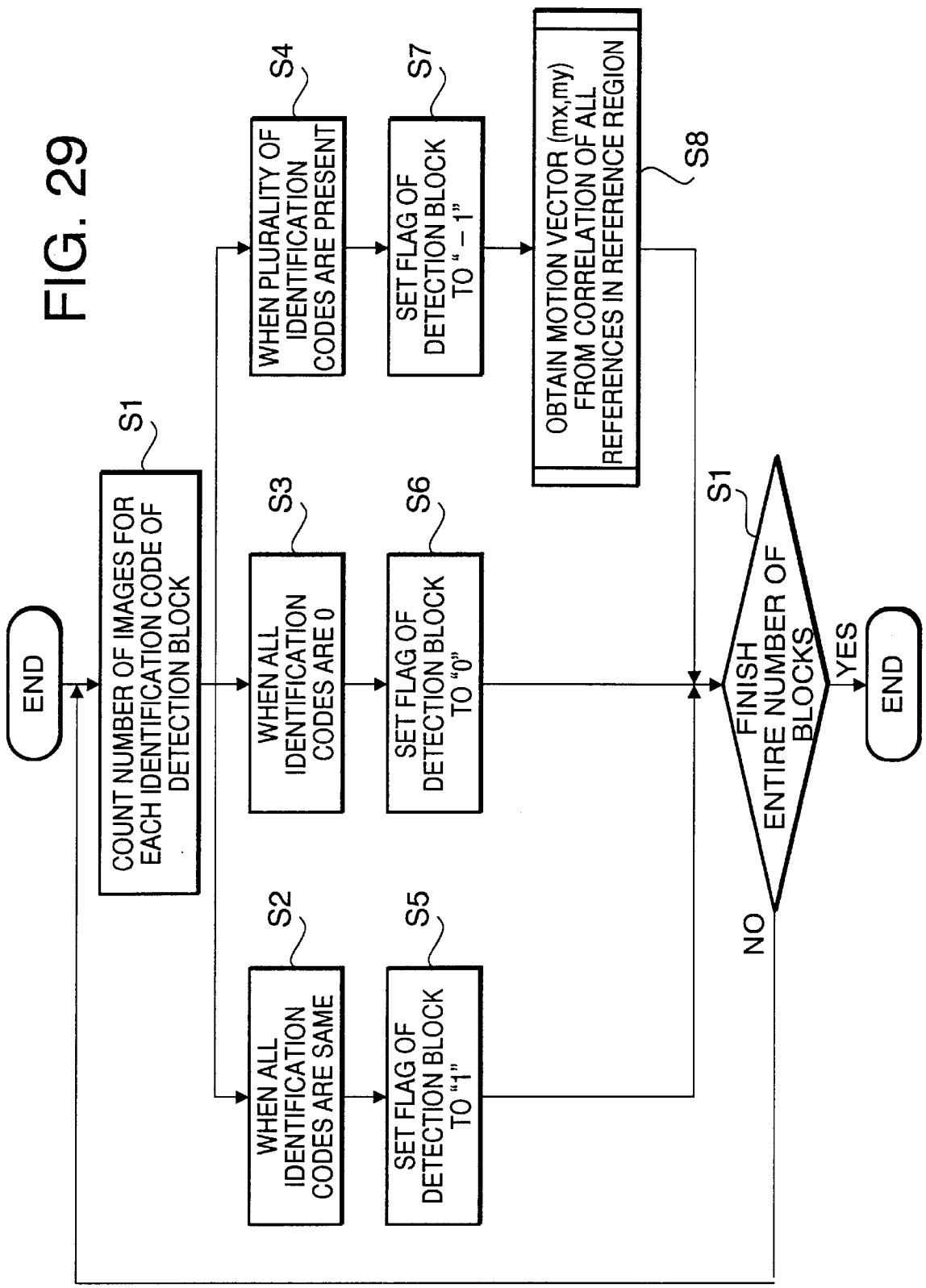
FIG. 29 is a general operation flowchart of a motion vector detection based on the if identification codes in the second embodiment of the present invention.
Figure 30:
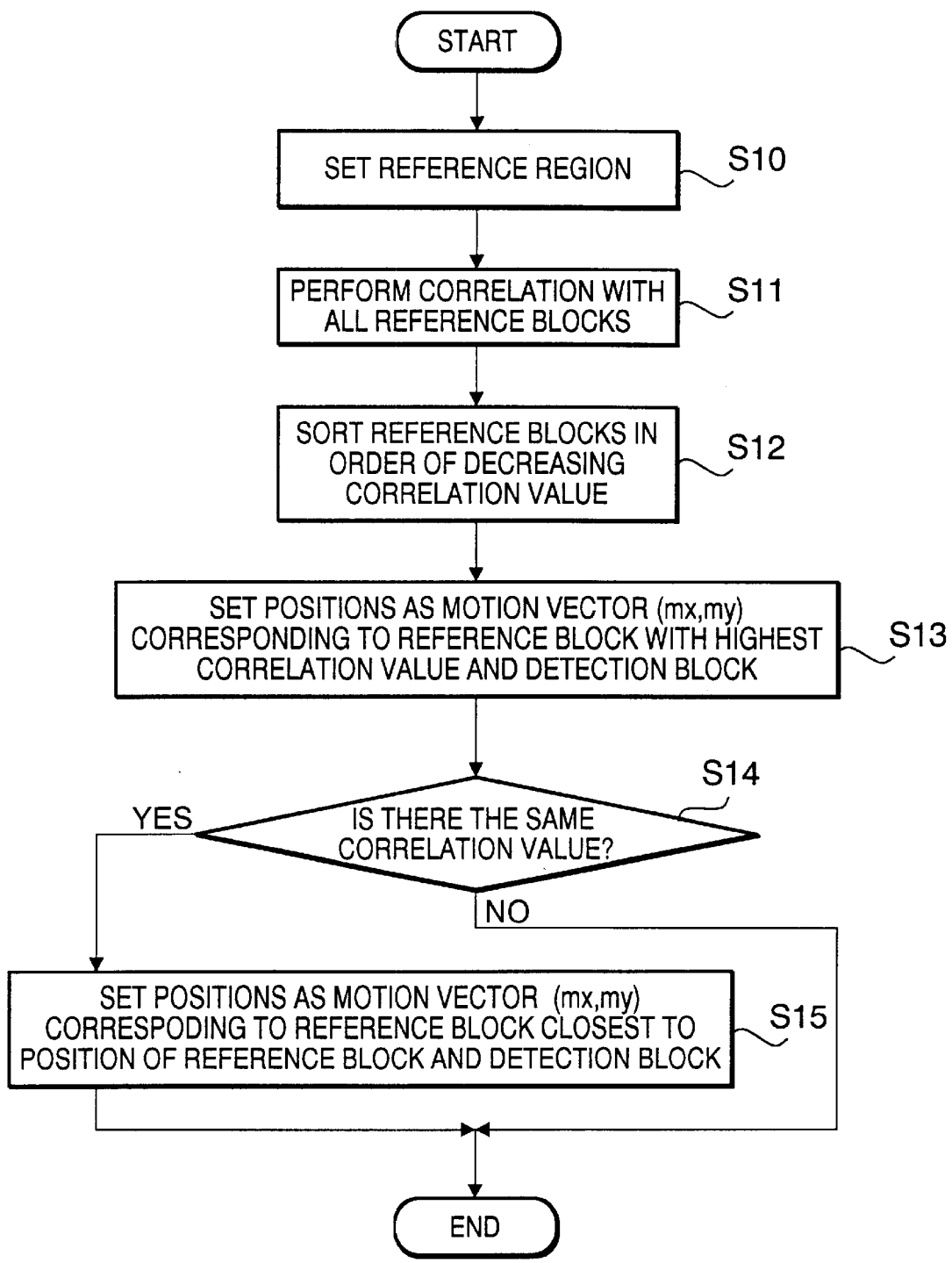
FIG. 30 is an operation flowchart for obtaining the motion vector in the second embodiment of the present invention.

FIG. 30 is a flowchart more specifically showing the motion vector detection process shown in FIG. 29. In FIG. 30, the reference area is set (S10). Then, the correlation process with all reference blocks is carried out using equation (11) or (12) (S11). The reference blocks are sorted in order of decreasing the correlation value (S12). The corresponding positions between the reference block with the highest correlation value and the detection block is set as a motion vector (S13). Moreover, it is checked whether or not there is the same correlation value in the same reference block (S14). When there is no same correlation value, the obtained motion vector is extracted as an output. On the other hand, when there is the reference block closest to the position of the detection block, the corresponding position between the reference block and the detection block is extracted as a motion vector (S15) so as to be output.

According to the block matching using the identification code method of the present invention, it was confirmed that the motion vector accuracy was improved 20 to 30% in a mean square error as compared with the conventional block matching method using only the counting the number of pixels.

Next, the operation of the integration determination section 135 will be explained.

Here, in the motion vector detector 134, the following processes are executed.

Specifically, one is a process for integrating the present field Y image and the previous field Y image into one motion vector from motion vector information detected for each of two threshold groups (hereinafter referred to as Y(A) group and Y(B) group). The other is a process for calculating the detection block in which the motion vector has not been detected as a result of the comparison between each detection block and the reference block, that is, the undefined block from information of the surrounding known blocks.

The integration determination section 135 inputs motion vector information of each of the detected detection blocks KB, in which the present field is divided into the plurality of fields, from the motion vector detector 134. The integration determination section 135 determines the number of motion pixels and the moved direction of each detection block KB in the undefined block process, and registers the determination result to the motion vector table 136.

The undefined block process explained in the first embodiment can be applied to the undefined block process executed by the integration determination section 135.

Thus, the motion vector of the undefined block FT region is obtained for each of Y(A) and Y(B) images from the number of motion pixels of the peripheral known blocks KT by the calculation equation. Then, the motion vector value of each block is obtained from the motion vector of each of Y(A) and Y(B) images in the integration process.

The moved direction and the number of motion pixels of the respective blocks should be the same since these blocks are the same with respect to the Y(A) and Y(B) images. In some cases, however, the calculation error is generated due to the binary calculation and comparison section in the block of the object image.

The following will explain the integration method for improving the accuracy of the motion vector. Here, the specific contents of the integration process will be explained with reference to the flowchart shown in FIG. 31.

Figure 31:
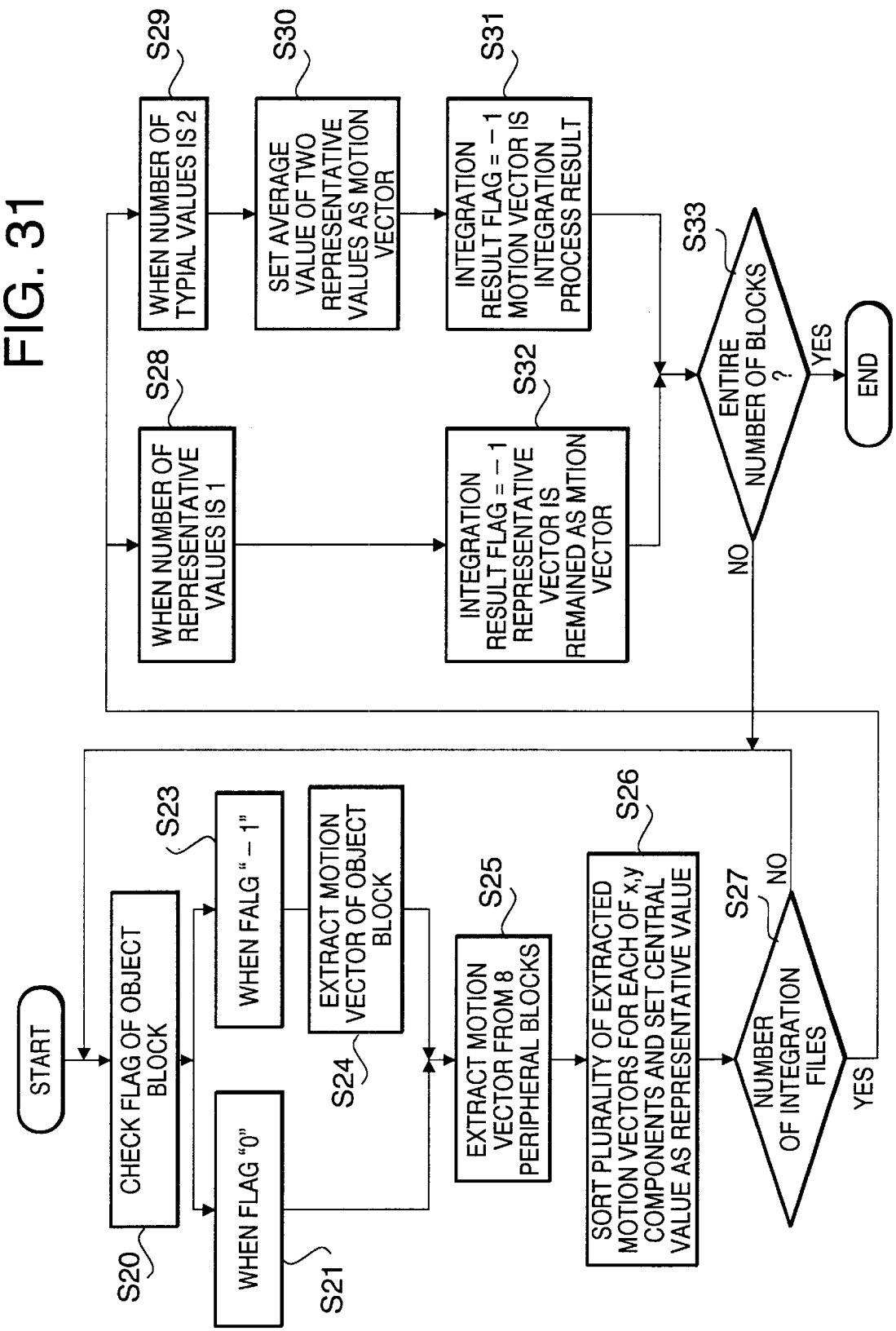
FIG. 31 is an operation flowchart of the integration processing in the second embodiment of the present invention.

FIG. 31 is an operation flow for obtaining one motion vector from the respective motion vector values of the Y(A) and Y(B) images. In this system, the calculation process is executed in consideration of the point whether the object block is the undefined block or the known block, and the point of the motion vectors of the peripheral blocks of the object block.

In this integration process, the flag of the object block is checked (S20). When the flag is "0" (S21), the motion vector of the object block is not extracted. Only when the flag is "−1" (S23), the motion vector of the object block is extracted (S24). Thereafter, the peripheral eight adjacent motion vectors surrounding the object block are extracted (S25), and the extracted motion vectors are sorted for each of x and y components, and its central value is set as a representative value (S26). The above process is executed up to the number of images to be integrated (S27), and the process is blanched in accordance with the number of representative values. The representative value is shown for each of Y(A) and Y(B). At this time, when the number of representative values is one (S28), the motion vector value of the object block is set to flag=−1 as an integration result, and the representative value remains unchanged (S32). When the number of representative values is two (S29), the average value of two representative values is obtained (S30). The motion vector value of the object block is set to flag=−1 as an integration result, and the average value thereof is adopted (S31). This process is executed up to the total number of blocks (S33) so as to obtain the motion vector value of the object block.

Thus, the number of motion pixels, which has been obtained for each of Y(A) and Y(B) images, is integrated into one value for each block, and registered to the motion vector table 136 as the number of motion pixels. In the motion vector table 136, motion vector information of each detection block KB of the present field is registered. The motion vector table 136 has the same structure as the table shown in FIG. 8.

According to the result of the above integration process, in the VGA type having 640×640 pixels, since the detection block has 16×16 pixels, the total number of detection blocks is 1200. Thus, by use of the motion vector method using the single Y image, the respective motion vectors of the Y images in two or more threshold groups are obtained and integrated, thereby obtaining the motion vector with extremely high accuracy and little variation.

Next, the following will explain the data correction processing section 107.

The concept of the data correction process of the present invention can be explained as follows:

Specifically, the intermediate coordinate position between the starting and ending points of the line of sight is obtained from the motion vector value when the line of sight follows the patterns, which are emitted in the respective subfields. Then, it is determined from the intermediate coordinates whether or not image data is emitted in a pixel unit for each subfield. By synthesizing the image data of these subfield bit maps, new image data is reproduced. As a result, the display image having no false contour can be obtained.

Figure 32:
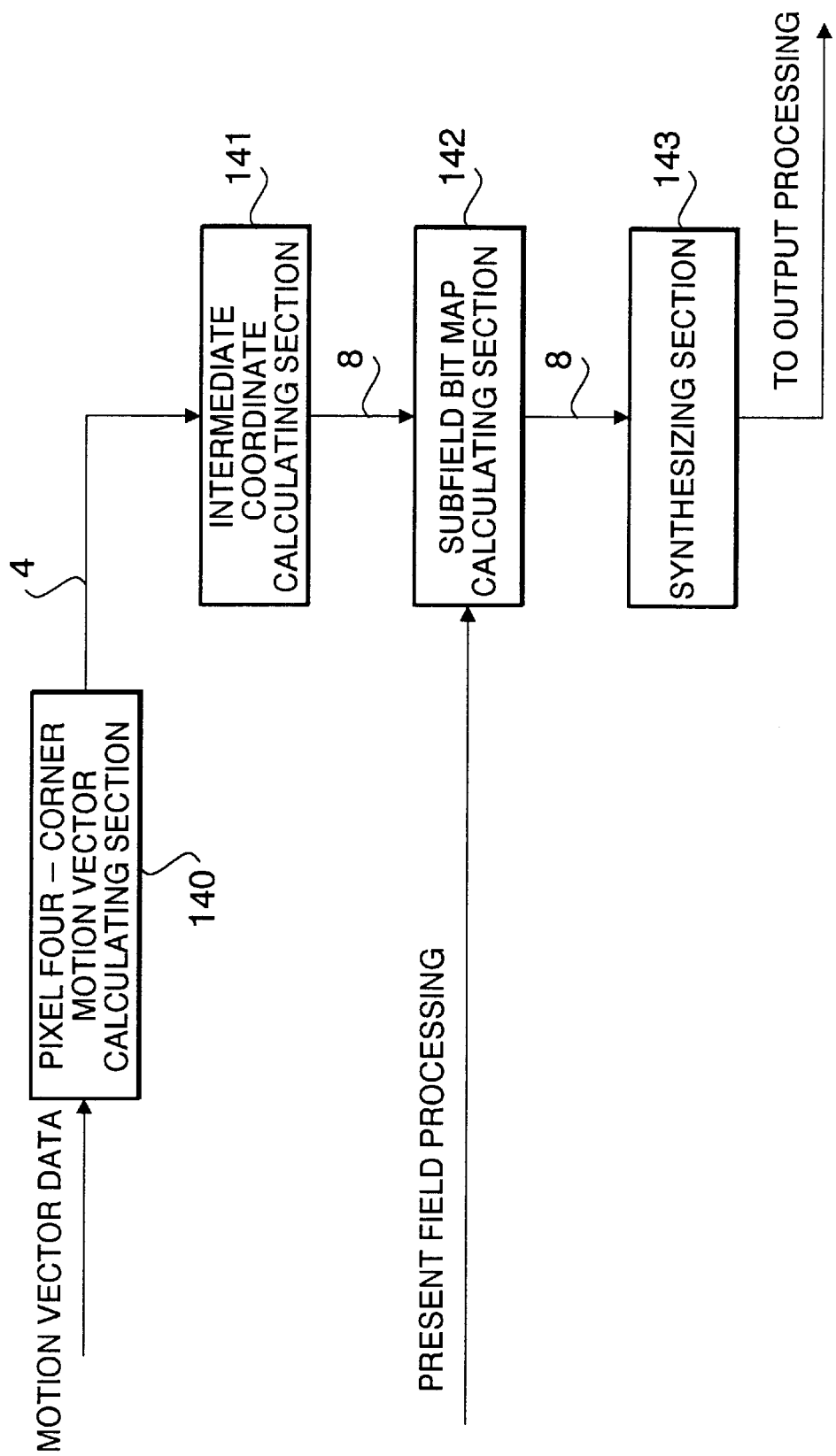
FIG. 32 is a block diagram of a configuration of the data correction processing section in the second embodiment of the present invention.

FIG. 32 shows the block diagram of the data correction processing section 107 for the above purpose. In the figure, though the number of pixels, which is motion vector data from the motion vector table 136, is stored in the block unit (16×16 pixels), the vector value for each pixel is input to the data correction processing section 107.

A pixel four-corner motion vector calculating section 140 inputs motion vector data of each pixel. Then, the pixel four-corner motion vector calculating section 140 performs the average calculation to obtain the motion vector for each four-corners from the motion vector of the corresponding pixel and the motion vectors of the adjacent three pixels for each four-corners of each pixel. The reason why the motion vectors of the adjacent pixels of the four-corners of the corresponding pixel is calculated is as follows:

Specifically, the scroll images normally moving in the fixed direction are square grids and are not distorted. The pixels each having a different motion, however, expand and contract and their shapes are distorted, with the result that they are not defined by the same motion vector for each pixel unit. Therefore, the motion vectors at the top positions of the square denoting the pixel positions are obtained, and the values of these top positions are used as motion vector of the pixel. Thereby, the motion vector value of the square surrounding the pixel unit can be defined.

The number of intermediate coordinate calculating sections 141 corresponds to the number of subfields, and calculates the intermediate coordinate position between the starting and ending points of the line of sight for each subfield based on the pixel four-corner motion vector obtained from the motion vector calculating section 140.

A subfield bit map calculating section 142 calculates whether or not intermediate coordinate data from the intermediate coordinate calculating section 141 and the present field image data are emitted for each pixel unit of the respective subfields, thereby generating a subfield bit pattern of image data. The intermediate coordinate calculating section 141 and the subfield bit map calculating section 142 are paired. For example, in the case of the display of 256 tone levels, since the number of subfields is eight, and eight pairs of the intermediate coordinate calculating section 141 and the subfield bit map calculating section 142 are needed. A synthesizing section 143 synthesizes data to adjust to the output form of the plasma display in the output processing section 109. Specifically, the synthesizing section 143 controls the delay of data calculated by the subfield bit map calculating section 142 and combines the subfield patterns for each bit, thereby synthesizing new image data.

Thus, in correcting input image data, the data correction processing section 107 calculates at real time an emission time in each subfield period and a light quantity entering each retina position from the path of the shift of the line of sight on the screen when the line of sight follows the motion pixel on the display screen, using vector values corresponding to the number of motion pixels and the moved direction. Then, new subfield data is reproduced from the output, so that the display image having no false contour can be obtained.

Next, the purpose of the density gradient detection section 104 and its process content will be explained with reference to the figure.

In the detection of the motion vector using the binary image or the multi-bit image, there was a problem in obtaining the accurate motion vector. More specifically, it was difficult to obtain the accurate motion vector when the image, having an extremely low spatial frequency, i.e., a gentle density change such as a background sky, a single wall, etc., occupied a large area such as extended over the plurality of detection blocks. In other words, there is no possibility that the respective field images will have exactly the same luminance. Namely, in the respective field images, there is a luminance change more or less due to brightness about the environment, sensitivity of a camera, etc., and a luminance difference occurs between the fields. This makes the edge of the binary image complicated and generates an error in the block matching process.

However, in some cases, the false contour is not so conspicuous in the image having such a gentle density change, particularly the low or high luminance portion, and there is a case in which the correction using the motion vector is not always applied thereto.

According to the present invention, the correction of the false contour using the motion vector is not applied to all image scenes. Instead, the object of the present invention is to carry out the process, which is applied to the above-mentioned image scene or the characterized structure of the image.

Figure 33:
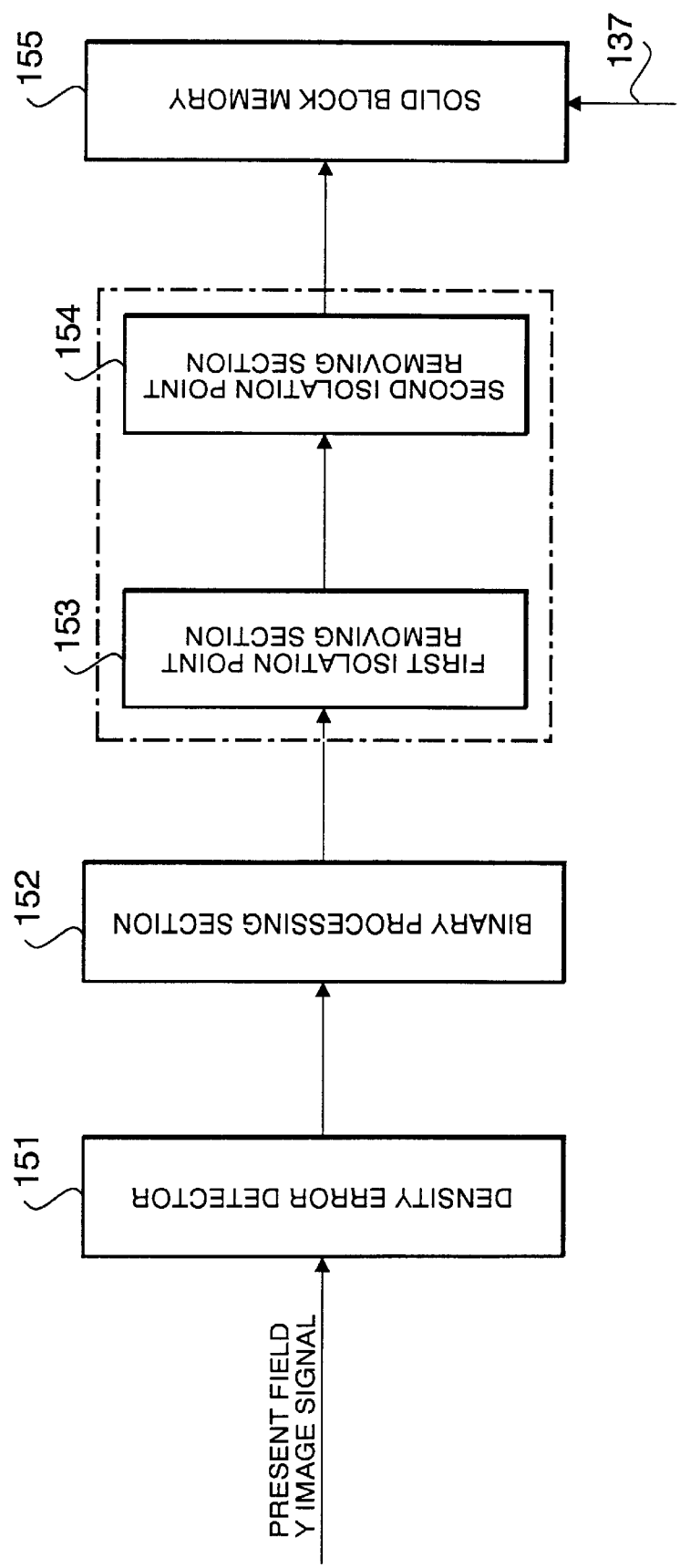
FIG. 33 is a block diagram of a configuration of a density gradient detection section in the second embodiment of the present invention.

FIG. 33 shows a specific structural view of the density gradient detection section 104 for detecting the density difference distribution of the image, particularly the so-called a solid portion where the density change of e.g., the background is gentle. In FIG. 33, a density difference detector 151 detects a density difference between the density of the central pixel and the peripheral eight pixels in an operator process of e.g., 3×3.

In a binary processing section 152, for example, when the present field Y image signal is input, a portion where the density difference between the operator's central pixel and the peripheral eight pixels is 2/225 level or less is defined as a solid portion. As a result, there can be obtained a binary solid image, which is separated into the so-called segments where the solid portion is an image data "1" region and the other portions are image data "0" regions. The result is input to a morphology processor 156 comprising first and second isolation point removing sections 153 and 154.

The morphology processor 156 removes isolation points such as black point noise existing in the image of the detected solid portion and white point noise existing in the portions other than the solid portion. For example, the first isolation point removing section 153 removes black point noise existing in the image of the solid portion. Black point noise, which is the solid portion of about 4 pixels, is removed in the expansion process using an eight-concatenation operation of two pixels, and the graphic form other than black point noise is restored to the original in the contraction process. The image portion where the density gradient is gentle serves as a uniform solid image portion. This portion is further subjected to the contraction process using an eight-concatenation operation of four pixels in the second isolation point removing section 154. Thereby, the white point, which is a solid portion of about eight pixels in the region the other than the solid image portion, is removed. Then, the other portions are restored to the original in the expansion process, and the solid image portion can be extracted from the image scene. The extracted image is stored in a solid block memory 155.

A control information line 137 is used to execute communication with the integration determination section 135 in connection with information of the solid block position in the image scene. In this process, the solid portion in the image scene is output as a solid detection signal 157 corresponding to the block, similar to the motion detection process. In this case, when all pixels in the detection block are solid, the above detection signal is output.

Figure 34:
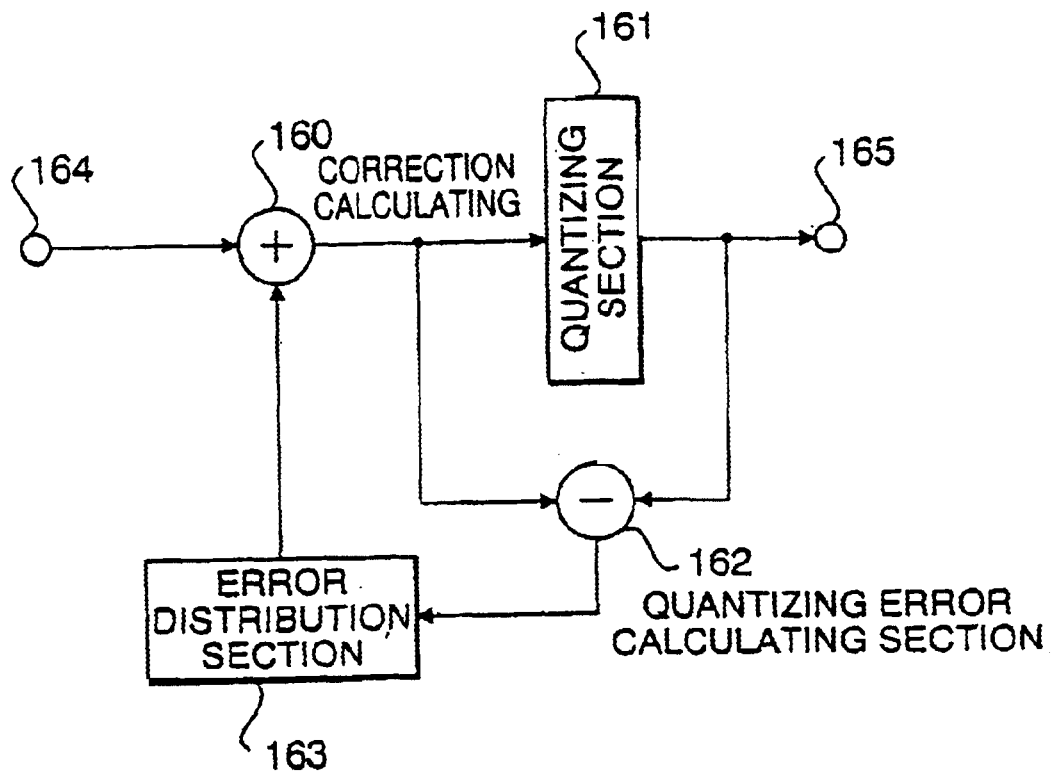
FIG. 34(a) is a structural view of a multi-value error distribution method.
FIG. 34(b) is a structural view of a pixel distribution method.
Figure 34:
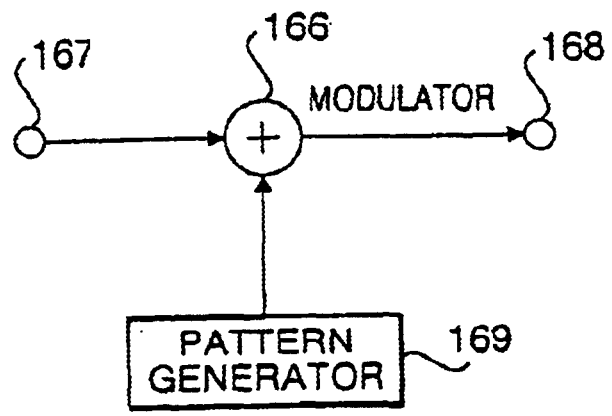

Next, the data distribute processing section 106 will be explained with reference to FIG. 34.

FIG. 34(a) shows a block diagram of a multi-bit error diffusion method as one example of the data distribute processing section 106.

The multi-bit error diffusion method is that the density error between the input signal and light emission luminance is distributed to the peripheral pixels as reducing the number of output distribution signal bits rather than the number of bits of input signals R, G and B. In other words, this is the process method of expressing a pseudo-halftone. The method using the multi-bit error diffusion process is structured as shown in FIG. 34(a). Reference numeral 160 is a correction and calculating section for adding an accumulated error to the input image. Reference numeral 161 is quantizing section. Reference numeral 162 is a quantizing error calculating section for obtaining a quantizing error. Reference numeral 163 is an error distribution section for distributing the quantizing error to the peripheral pixels. Reference numeral 164 is an input terminal for inputting the respective signals of R, G and B. Reference numeral 165 is an output terminal for outputting a multi-value signal.

The signals of R, G and B input from the input terminal 164 is added the accumulated error of errors distributed from the correction and calculating section 160, and the quantizing section 161 converts the resultant to the multi-bit signal. The quantized error calculating section 162 calculates a difference between the corrected signal corrected with the accumulated error and the quantized signal so as to obtain the quantized error. The error distribution section 163 distributes the obtained quantized error to the peripheral pixels so as to obtain the accumulated error. The obtained multi-bit signal is output from the output terminal 165.

Moreover, as another system reported, there is a display method, which is called as a pixel distribution method ("Review on Reduction of PDP Moving picture False contour": The Institute of Electronics, Information and Communication Engineers, Electronics, C-408, P66, 1996).

According to the above pixel distribution method, as shown in FIG. 34(b), a modulator 166 modulates the input signal with a pattern signal from a pattern generator 169. Namely, the signal modulation with an arbitrary level is performed with the pattern signals having opposite characteristics to each other in the horizontal, vertical, and displaying time directions for each display pixel with respect to the displaying signals of R, G and B. As a result, the average level in a time direction is set to the original signal level. FIG. 35 shows one example of the patterns for modulation, and the pattern is switched for each field as shown in FIGS. 35(a) and 35(b) to be output. As a result, the neighboring pixels in upper and lower, right and left and time direction indicate a signal with a discontinuous level, and the original image level is detected with the average value. Therefore, the false contour, which is originally detected at the continuous points of the smooth image, is distributed.

Although the above-mentioned processing method is applied to the data distribution processor 106, the gist of the present invention is to perform the adaptive processing corresponding to the scene of the image as mentioned above.

In the data distribution processor 106, the portion where the density of the image is gently changed, such as the background where the false contour is inconspicuous in the scene of the image, is subjected to the distribution processing for each block in the aforementioned solid portion detection signal 157. The motion vector is obtained with high accuracy in a portion where the density of the image changes largely, the spatial frequency is high and the image is fine, although such a portion is also a place where the false contour is considerably conspicuous. For this reason, the correction of the false contour is carried out in the data correction processor 107 using the motion vector.

Next, the data selector 108 will be explained. The data selector 108 selects output data, corrected based on the motion vector detection, from the data correction processor 107 or output data from the data distribution processor 106 corresponding to the solid detection signal 157 detected by the density gradient detection processor 104 in the divided block unit. The selected output data is supplied to the output processor 109.

(Third Embodiment)

Figure 36:
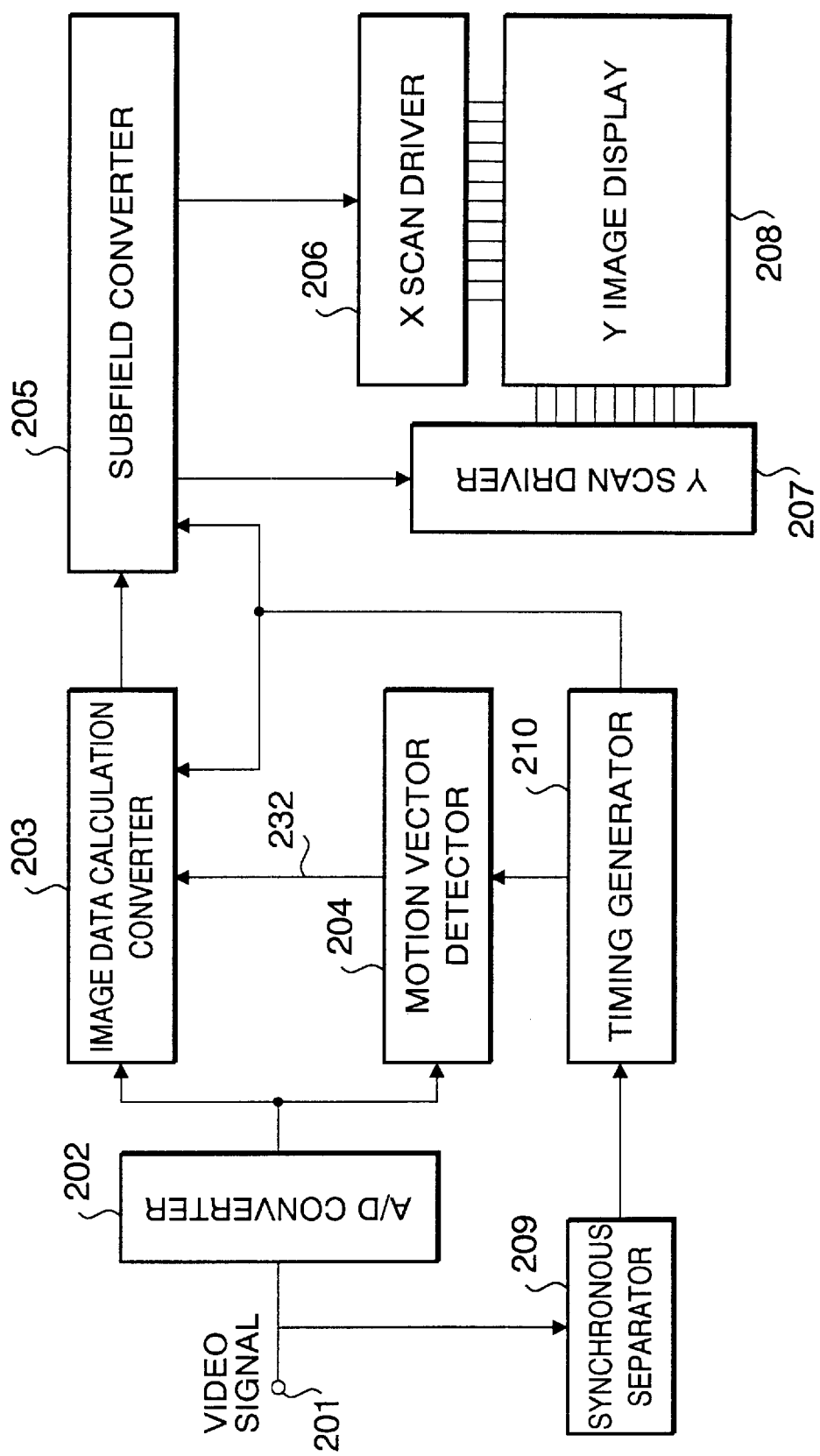
FIG. 36 is a general structural view of the tone image display apparatus of a third embodiment of the present invention.

FIG. 36 illustrates a general configuration of the tone image display device of a third embodiment of the present invention. In FIG. 36, a video signal 201 input from the input terminal is converted to digital data by an A/D converter 202. The converted data is input to a motion vector detector 204 and an image data calculation converter 203. The motion vector detector 204 carries out the multi-hierarchical binary processing, the block matching processing, and the integration determination processing to detect the number of motion pixels of the input image and the moved direction thereof. The motion vector detector further inputs detected information on the number of motion pixels, the moved direction, and detection block to the image data calculation converter 203. Then, the image data calculation converter 203 calculates the combination of the subfield patterns of input pixel position data based on the results of the number of motion pixels and the moved direction so as to reconstruct data suitable for an amount of visual light, thereby performing the tone data correction of the pixels where the false contour is generated. The image data calculation converter 203 further outputs the resultant data to a subfield converter 205. The subfield converter 205 converts tone data of each pixel to the number of pulses corresponding to the voltage applied time to be provided to an X scan driver 206 and a Y scan driver 207. As a result, the halftone display is performed on an image display 208. A synchronous separator 209 separates a synchronous signal from the video signal 201, and a timing generator 210 generates a timing signal, which is synchronized with the input video signal, to be provided to each section.

Figure 37:
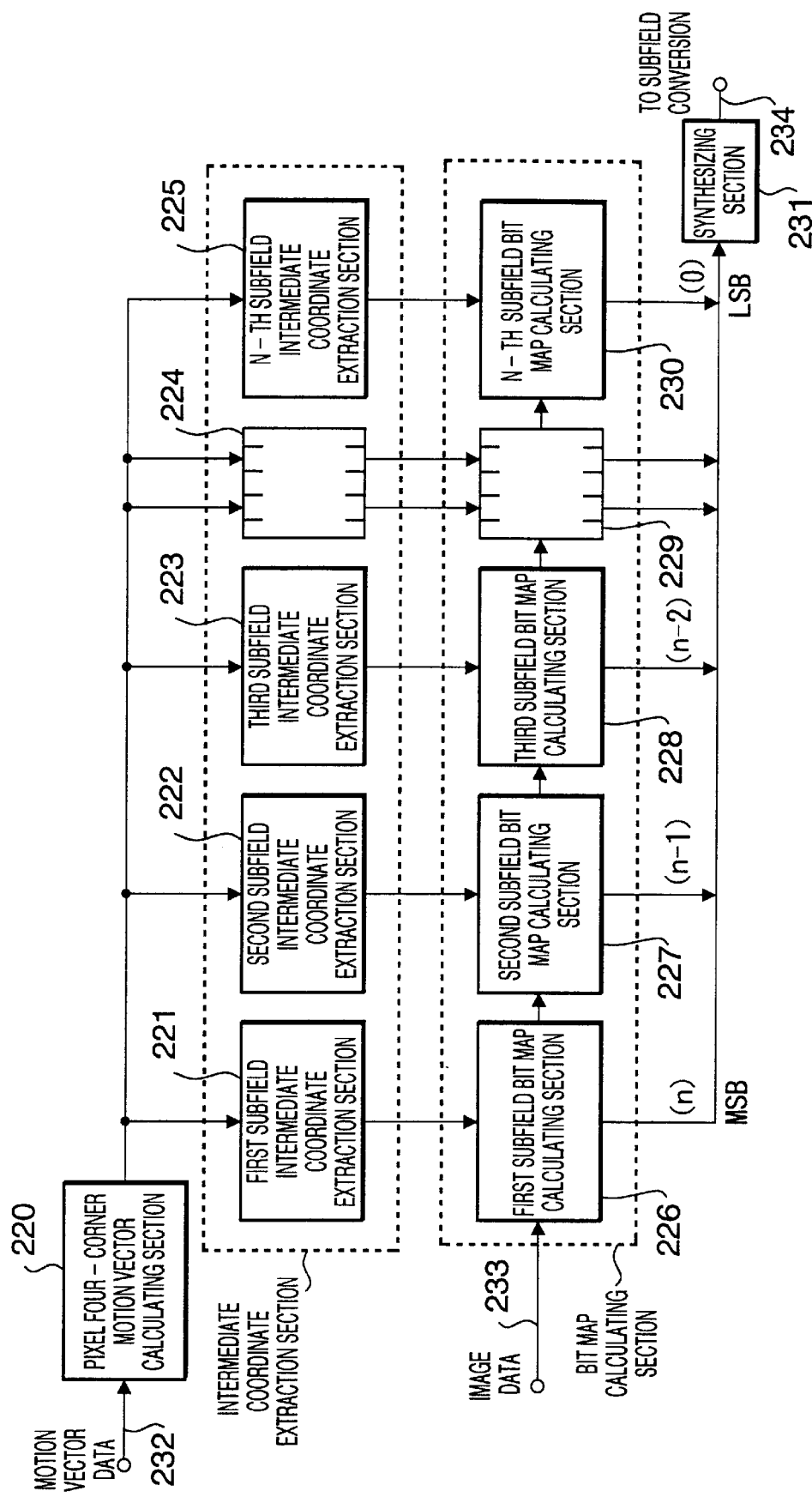
FIG. 37 is a view showing the specific structure of an image data calculation converting section.

Next, the image data calculation converter 203 will be explained. FIG. 37 illustrates a configuration of the image data calculation converter 203 in FIG. 36. As motion vector data 232, a vector value for each pixel is input to a pixel four-corner motion vector calculating section 220. The pixel four-corner motion vector calculating section 220 calculates motion vectors of four corners for each pixel, using input motion vector data 232, to output. The reason why the motion vectors of the four corners of the pixel are calculated is that the shape of the pixel is distorted in accordance with the motion of the pixel and the motion vectors at their top positions must be correctly caught. First to n-th subfield intermediate coordinate extraction calculating sections 221 to 225 obtain, using input four-corner motion vectors, an intermediate position between the starting and ending points of the line of sight for the respective period emitting in each subfield to output. First to n-th subfield bit map calculating sections 226 to 230 output information that whether or not each pixel is emitted in each subfield, using the intermediate coordinates between the starting and ending points of the line of sight to a synthesizing section 231, and also output new image data needed in next subfield bit map calculating sections. The subfield intermediate coordinate extraction calculating sections 221 to 225 and the bit map calculating sections 226 to 230 are paired. For example, if the number of subfields is eight, eight pairs of the subfield intermediate coordinate extraction calculating sections 221 to 225 and the bit map calculating sections 226 to 230 are needed. A synthesizing section 231 adjusts the delay of data output from each of the bit map calculating sections 226 to 230 and combines the subfield patterns for each bit so as to synthesize new image data.

Figure 38:
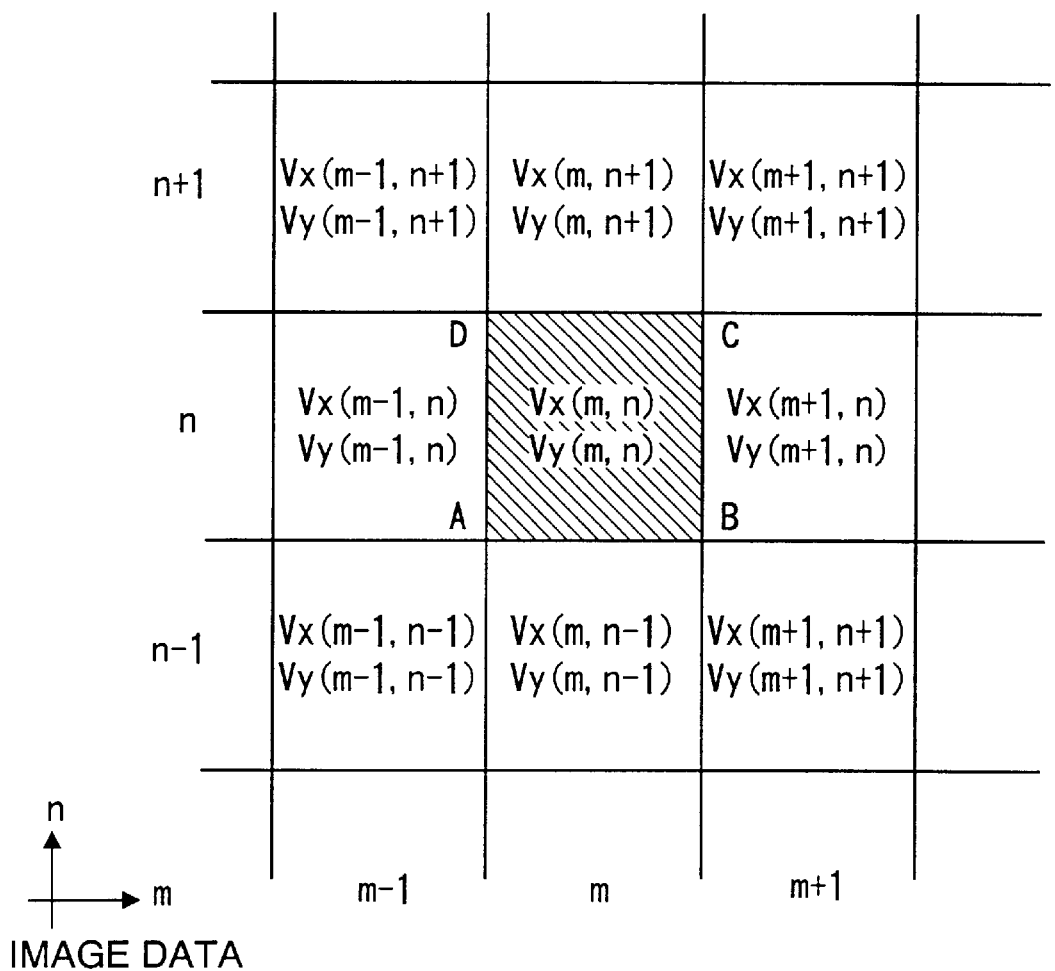
FIG. 38 is a view showing a motion vector at a certain position.

Next, the following will explain the details of the pixel four-corner motion vector calculating section 220 with reference to FIG. 38 and equation (13). FIG. 38 shows a certain position of image data. It is assumed that the motion vector values of the pixel in a certain coordinate (m, n) are (Vx(m,n), Yy(m,n)). The certain coordinate (m, n) means a position in a two-dimensional image data. It is further assumed that four corners of the pixel in the coordinate (m, n) are points A, B, C, and D. For example, when an attention is paid to point A, point A is surrounded with pixels, which are respectively placed at positions (m, n) (m−1, n), (m, n−1), (m−1, n−1). To obtain the motion vector of point A, the calculation is carried out using the motion vector values of the pixels placed at positions (m, n), (m−1, n), (m, n−1), (m−1, n−1). As one example of calculating the motion vector of point A, there is considered that the average value of four points of the peripheral pixels be calculated. The motion vector (VAx, VAy) of point A can be obtained by the following equation (13). The other three points can be obtained by the same equation.

$$VAx = \frac{Vx(m-1, n-1) + Vx(m, n-1) + Vx(m-1, n) + Vx(m, n)}{4} \quad (13)$$

$$VAy = \frac{Vy(m-1, n-1) + Vy(m, n-1) + Vy(m-1, n) + Vy(m, n)}{4}$$

Next, the operations of the subfield intermediate coordinate extraction calculating sections 221 to 225 in FIG. 37 will be explained with reference to FIGS. 39 and 40. FIG. 40 shows a state in which image data moves on the display. The motion vectors of points A, B, C, D of the four corners of a certain pixel show an example of respectively (6, 4, 3), (5, 9, 4), (6, 3, 8), and (6, 2, 4) The retina pixel is positioned at a point 280 when t0, a point 281 when t1, a point 282 when t2, a point 283 when t3, a point 284 when t4, a point 285 when t5, and a point 286 when t6. The broken lines show the four corners of the retina pixel during the light-emission. Each of the subfield intermediate coordinate extraction calculating section calculates the starting and ending positions of the light-emission period in each subfield to output.

The calculation method can be given by the following equation:

$$X=(t-t0)/t \times Vx(m, n)+x0 \pm 0.5$$

$$y=(t-t0)/t \times Vy(m, n)+y0 \pm 0.5$$

[where Vx(m, n), Vy(m, n) are motion vector values.]

For example, the position of a point 287 can be obtained as follows:

$$X=(4-2)/10 \times 5.9+x0+0.5=1.68+x0$$

$$Y=(4-2)/10 \times 4+y0-0.5=0.30+y0$$

Also, the position of a point 288 can be obtained as follows:

$$X=(8-2)/10 \times 6+x0+0.5=4.10+x0$$

$$Y=(8-2)/10 \times 3.8+y0+0.5=2.78+y0$$

As the number of subfield intermediate coordinate extraction calculating sections 221 to 225, the number which corresponds to that of the subfields is required. The first subfield intermediate coordinate extraction calculating section 221 calculates the starting and ending positions for the light-emission period in the first subfield, and outputs the result to the first subfield bit map calculating section 226. The second subfield intermediate coordinate extraction calculating section 222 calculates the starting and ending positions for the light-emission period in the second subfield, and outputs the result to the second subfield bit map calculating section 227. The n-th subfield intermediate coordinate extraction calculating section 225 calculates the starting and ending positions for the light-emission period in the n-th subfield, and outputs the result to the n-th subfield bit map calculating section 230.

Figure 41:
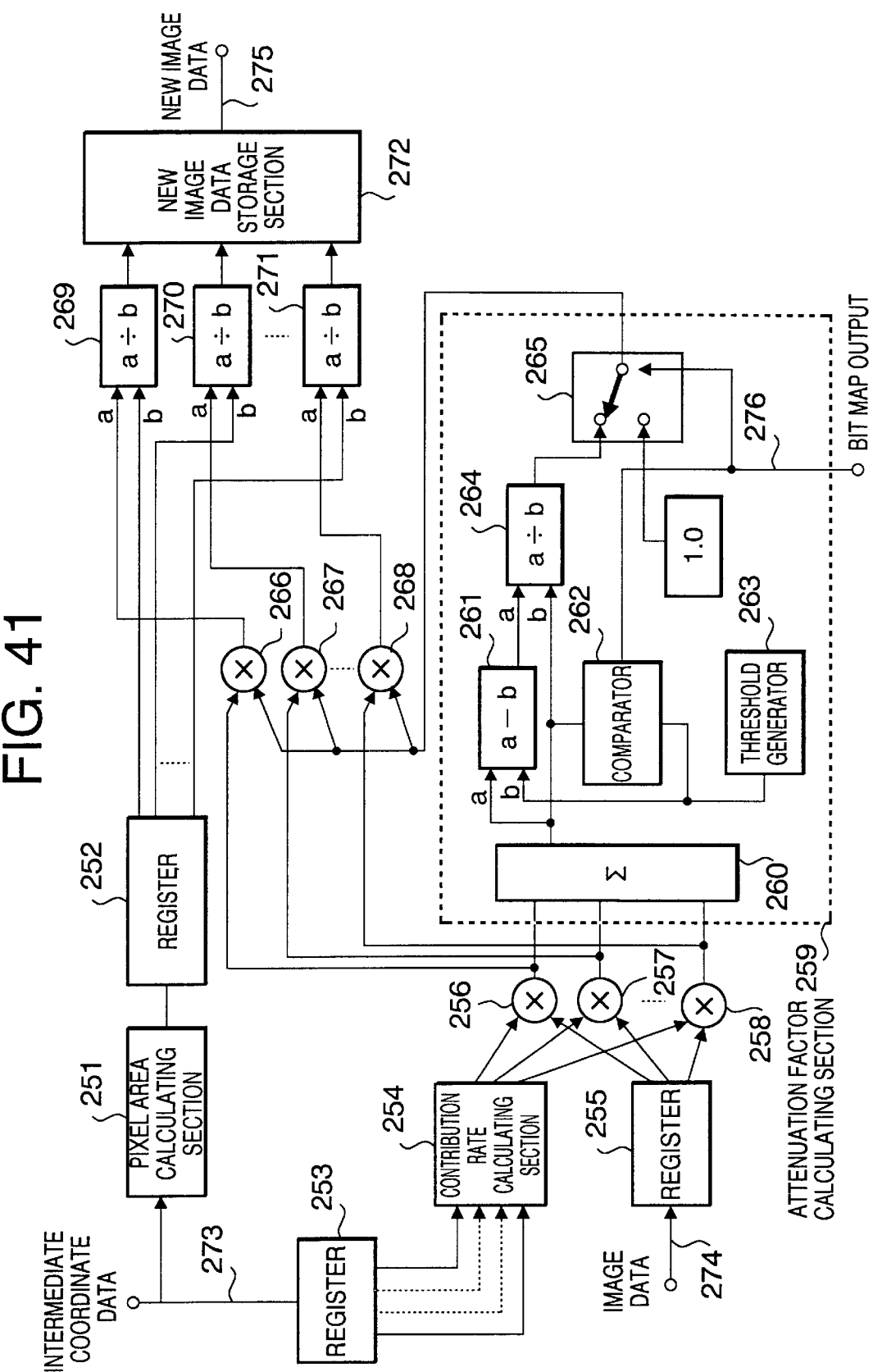
FIG. 41 is a view showing the structure in which intermediate coordinate extraction sections input motion vector data and image data, and output new image data and a binary bit map therefrom.

Next, the first to n-th subfield bit map calculating sections 226 to 230 will be specifically explained with reference to FIG. 41. FIG. 41 illustrates a configuration in which using the intermediate coordinate data 273 from intermediate coordinate extraction calculating sections and image data 274, intermediate coordinate data 275 and binary bit map 276 are output. The concept of the processing will be explained with reference to equation (14) and FIG. 42. Equation (14) is an expression for obtaining new image data 275 in FIG. 41.

$$NewData(m, n) = \sum_{y}^{\pm \infty} \sum_{x}^{\pm \infty} \frac{ka(x, y) * E(m, n, x, y) * Data(m, n)}{S(m, n)} \quad (14)$$

Figure 42:
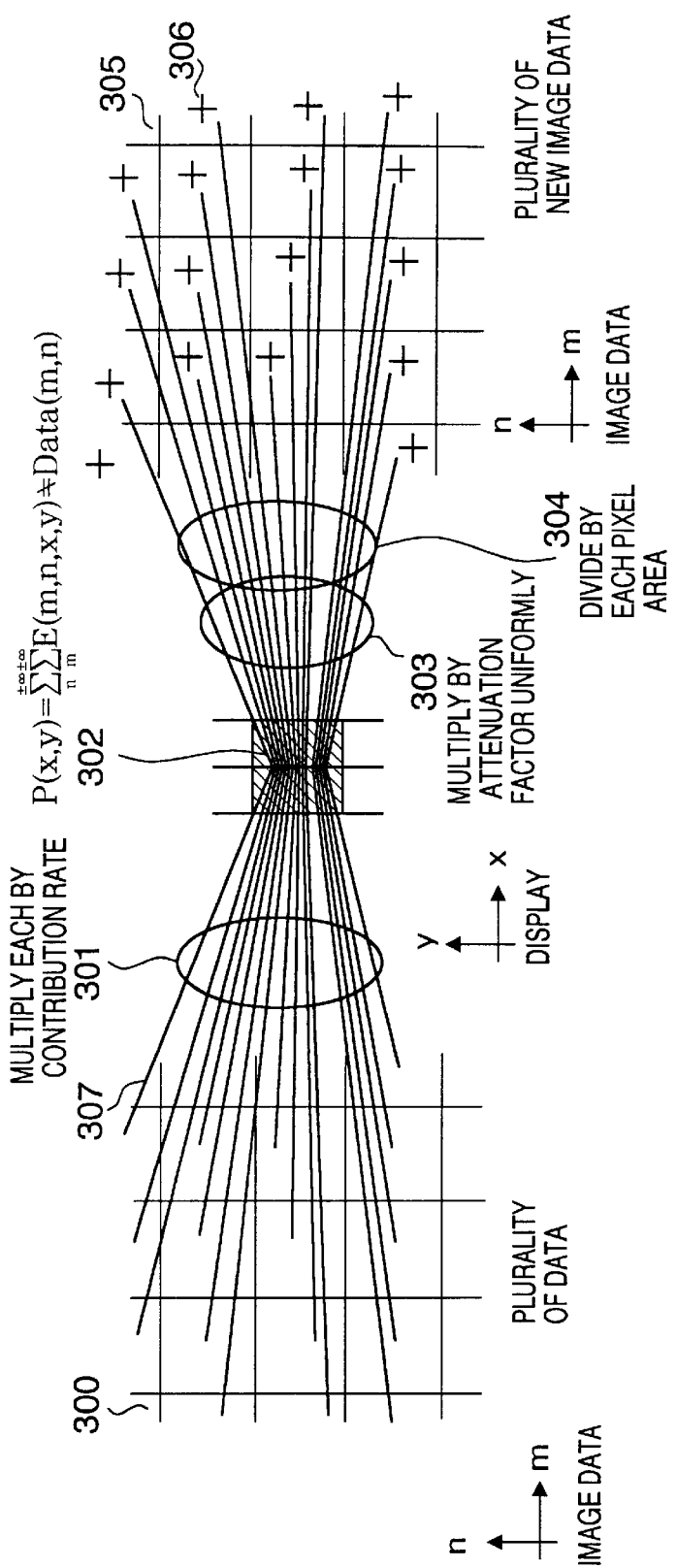
FIG. 42 is a conceptual view visually showing the flow from a register having image data arranged at a certain position (x, y) on the display to a new image data storage section having new image data arranged.

Data (m, n) is image data 274 at a certain position (m, n) in FIG. 41. New data (m, n) is image data 275 at a certain position (m, n) in FIG. 41. Ka (x, y) is an output from an attenuation factor calculating section 259 in FIG. 41. E (m, n, x, y) is an output from a contribution rate calculating section 254 in FIG. 41. FIG. 42 is a view visually showing the flow from a register 255 in FIG. 41 in which image data are arranged, to a new image data storage section 272 in FIG. 40 in which new image data are arranged, with respect to a certain position (x, y) on the display. The register 255 in FIG. 41 stores a plurality of image data 300 in FIG. 42. A plurality of multipliers 256, 257, 258 in FIG. 41 corresponds to reference numeral 301 in FIG. 42 describing "multiply the plurality of image data (x, y) by each contribution rate". An adder 260 in FIG. 41 corresponds to P (x, y) 302 in FIG. 42 describing "add multiplied data". A plurality of multipliers 266, 267, 268 corresponds to reference numeral 303 in FIG. 42 describing "multiply by attenuation factor uniformly."

A plurality of dividers 269, 270, 271 in FIG. 41 corresponds to reference numeral 304 in FIG. 42 describing "divide by each pixel area." The new data storage section 272 in FIG. 41 corresponds to plurality of new image data 305 in FIG. 42. A reference character "+" 306 in FIG. 42 corresponds to an adder 260 in FIG. 41. Data of a bit map output 276 in FIG. 41 corresponds to the position (x, y) on the display. When output data is "1", the corresponding subfield is emitted, and when output data is "0", the subfield is not generated. The starting position (m, n) on image data of a signal current 307 in FIG. 42 and the ending position (m, n) on new image data are equal to each other. It is unnecessary to calculate image data at a position (m, n) of which the contribution rate to a certain position (x, y) on the display is 0. It is obvious from equation (14) that E (m, n, x, y)=0.

Next, each section will be explained. A pixel area calculating section 251 calculates each pixel area using intermediate coordinate data 273. The register 252 stores data output from the pixel area calculating section 251 and outputs the plurality of data. A register 253 stores motion vector data 273 and outputs the plurality of motion vector data. A contribution rate calculating section 254 calculates a plurality of contribution rates using the plurality of intermediate coordinate data to output. The register 255 stores image data 274 and outputs the plurality of image data.

Next, an attenuation factor calculating section 259 will be explained. The attenuation factor calculating section 259 adds all input data and compares the total value with output data from a threshold generator 263 to output "0" or "1" as binary bit map, as a compared result. Further, using the compared result, when the total value is smaller than the threshold, the attenuation factor calculating section 259 outputs 1.0, while when the total value is more than the threshold, outputs a result of (total value−threshold)÷(total value). The concept of the attenuation factor calculating section 259 will be explained with reference to FIG. 43 and equations (15) and (16).

$$\text{When } P(x, y) \geq th \; ka(x, y) = \frac{a}{P(x, y)} = \frac{P(x, y) - th}{P(x, y)} \; H(x, y) = 1 \quad (15)$$

$$\text{When } P(X,Y) < th \; ka(x,y) = 1.0 \; H(x,y) = 0 \quad (16)$$

Figure 43:
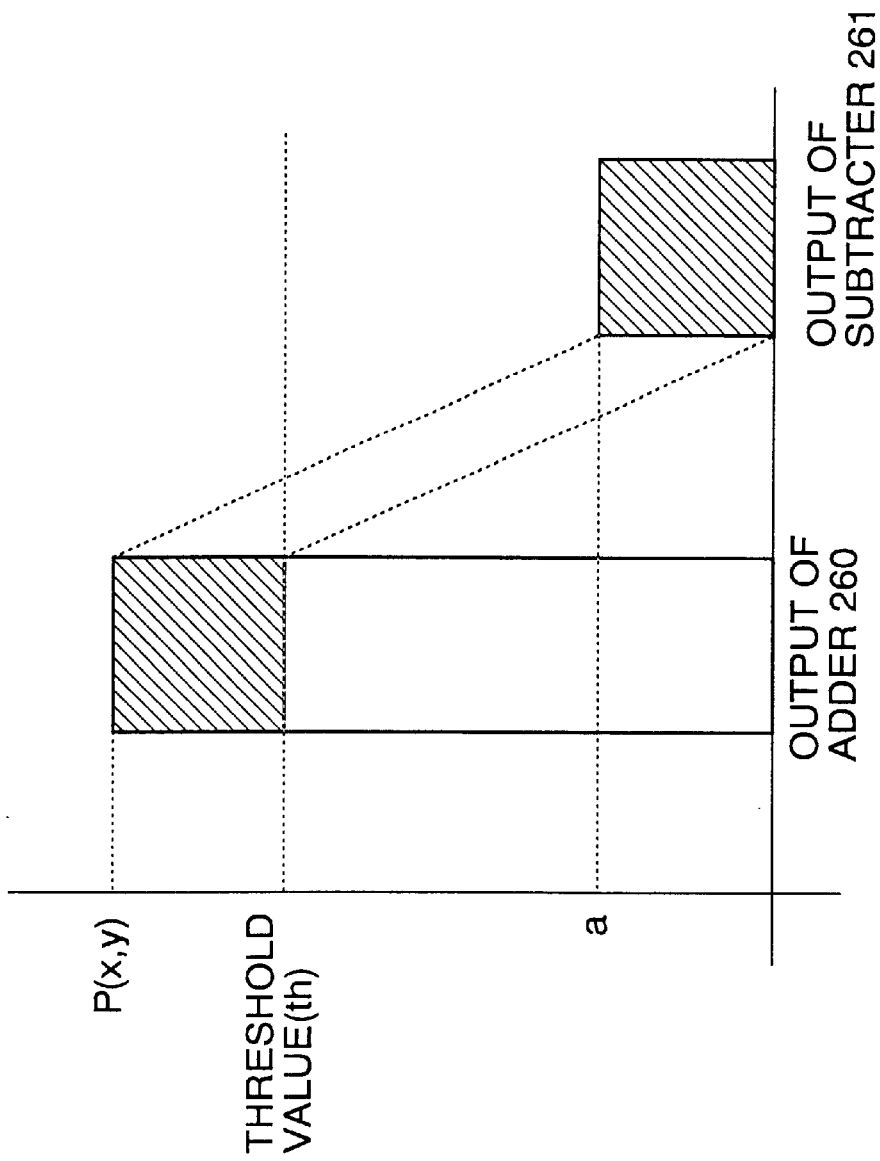
FIG. 43 is a view visually showing an adder output and a subtracter output.

FIG. 43 shows an output from the adder 260 and an output from a subtracter 261. Equation (15) is an expression showing an output from the attenuation factor calculating section 259 and a bit map output when the output from the adder 260 is more than the threshold. Equation (16) is an expression showing the output from the attenuation factor calculating section 259 and the bit map output when the output from the adder 260 is smaller the threshold. Reference character P (x, y) is the output value from the adder 260 when the position (x, y) on the display is set. Reference character th is the threshold value. Reference character ka (x, y) is the output value from the attenuation factor calculating section 259 when the position (x, y) on the display is set.

Reference character H (x, y) is the bit output corresponding to the position (x, y) on the display. Thus, the attenuation factor calculating section 259 outputs "0" or "1" as a result obtained by adding all input data and comparing the total value with output data from the threshold generator 263, as a binary bit map. Further, when the total value is smaller than the threshold, the attenuation factor calculating section 259 outputs 1.0, while when the total value is more than the threshold, the attenuation factor calculating section 259 outputs the result of (total value−threshold)÷(total value).

The new image data storage section 272 adds values each obtained by dividing a value (a) by a value (b) and temporarily stores the calculated value. The value (a) is obtained by multiplying the output value from the register 255, in which a plurality of image data 274 is stored, by an output form the attenuation factor calculating section 259, and further by an output form the contribution rate calculating section 254. The value (b) is an output from the register 255 in which results in the pixel area calculating section 251 are stored. Then, the new image data storage section 272 outputs the above calculated and stored value to the next subfield bit map calculation.

A synthesizing section 231 shown in FIG. 37 is a section for synthesizing data adapted to the form of the subfield converter 205. The output from each bit map calculating section is delayed in order of the first, second, third, fourth subfields so as to be output. This delay is adjusted to be output next to the subfield converter 205.

The following will explain the display method using the tone image display device having the above-mentioned structure.

The tone image display method will be described first. Herein, to simplify the explanation, scroll image data of the motion vector (6, 4) in the fixed direction and an emission sequence in the subfield shown in FIG. 34 are used.

First, the structure of the subfield will be explained. As shown in FIG. 39, the structure of the subfield comprises three subfields. It is assumed that the emission sequence is structured by weighting an emission pattern ratio between the respective subfields of {SF1, SF2, SF3}={4:2:1}. In this case, a cycle of the emission sequence is T, and the oblique-lined portions show the emission periods. In FIG. 39, the start of the emission period in the first subfield is t1, the end thereof is t2. Also, the start of the emission period in the second subfield is t3, the end thereof is t4. Moreover, the start of the emission period in the third subfield is t5, the end thereof is t6.

Furthermore, it is assumed that the following relationship is established.

$$t7 = t1 + T$$

$$t0 = (t1 + t2) \div 2$$

$$(t2-t1):(t4-t3):(t6-t5):T = 4:2:1:10$$

$$(t3-t2):(t5-t4):(t7-t6):T = 1:1:1:10$$

Next, the relationship between the motion of a visual point and the retina pixel area for one unit will be explained. The retina pixel described here is defined as a retina acceptable region on where the image on the display is reflected, and a central position of the acceptable region is the visual point. FIG. 44(a) is a conceptual view assuming that the visual point moves on the display in an upper right direction.

In the scroll image of the motion vector (6, 4) in the fixed direction, the visual point passes from the position (x0, y0) to the position (x0+6, y0+4) on the display at time T. The retina pixel area of one unit is one unit area of the acceptable region.

Figure 45:
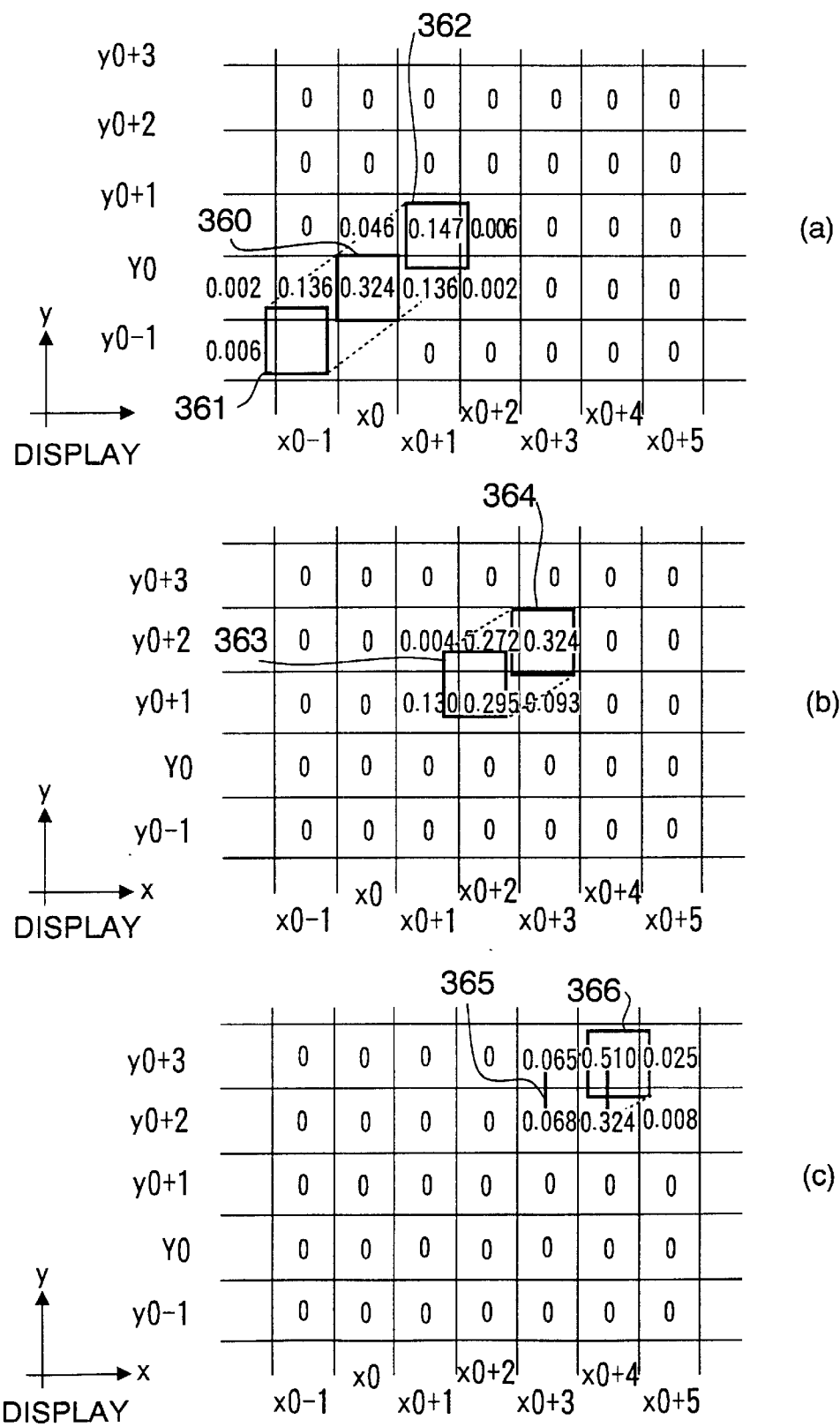
FIGS. 45(a), 45(b) and 45(c) are views showing how much the retina pixel area for one unit is influenced by each pixel on the display with figures up to the third decimal

Next, the following will explain how much the retina pixel of one unit is influenced by each pixel on the display. FIG. 45 is a view showing how much the retina pixel for one unit is influenced by each pixel on the display with figures up to the third decimal place, and these figures are here called and defined as a contribution rate. The explanation of the contribution rate and how the contribution rate is obtained are specifically described later. FIG. 45(a) is a view showing how much the retina pixel is influenced by each pixel on the display during a period of time t1 to t2. FIG. 45(b) is a view showing how much the retina pixel is influenced by each pixel on the display during a period of time t3 to t4. FIG. 45(c) is a view showing how much the retina pixel is influenced by each pixel on the display during a period of time t5 to t6.

A retina pixel 360 is placed at the position of the retina pixel at time t0, a retina pixel 361 is placed at the position of the retina pixel at time t1 and a retina pixel 362 is placed at the position of the retina pixel at time t2. Also, a retina pixel 363 is placed at the position of the retina pixel at time t3, a retina pixel 364 is placed at the position of the retina pixel at time t4. Moreover, a retina pixel 365 is placed at the position of the retina pixel at time t5 and a retina pixel 366 is placed at the position of the retina pixel at time t6. For example, during the period of time t1 to t2, the retina pixel for one unit has the contribution rate of 0. 324 with respect to the position (x0, y0) on the display, and the contribution rate of 0 with respect to the position (x0+5, y0+3) on the display.

Next, the following will explain how to obtain a level of the tone, which the retina pixel receives from the display. The tone level entering the retina pixel when moving on the display are a total sum of light quantity received from each pixel on the display. For example, in the emission sequence of the subfield previously described, it is determined how many levels of tone the retina pixel obtains during a period of time t1 to t7 using the above-mentioned contribution rate. Then, the obtained level is set at M, and whether or not the emission is generated in a n subfield period at the position (x, y) on the display is indicated by H (x, y, n). If the emission is generated, H (x, y, n)=1 is established, if no emission is generated, H (x, y, n)=0 is generated. Then, M is obtained by the following equation.

$$M=4*(0.046*H(x0,y0+1, 1)+$$

$$0.147*H(x0+1,y0+1,1)+$$

$$0.006*H(x0+2,y0+1,1)+$$

$$0.002*H(x0-2,y0,1)+$$

$$0.136*H(x0-1,y0,1)+$$

$$0.324*H(x0,y0,1)+$$

$$0.136*H(x0+1,y0,1)+$$

$$0.002*H(x0+2,y0,1)+$$

$$0.006*H(x0-2,y0-1,1)+$$

$$0.147*H(x0-1,y0-1,1)+$$

$$0.046*H(x0,y0-1,1))+$$

$$2*(0.004*H(x0+1,y0+2,2)+$$

$$0.272*H(x0+2,y0+2,2)+$$

$$0.324*H(x0+3,y0+2,2)+$$

$$0.013*H(x0+1,y0+1,2)+$$

$$0.295*H(x0+2,y0+1,2)+$$

$$0.093*H(x0+3,y0+1,2))+$$

$$1*(0.065*H(x0+3,y0+3,3)+$$

$$0.510*H(x0+4,y0+3,3)+$$

$$0.025*H(x0+5,y0+3,3)+$$

$$0.068*H(x0+3,y0+2,3)+$$

$$0.324*H(x0+4,y0+2,3)+$$

$$0.008*H(x0+5,y0+2,3))$$

When the array elements of H (x, y, n) are appropriately determined and thereby the tone scale level M, which the retina pixel senses, is equal to tone data of the original image as close as possible, the generation of the false contour is restrained.

Figure 48:
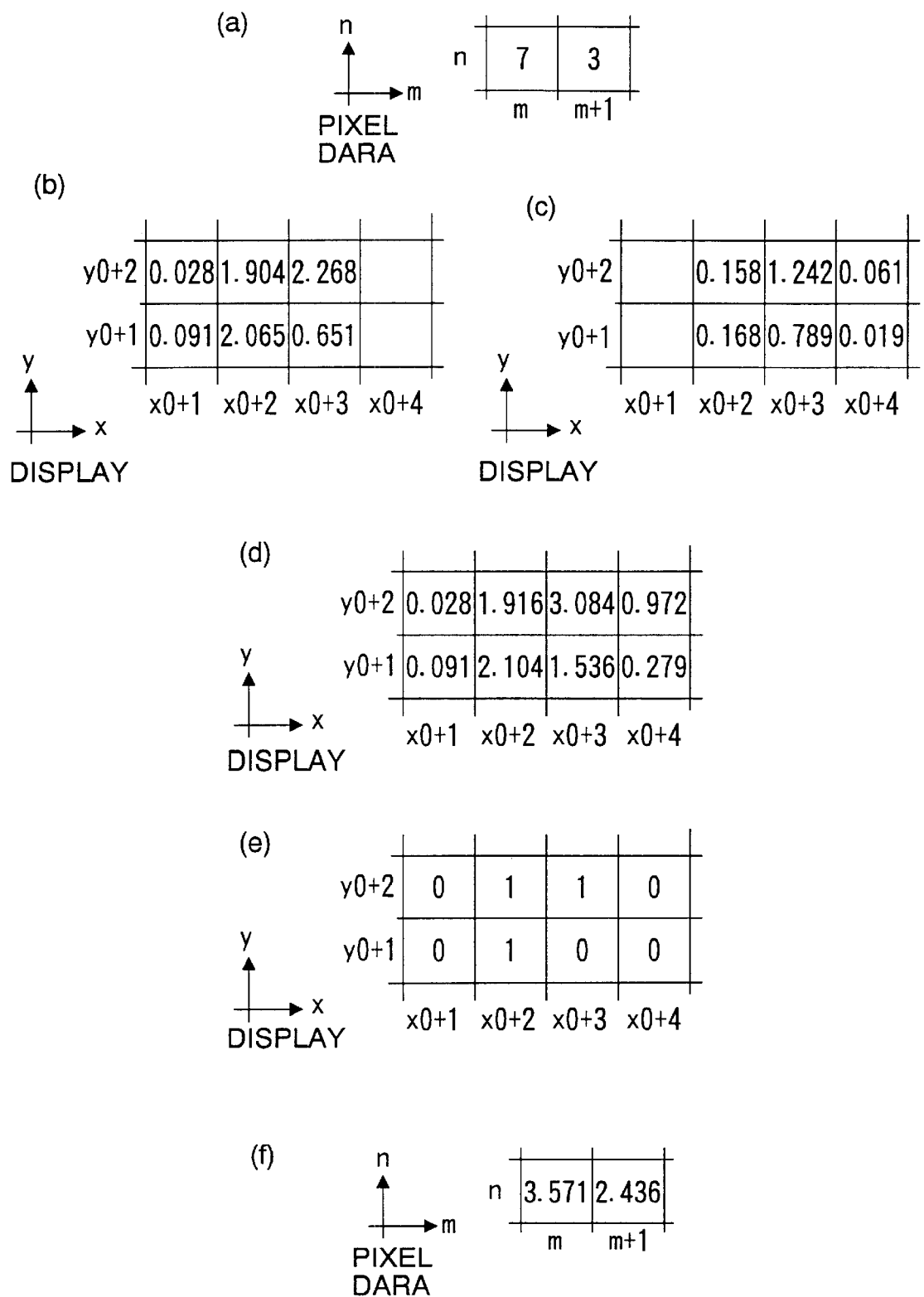
FIG. 48 is a view showing processing in a second subfield section.

Next, in order to briefly explain how to obtain H (x, y, n), an example in which two pixels move with the motion vector (6, 4) will be explained. FIG. 44(b) shows a state in which the retina pixels move as image data of two pixels moves. It is shown that two retina pixels move with the motion vector (6, 4). As an example, image data at the position (m, n) is set at 7 and image data at the position (m+1, n) is set at 3. This state is illustrated in FIGS. 46(a) and 47(a) in which image data is two-dimensionally shown. FIGS. 47, 48, and 49 illustrate processing to be explained from now on, and reference symbol (a) of each of these figures shows data to be distributed and arranged, and (b) thereof shows the result obtained by distributing data at the position of (m, n). Also, (c) thereof shows the result obtained by distributing data at the position (m+1, n) and reference symbol (d) of each of these figures shows the total sum at the respective distributed positions. Moreover, (e) thereof is the result obtained by comparing the total sum with a certain threshold value, and (f) thereof shows image data to be used in the next processing.

The following will explain the process for obtaining H (x, y, n). The outline of the calculation process is as follows:

First, H (x, y, 1), which is data indicating whether or not the emission is generated in the first subfield, is obtained. Then, new data A for obtaining H (x, y, 2) is calculated from the result of H (x, y, 1) and image data to be output. H (x, y, 2), which is data indicating whether or not the emission is generated in the second subfield, is obtained based on output new image data A. Then, new data B for obtaining H (x, y, 3) is calculated from the result of H (x, y, 2) and image data A to be output. Finally, H (x, y, 3), which is data indicating whether or not the emission is generated in the third subfield, is obtained based on new image data B for obtaining H (x, y, 3).

The following will explain the process for outputting new image data A in order to obtain H (x, y, 1), which is the data indicating whether or not the emission is generated in the first subfield, and H (x, y, 2), which is the data indicating whether or not the emission is generated in the second subfield. First, 7, which is image data at the position (m, n), is distributed and arranged on the display using the contribution rate shown in FIG. 45(a). In the distributing and arranging method, a value, which is obtained by multiplying the image data by the contribution rate at the position (x, y) shown in FIG. 45(a), is substituted into the position (x, y) shown FIG. 47(b). For example, the value to be substituted into the position (x0, y0) shown in FIG. 47(b) is 0.324×7= 2.268, and the value to be substituted into the position (x0+1, y0) is 0.136×7=0.952. Similarly, the values to be substituted into the other positions in FIG. 47(b) are calculated. Also, in the method for distributing and arranging 3, which is image data at the position (m+1, n) on the display, a value is obtained by multiplying the image data by the contribution rate at the position (x, y) as mentioned above. However, since the x position is larger than the previous position by +1, the x position to be substituted is shifted by +1. Specifically, the value to be substituted into the position (x0+1, y0) is 0.324×3=0.972, and the value to be substituted into the position (x0+2, y0) is 0.136×3=0.408. Similarly, the values to be substituted into the other positions in FIG. 47(c) are calculated.

Next, the values in FIGS. 47(b) and 47(c) are added after their coordinate positions are matched. For example, a value of 2.676, which is obtained by adding 2.268, the value of the position (x0, y0) in FIG. 47(b), and 0.408, the value of the position (x0, y0) in FIG. 47(c), is substituted into the position (x0, y0) in FIG. 47(d). Similarly, the values to be substituted into the other positions in FIG. 47(d) are calculated. H (x, y, 1) is obtained by comparing the substituted values in FIG. 47(d) with a threshold value. The threshold value to be compared with the values in FIG. 47(d) is 4. Note that the threshold value described here will be specifically explained later. H (x, y, 1) is 1 if the value in FIG. 47(d) is 4 of the threshold or more, and is 0 if the value in FIG. 47(d) is less than 4. For example, since the value at the position (x0, y0) is 2.676, which is less than 4, H (x0, y0, 1) is 0. Similarly, when the comparison and the substitution are carried out, FIG. 47(e) is completed. In the example this time, the values at all positions in FIG. 47(e) were 0. Namely, it is found that there is no emission in the first subfield section.

Next, the following will explain the process for outputting new image data A for obtaining H (x, y, 2), which is data indicating whether or not the emission is generated in the second subfield. The concept is that image data distributed and arranged is fed back so as to obtain new image data A. The value of new image data A is obtained as follows: Specifically, image data distributed corresponding to the contribution rate is multiplied by the attenuation factor, which is determined by the result of H (x, y, 1). Then, resultant data is divided by the pixel area and all resultant data is fed back to the original coordinate positions. Note that the pixel area described here will be explained later.

The attenuation factor ka (x, y) can be obtained as follows:

When H (x, y, 1)=1, $$ka(x, y) = (\text{total value of values distributed to position } (x, y) - \text{threshold}) \div (\text{total value of values distributed to position } (x, y)).$$

When H (x, y, 1)=0, $$ka(x, y) = 1$$

One example of the feeding back is described below. The value distributed to the position (x0, y0) on the display from the image data at the position (m, n) was 2.268 as shown in the above result. Also, the result of H (x0, y0, 1) was 0. The value of image data to be fed back to the position (m, n) from the image data at the position (x0, y0) on the display is 2.268×1=2.268. Similarly, the value of image data to be fed back to the position (m, n) from the at the position (x0+1, y0) on the display is 0.952×1=0.952. Therefore, the value of image data at the position (m, n) to be fed back from all positions on the display is as follows:

$$0.322*1+1.029*1+0.042*1+0.014*1+0.952*1+2.268*1+0.952*1+0.014*1+0.042*1+1.029*1+0.322*1,$$

that is, 6.986.

In the above example, since H (x, y, 1) is 0 with respective to any x and y, all distributed values are fed back. In other words, distributed data "7" is all fed back. The reason why the above value is 6.986 is that an error rounded to three places of decimals is included.

Next, the above value is divided by the pixel area. The pixel area in this case is 1. That is, the divided value is 7÷1=7. Similarly, the value of image data to be fed back to the position (m+1, n) from all positions on the display is 3. In this case, the pixel area is 1, and the divided value is 3÷1=3. This is shown in FIG. 47(*f*). The value shown in FIG. 47(*f*) is new data A for obtaining H (x, y, 2), which is data indicating whether or not the emission is generated in a next subfield, i.e., the second subfield. The above explained method is to obtain H (x, y, 1), which is the data indicating whether or not the emission is generated in the first subfield, and calculate new image data A for obtaining H (x, y, 2), using the result of H (x, y, 1) and image data, to output.

Next, the following will explain the method for obtaining H (x, y, 2), which is data indicating whether or not the emission is generated in the second subfield, and calculating new image data B for obtaining H (x, y, 3), using the result of H (x, y, 2) and image data A, to output. For FIGS. 48(*a*), (*b*), (*c*), (*d*), the similar calculations as previously mentioned may be carried out.

The threshold value to be compared with FIG. 48(*d*) is 2. In FIG. 48(*d*), there are two positions having a value equal to or more than 2 of the threshold, i.e., (x0+2, y0+1) and (x0+3, y0+2), and attenuation factors thereof are each as follows:

When position (x0+2, y0+1), $$(2.104-2) \div (2.104) = 0.049$$

When the position (x0+3, y0+2), $$(3.084-2) \div (3.084) = 0.351$$

Therefore, the value at position (m, n) in new data B is as follows:

$$0.028*1+1.904*1+2.268*0.351+0.091*2.065*0.049+0.651*1$$

That is, 3.571.

The value at position (m+1, n) is as follows:

$$0.012*1+0.816*0.351+0.972*1+0.039*0.049+0.885*1+0.279*1$$

That is 2.436. The pixel area is 1, and the divided value is shown in FIG. 48(*f*). The value shown in FIG. 48(*f*) is new data B for obtaining H (x, y, 3), which is data indicating whether or not the emission is generated in the second subfield.

The above explained method is to obtain H (x, y, 2), which is data indicating whether or not the emission is generated in the second sub-field, and calculating new image data B for obtaining H (x, y, 3), using the result of H (x, y, 1) and image data A, to output. To obtain H (x, y, 3) which is data indicating whether or not the emission is generated in the third sub-field, the similar calculation as previously mentioned may be carried out. Additionally, in this case, the value to be compared with the value shown in FIG. 49(*d*) is 1. Final output result is shown in FIG. 46(*b*). FIG. 46(*b*) shows the result obtained by adding the values in FIG. 47(*e*) multiplied by 4, the values in FIG. 48(*e*) multiplied by 2, and values in FIG. 49(*e*), while matching the coordinate positions. FIG. 46(*a*) illustrates input image data, and FIG. 46(*b*) illustrates the result obtained by subjecting the input image data to the above-explained image data conversion processing. From FIG. 46(*b*), it is understood that the emission is generated in each sub-field as the visual point moves.

Next, the contribution rate and the concept of the pixel area, and obtaining method thereof will be specifically explained. As already explained, the contribution rate represents by using numbers an influence which a pixel on image data provides to a pixel on the display. In the above explanation of the contribution rate, it is represented by numbers that how much the retina pixel for one unit is influence by each pixel on the display. According to the present invention, the pixel on image data and the retina pixel for one unit are made equivalent to each other, thereby eliminating the false contour, which is the object of the present invention.

For example, in the contribution rate in the case of the still image, the tone level at the position (m, n) in image data has only to be displayed at the position (x, y) on the display. As a result, the distribution rate of the pixel at the position (x, y) on the display to the pixel at the position (m, n) on image data is 1 (100%). In the case of the moving picture, the pixel at the position (m, n) in image data has influence upon not only the pixel at the position (x, y) on the display but also pixels at positions (x+1, y) (x, y−1), etc. Therefore, the contribution rate of the pixel at the position (x, y) on the display to the pixel at the position (m, n) on image data is less than 1. The pixel on image data does not exist physically, and means one unit region, which is obtained by dividing an image vertically and horizontally. In other words, the pixel on image data is the region of the image itself.

The area of the pixel on image data is referred to as a pixel area. The pixel on image data may be distorted. Although the scroll images moving in the fixed direction, which is described previously, are square grids and are not distorted, the pixels, each having a different motion, expand and contract, and shapes thereof are distorted. There is the case where the distortion leads to the change in the pixel area.

Figure 50:
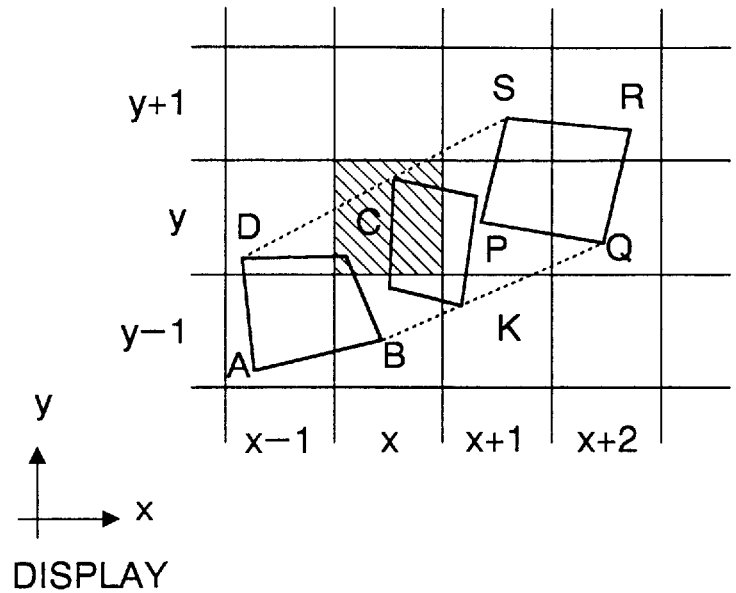
FIG. 50 is a view showing that pixels of certain image data have shifted during time t1 to t2.

The following will explain how to obtain the pixel area and the contribution rate. FIG. 50 is a view showing that the certain pixel of image data has moved during a period of time t1 to t2. A square composed of A, B, C, and D denotes a pixel, and A, B, C and D correspond to four corners of the square. A square composed of P, Q, R and S denotes a pixel, and P, Q, R and S correspond to four corners of the square.

Figure 51:
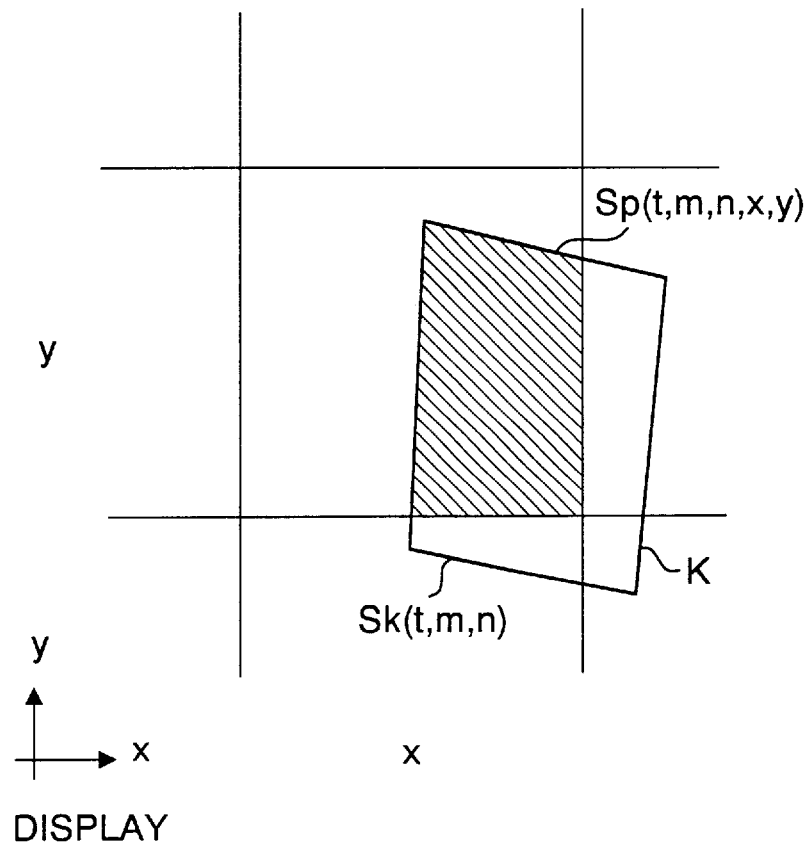
FIG. 51 is an enlarged view showing a portion around a position (x0, y0) on the display.

Now, assuming that pixel composed of A, B, C and D at time t1 moves to the pixel composed of P, Q, R, and S at time t2. K denotes a position of the retina pixel at time t, while moving. It is understood from FIG. 50 that the state where the pixel is distorted and passed through the position (x, y) on the display. FIG. 51 is a view showing an expanded portion close to the position (x, y) on the display. The distance between the pixels on the display is normalized by 1. Accordingly, an area of a pixel on the display is 1. Because of the structure of the display, one pixel is for three of the primary colors, however, in the explanation of this invention, one pixel is for one of the primary colors and the respective pixels are placed at the same position. The oblique lined portion shows a portion where the pixel K is overlapped with a pixel of the position (x, y) on the display, and this portion has the relationship between image data (m, n) and the position (x, y) on the display. Therefore, an area of the overlapped portion is set at SP (t, m, n, x, y), and an area of pixel K is set at Sk (t, m, n). A time average of each area is calculated, thereby defining the contribution rate and the pixel area. Equation (17) is an expression for obtaining a contribution rate E (m, n, x, y), and equation (18) is an expression for obtaining the pixel area S (m, n).

$$E(m, n, x, y) = \frac{1}{t2-t1} \int_{t1}^{t2} Sp(t, m, n, x, y) \, dt \tag{17}$$

$$S(m, n) = \frac{1}{t2-t1} \int_{t1}^{t2} Sk(t, m, n) \, dt \tag{18}$$

Next, the following will explain the concept that how to obtain the area Sp (t, m, n, x, y) and the area Sk (t, m, n). FIGS. 52(a) and 52(b) are views each showing that a retina pixel is overlapped at a pixel at a certain position on the display, and equations (17) and (18) are expressions for obtaining the overlapped area. In the following equations (19) and (20), circled figures show triangle areas in FIGS. 52(a) and 52(b).

$$S=1-(①+②+③+④+⑤+⑥+⑦+⑧) \tag{19}$$

$$S=1-(①+③+⑤+⑥+⑦) \tag{20}$$

The overlapped area can be obtained by subtracting the areas, which are not overlapped, from 1 that is an area of the unit square. To obtain the areas, which are not overlapped, auxiliary lines are drawn in the regions, which are not overlapped, thereby forming some triangles, and the areas of these triangles are added. Using each calculated area S, the area Sp (t, m, n, x, y) is obtained.

FIGS. 53(a) and 53(b) show the retina pixel, and a square surrounding the entire retina pixel, and the minimum and maximum coordinates of the square. The following equations (21) and (22) are expressions for obtaining the area of the retina pixel. Note that the circled figures in equations (21) and (22) show the areas of the triangles or squares in FIGS. 53(a) and 53(b).

$$S=(\text{Max}X-\text{Min}X)\times(\text{Max}Y-\text{Min}Y)-(①+②+③+④+⑤+⑥)) \tag{21}$$

$$S=(\text{Max}X-\text{Min}X)\times(\text{Max}Y-\text{Min}Y)-(①+②+③+④+⑤)) \tag{22}$$

The overlapped area can be obtained by subtracting the areas, which are not overlapped, from the area (MaxX−MinX)×(MaxY−MinY) of the rectangle surrounding the entire retina pixel. Here, MaxX and MaxY show the maximum values of the coordinates x, y of the pixel area, and MinX and MinY show the minimum values of the coordinates x, y of the pixel area.

To obtain the areas, which are not overlapped, auxiliary lines are drawn in the regions, which are not overlapped, thereby forming some triangles and rectangles, and the areas of these triangles and squares may be added. Using each calculated area S, the area Sk (t, m, n) is obtained. Thus, the above description is to explain the concept that how to obtain the area Sp (t, m, n, x, y) and the area Sk (t, m, n). The areas, however, are not directly obtained, and the triangles or the rectangles are combined in order to carry out the calculation easily.

Next, the concept of the contribution rate calculation and a specific explanation thereof with actual numerical numbers will be described. As one example, the following will explain how to obtain the contribution rate 0.324 of the position (x0, y0) in FIG. 45(c) with reference to FIG. 54, equations (23) to (32), and FIGS. 55 and 56.

$$S = \left(\frac{1}{2} - \left(|x| - \frac{1}{2}\right)\right)\left(\frac{1}{2} - \left(|y| - \frac{1}{2}\right)\right) \tag{23}$$

$$= (1-|x|)(1-|y|) \begin{bmatrix} (-1 \le x \le 1) \\ (-1 \le y \le 1) \end{bmatrix}$$

$$x = k(x1 - x0) + x0 \tag{24}$$

$$y = k(y1 - y0) + y0 \quad [0 \le k \le 1]$$

When $-1 \le x0, y0, x1, y1 \le 1$, $Ee(x0,y0,x1,y1,)=\int_0^1 S dk=$ $\int_0^1 \{1-|k(x1-x0)+$ $x0|-|k(y1-y0)+y0|+$ $|(k(x1-x0)+x0)(k(y1-y0)+$ $y0)|\} dk = \frac{1}{6}\{9-3(1+$ $|x0|+|x1|)(1+|y0|+$ $|y1|)+4(|x0|+|x1|)(|y0|+$ $|y1|)+(|x0||y0|+$ $|x1||y1|\} \tag{25}$ where the positions (x0, y0) and (x1, y1) are on the same quadrant.

$$x1 = k1(x3 - x0) + x0, \qquad x2 = k2(x3 - x0) + x0 \tag{26}$$
$$y1 = k1(y3 - y0) + y0, \qquad y2 = k2(y3 - y0) + y0$$
$$E = (k1 - 0) \times Ee(x0, y0, x1, y1) +$$
$$(k2 - k1) \times Ee(x1, y1, x2, y2) +$$
$$(1 - k2) \times Ee(x2, y2, x3, y3)$$

-continued $$S(m, n) = \frac{1}{t2-t1}\int_{t1}^{t2} Sk(t, m, n)\,dt = 1 \qquad (27)$$

$$\begin{aligned}
E(m, n, x, y) &= \frac{1}{t2-t1}\int_{t1}^{t2} Sp(t, m, n, x, y)\,dt \qquad (28)\\
&= \frac{1}{t2-t1}\int_{t11}^{t13} Sp(t, m, n, x, y)\,dt\\
&= \frac{1}{t2-t1}\left\{\begin{array}{l}\int_{t1}^{t11} Sp(t, m, n, x, y)\,dt + \\ \int_{t11}^{t0} SP(t, m, n, x, y)\,dt + \\ \int_{t0}^{t13} SP(t, m, n, x, y)\,dt + \\ \int_{t13}^{t2} SP(t, m, n, x, y)\,dt\end{array}\right\}\\
&= \frac{1}{t2-t1}\left\{\begin{array}{l}0 + \int_{t11}^{t0} Sp(t, m, n, x, y)\,dt + \\ \int_{t0}^{t13} Sp(t, m, n, x, y)\,dt + 0\end{array}\right\}\\
&= (k2-k1)\times Ee(x1, y1, x2, y2) + (k3-k2)\times\\
&\quad Ee(x2, y2, x3, y3)
\end{aligned}$$

$$x0 = \frac{-2}{10}\times 6 = -1.2,\ y0 = \frac{-2}{10}\times 4 = -0.8 \qquad (29)$$

$$x4 = \frac{2}{10}\times 6 = 1.2,\ y4 = \frac{2}{10}\times 4 = 0.8$$

$$x = k(x4-x0) + x0,\ y = k(y4-y0)+y0 \qquad (30)$$
$$x1 = -1 \qquad \therefore k1 = 0.08333,\quad y1 = -0.66666$$
$$x2 = 0 \qquad \therefore k2 = 0.5,\quad y2 = 0$$
$$x3 = 1 \qquad \therefore k3 = 0.916666,\quad y3 = 0.66666$$

$$Ee(x1, y1, x2, y2) = Ee(-1, -0.6666, 0, 0) \qquad (31)$$
$$= \frac{1}{6}(9 - 3\times 2\times 1.6666 + 4\times 0.6666 +$$
$$0.6666) = 0.38888$$
$$Ee(x2, y2, x3, y3) = Ee(0, 0, 1, 0.666) = 0.38888$$

Figure 55:
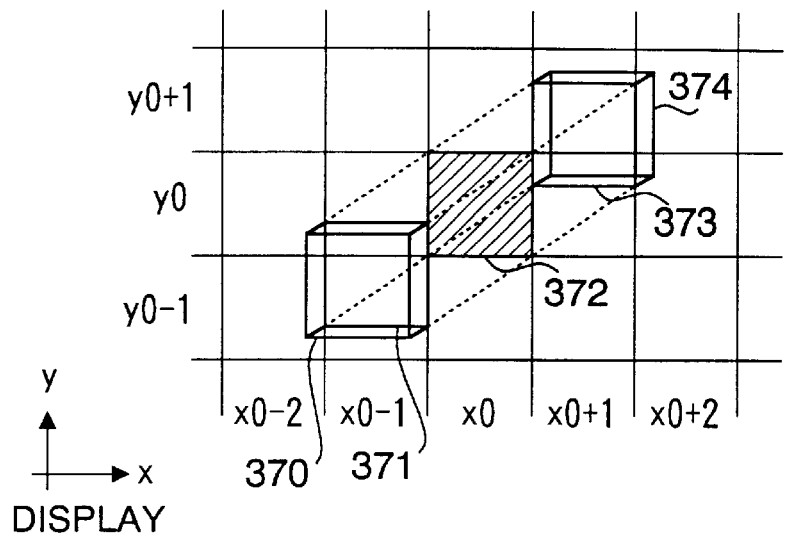
FIG. 55 is a view showing positions of retina pixel at various time.
Figure 56:
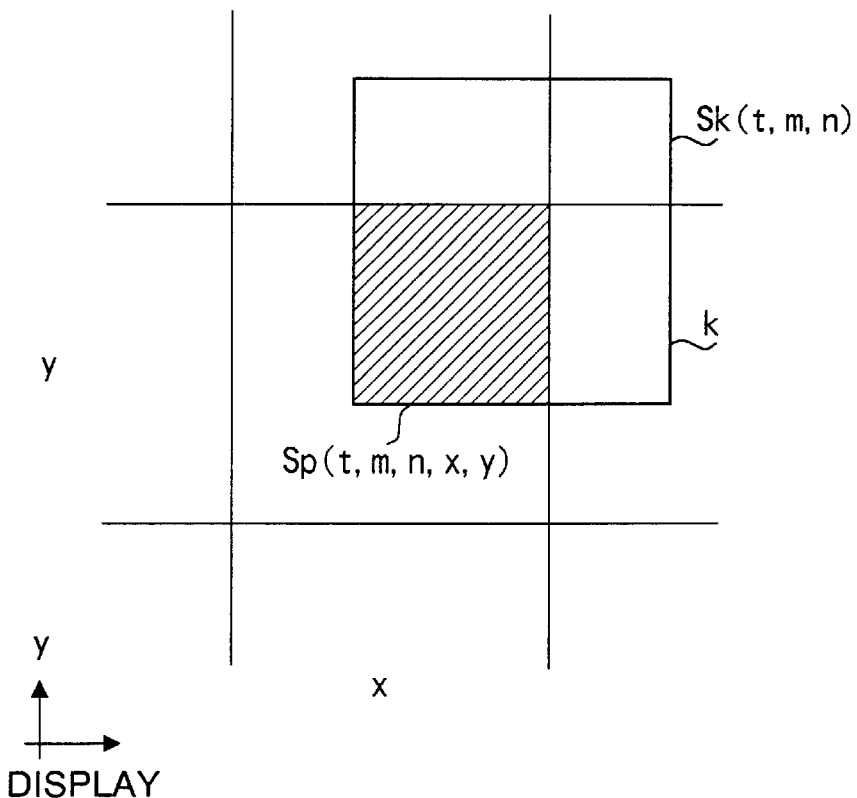
FIG. 56 is a view showing the overlapping of the retina pixel and the position (x, y) on the display at a certain time.

$E=(k2-k1)\times$ $Ee(x1,y1,x2,y2)+$ $(k3-k2)\times Ee(x2,y2,x3,y3)=$ $(0.5-0.083333)\times Ee(-1,-0.6666, 0, 0)+$ $(0.916666-0.5)\times Ee(0, 0, 1, 0.6666)=$ $(0.416666\times 0.38888+0.416666\times 0.38888=0.32399 \qquad (32)$ FIG. 54 shows the concept that how to obtain the contribution rate, and FIG. 55 is the expanded view of FIG. 45(a) showing the positions of retina pixel at various times. FIG. 56 shows the relationship between the retina pixel and the position (x, y) on the display at a certain time, and equations (27) to (32) show the expressions to calculate the contribution rate. First, the concept will be explained using FIG. 54 and equations (23) to (30). FIG. 54(a) is a view showing that two squares (basic and moved squares) whose unit area is 1 are overlapped with each other. Equation (23) shows an expression for obtaining the area where two squares are overlapped with each other. The black points in FIG. 54(a) each shows the center of gravity of the respective square, the basic square is placed at the position of the coordinate (0, 0), and the moved square is placed at the position of the coordinate (x, y). It is understood that the oblique lined area is (1−|x|)(1−|y|) with conditions. FIG. 54(b) shows a view showing that the center of gravity of the moved square is moved from (x0, y0) to (x1, y1). Equation (24) shows the center of gravity (x, y) of the moved square which is moving using an indirect variable K. Equation (25) shows an expression for obtaining the total sum of the areas where the moved square is overlapped during the moving, and shows the result. Total sum is a function of Ee(x0, y0, x1, y1). Ee is obtained by substituting equation (24) for equation (23) and integrating the area expressed by the function of K by k. Finally, FIG. 54(c) showing a certain example to illustrate the method of obtaining E (contribution rate), in which the moved square is moved from the center of gravity (x0, y0) to (x3, y3). Equation (26) shows an expression for obtaining the coordinate position of the boundary between the quadrants and for obtaining the contribution rate. Since the moved square passes through the different quadrant, it is necessary that the calculation of Ee be divided for each quadrant. (x1, y1) is a coordinate of the boundary between the second and third quadrants, and (x2, y2) is a coordinate of the boundary between the first and second quadrants. The contribution rate Ee is the total sum of values obtained by multiplying the total sum Ee of the areas, where the moved square are overlapped on the respective quadrants during the moving, by a rate that the moving square is passed through each quadrant. The calculation of Ee must be divided even in the same quadrant and the portion where the center of gravity of the moved square passes through ±1. FIG. 55 is the expanded view of FIG. 45(a) showing positions of retina pixel at various times. Specifically, it is understood that the retina pixel is placed at the position of a point 372 at time t0, at the position of a point 370 at time t1, and at the position of a point 374 at time t2, respectively. Points 371 and 373 show the positions before and after the retina pixel is overlapped with the pixel at the position (x0, y0) on the display, respectively. In this case, respective times are t11 and t13. FIG. 56 shows that the retina pixel is overlapped with the pixel at the position (x, y) on the display at a certain time. As described above, the oblique lined portion is a portion where the retina pixel K is overlapped with the pixel at the position (x, y) on the display at time t and this portion has the relationship between image data (m, n) and the position (x, y) on the display. Then, the overlapped area is set at SP (t, m, n, x, y), and the area of pixel K is set at Sk (t, m, n), thus having the same relationship as equation (23).

The above description explains the concept of the contribution rate calculation, and the next description explains a specific example thereof using actual numeral values of the contribution rate and the pixel area.

Equation (27) is an expression for obtaining the pixel area. Since the retina pixel is not distorted at any time, the result becomes 1. Equation (28) is an expression for obtaining the contribution rate. It is understood the average overlapped area at a period of time t1 to t2 is obtained. As comparison between equations (23) to (26), the result of the contribution rate is as follows:

$$(k2-k1)Ee(x1,y1,x2,y2)+$$
$$(k3-k2)Ee(x2,y2,x3,y3)$$

In equation (29), the starting point (x0, y0) and ending point (x4, y4) of the center of gravity of the moved square are obtained. In equation (30), the position where the center of gravity in the same quadrant passes through ±1 is obtained. In equation (31), the total sum Ee of the areas where the moved square is overlapped during the moving is obtained. In equation (32), the results of equations (31) and (32) are substituted into equation (28), thereby obtaining the contribution rate. As a result, the contribution rate of 0.324 is obtained. The number of times that the moved square passes through the different quadrant is one at time t1. The number of times that the center of gravity in the same quadrant passes through ±1 is twice, i.e., at time t11 and t13. It is understood from this example that the calculation of Ee must be divided.

Next, the threshold value will be explained in detail. The threshold value can be obtained by multiplying the ratio of the length of the emission period in a certain sub-field to the length of the emission period in the entire sub-field by the maximum value of image data. One example will be explained as follows.

Figure 39:
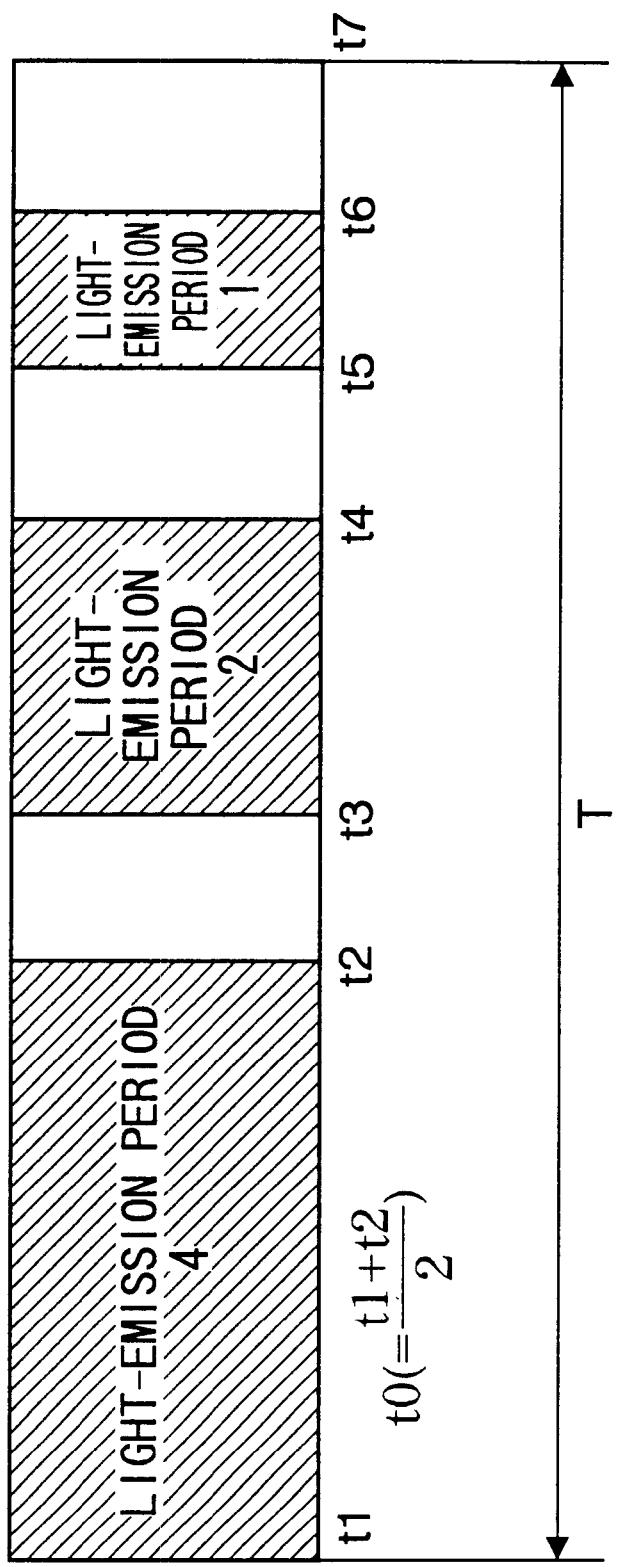
FIG. 39 is a view showing a pixel light-emission sequence in the subfields in the third embodiment of the present invention.
Figure 40:
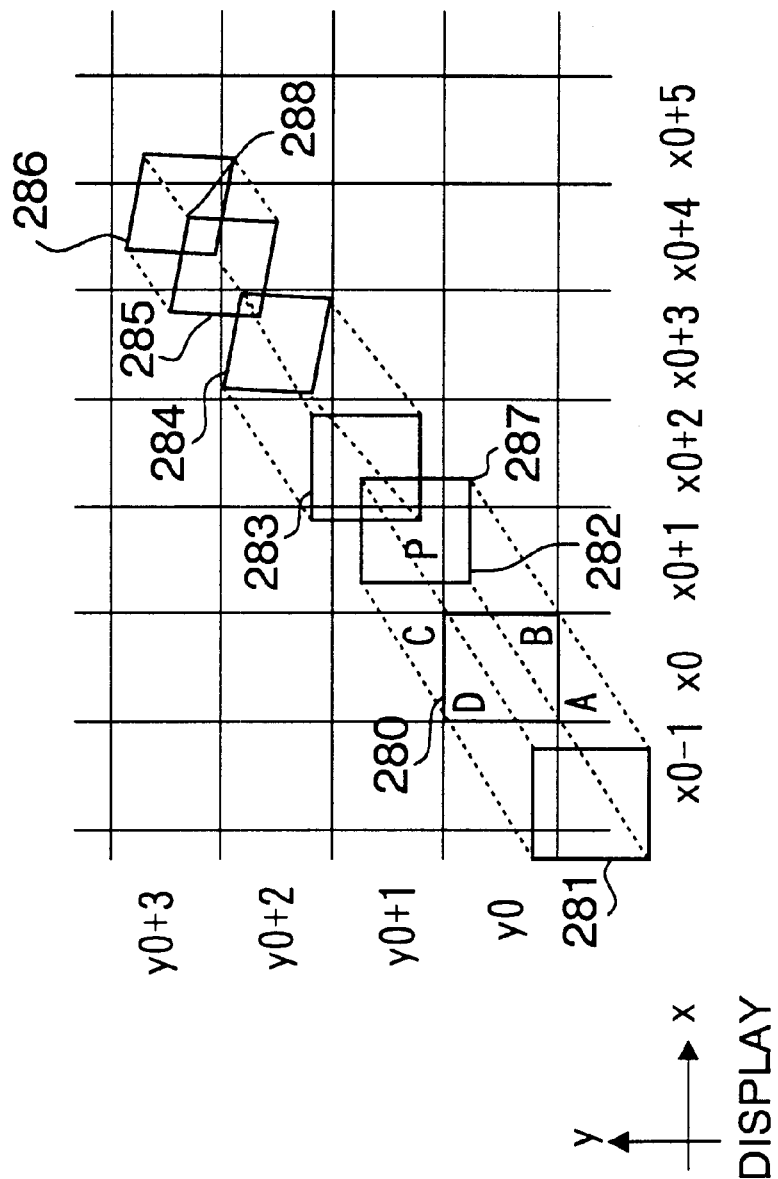
FIG. 40 is a view showing that image data moves at positions on a display.

When image data has eight levels of tone, i.e., 1, 2, 3, 4, 5, 6, 7 and 8, and the emission sequence is as shown in FIG. 39, the following equations are established.

Length of the pixel emission period in the entire sub-field=(=1+2+4)

Length of the pixel emission period in the first sub-field=4

Maximum value of image data=7

Threshold value=(length of the pixel emission period in the first sub-field)/(length of the pixel-emission period in the entire sub-fields)×(maximum value of image data)=$^4/_7$×7=4.

Therefore, the threshold value of the first sub-field bit map calculating section 226 is 4. Similarly, the threshold value of the second sub-field bit map calculating section 227 is 2. Also, the threshold value of the third sub-field bit map calculating section 228 is 1. The above was the simple example. However, the above equation can be used in the case of the display in which image data having 256 levels of tone is display in ten sub-fields.

The threshold values of the first to n-th sub-field bit map calculating sections are set in order of increasing the value. In other words, the threshold value of the first sub-field bit map calculating section is the maximum value, and that of n-th sub-field bit map calculating section is the minimum value. By use of this structure, even if a slight error occurs in the detection of motion vector, no image breakage occurs.

Thus, the embodiment of the present invention adopts the constitution to calculate at real time an emission time in each sub-field period and a contribution rate of the light quantity entering each retina position from the path of the shift of the line of sight on the screen when the line of sight follows the motion pixel on the display screen, using vector values corresponding to the number of motion pixels and the moved direction, and to generate new sub-field data using the calculated data. As a result, the tone level, which the retina pixel senses when following the moving picture with eyes, matches with the tone data of the original image accurately. Then, the light quantity corresponding to the tone adapted to the original image is stored in the retina pixel, and thereby the generation of the false contour is largely restrained, so that the display image having no false contour can be provided.

The above explanation is made using the pixel emission sequence in the three sub-fields shown in FIG.39 to explain the concept briefly. However, even in the emission sequence in three sub-fields or more, e.g., eight sub-fields, calculation conversion of image data can be carried out. In the above explanation, the retina pixel is explained using a square. However, it may be possible to replace the square with a circle whose area is one basic unit.

Moreover, time t0 is explained as (t1+t2)÷2. However, it may be possible that t0=t1, and that t0=arbitrary time.

The above description explains the image using two pixels to simplify the explanation. However, in the case of using a large number of pixels, remarkable advantages can be obtained.

(Fourth Embodiment)

Next, the tone display apparatus of a fourth embodiment of the present invention will be explained. The schematic configuration of the tone display apparatus of the fourth embodiment is substantially the same as that of the first embodiment shown in FIG. 36 except that the configuration of the image data calculation converter 203. An aim of the fourth embodiment is to process an image, which is called scroll image in which a whole image moves in a certain fixed direction at a fixed speed.

Figure 57:
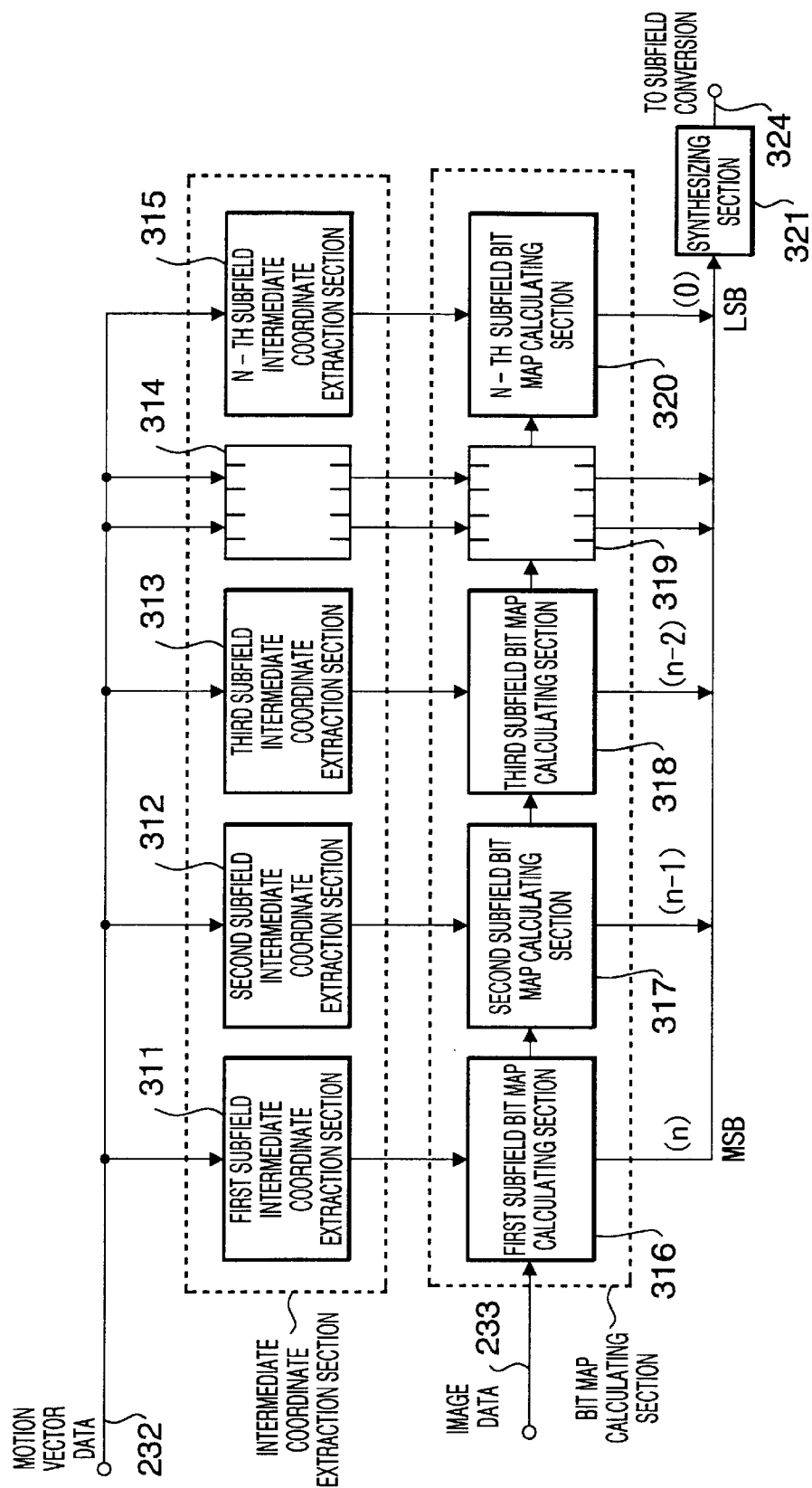
FIG. 57 is a view showing the specific configuration of the image data calculation converting section.

FIG. 57 is a block diagram showing the specific configuration of the image data calculation converter 203 according to the fourth embodiment. As motion vector data 232, a vector value for each field is input. First to n-th sub-field intermediate coordinate extraction calculating sections 311 to 315 each calculates the intermediate position between the starting and ending points of the line of sight for the respective period of the emission in each sub-field, using the input motion vector value, to output. First to n-th sub-field bit map calculating sections 316 to 320 each outputs data indicating whether or not the emission is generated in each sub-field in a pixel unit to a synthesizing section by use of the intermediate coordinate between the starting and ending points of the line of sight, and further outputs new image data for the sub-field bit map calculating section. The sub-field intermediate coordinate calculating section 311 to 315 and the sub-field bit map calculating sections 316 to 320 are paired. For example, if the number of sub-fields is eight, and eight pairs of the intermediate coordinate calculating sections and the sub-field bit map calculating sections are needed.

A synthesizing section 321 adjusts the delay of data output from. the respective bit map calculating sections 316 to 320 and combines sub-field bit patterns for each bit, thereby synthesizing new image data.

Figure 58:
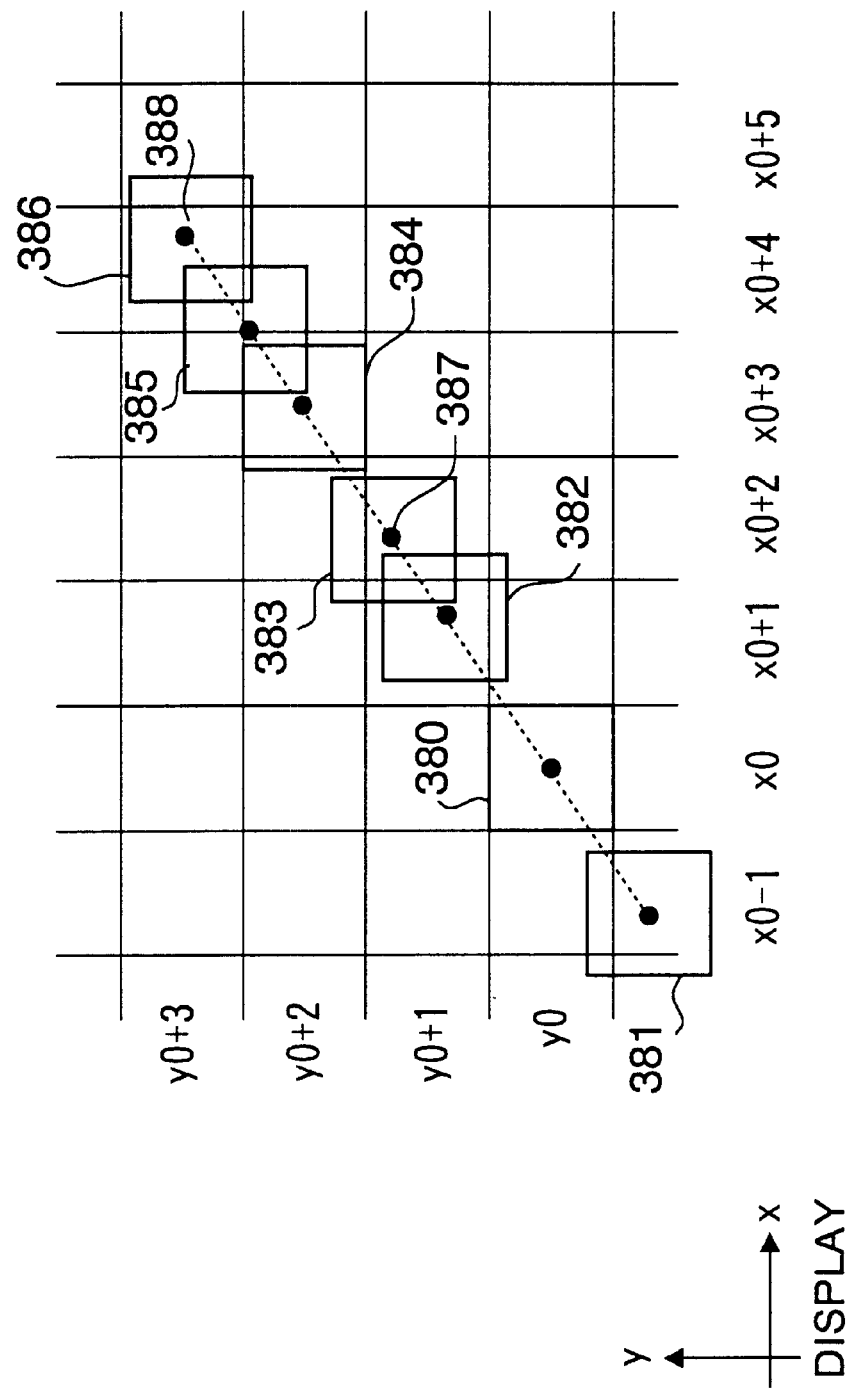
FIG. 58 is a view showing a state in which image data shifts at positions on the display.

Next, the first to n-th sub-field intermediate coordinate extraction calculating sections 311 to 315 will be explained using FIG. 39 and FIG. 58. FIG. 58 shows a state in which image data is moving at positions on the display. One example of the motion vector (6, 4) of a certain pixel is shown. The retina pixel is placed at the position of a point 380 at time t0, at the position of a point 381 at time t1, at the position of a point 382 at time t2, at the position of a point 383 at time t3, at the position of a point 384 at time t4, at the position of a point 385 at time t5, and at the position of a point 386 at time t6, respectively. The broken line shows the center of gravity of the retina pixel during the emission period. The first to n-th sub-field intermediate coordinate extraction calculating sections 311 to 315 each calculates the starting and ending positions of the center of gravity of the retina pixel during the emission period in each sub-field to output. The calculation method as follows:

$X=(t-t0)/t \times Vx\ (m,\ n)+x0$ $Y=(t-t0)/t \times Vy\ (m,\ n)+y0$

[Vx (m, n), and Vy (m, n) are motion vector values]

For example, the position of point 387 is as follows:

$X=(5-2)/10 \times 6+x0=1.8+x0$ $Y=(5-2)/10 \times 4+y0=1.2+y0$

Also, the position of point 388 is as follows:

$X=(9-2)/10\times 6+x0=4.2+x0$ $Y=(9-2)/10\times 4+y0=2.8+y0$

Thus, the number of sub-field intermediate coordinate extraction calculating sections 311 to 315 corresponding to the number of sub-fields is needed. The first sub-field intermediate coordinate extraction calculating sections 311 calculates the starting and ending positions of the center of gravity of the retina pixel during the emission period in the first sub-field, and outputs the result to the first sub-field bit map calculating section 316. The second sub-field intermediate coordinate extraction calculating sections 312 calculates the starting and ending positions of the center of gravity of the retina pixel during the emission period in the second sub-field, and outputs the result to the second sub-field bit map calculating section 317. Then, n-th sub-field intermediate coordinate extraction calculating sections 315 calculates the starting and ending positions of the center of gravity of the retina pixel during the emission period in the n-th sub-field, and outputs the result to the n-th sub-field bit map calculating section 320.

Figure 59:
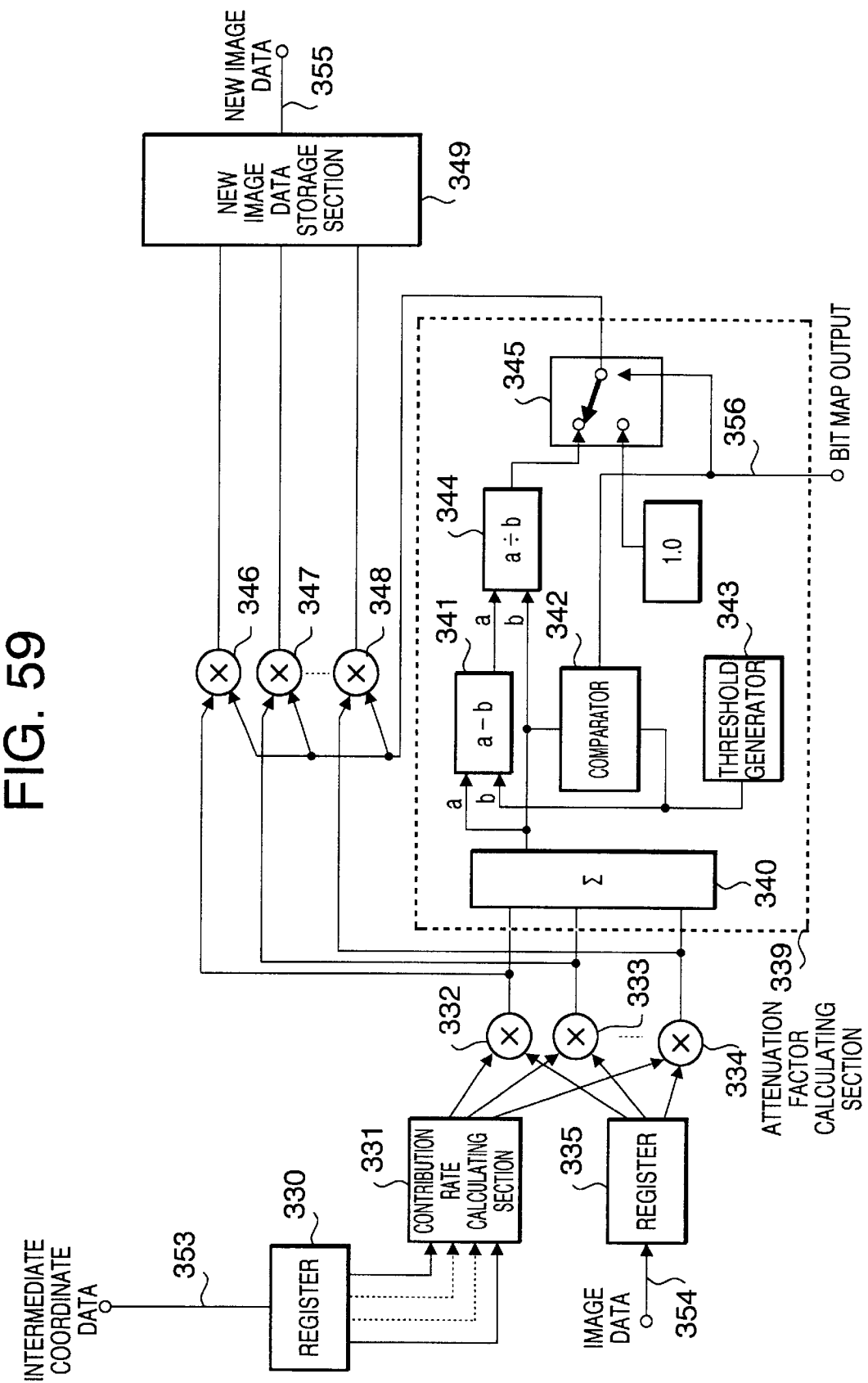
FIG. 59 is a view showing the structure in which intermediate coordinate extraction sections input motion vector data and image data and output new image data and a binary bit map therefrom.

Next, the first to n-th sub-field bit map calculating sections 316 to 320 will be explained with reference to FIG. 59. FIG. 59 is a view showing a configuration to output new image data 355 and a binary bit map 356 using intermediate coordinate 353 input from intermediate coordinate extraction calculating sections 311 to 315 and image data 354. The concept of the processing was already explained in the first embodiment. In the fourth embodiment, the function, which is limited to the scroll image, is provided. More specifically, according to the fourth embodiment, there is no need of the sections relevant to the calculation of the pixel area based on the premise that the pixel area is fixed. FIG. 59 is the view in which the sections relevant to the calculation of the pixel area are excluded from FIG. 41. A register 300, a contribution rate calculating section 331, a register 335, an attenuation factor calculating section 339, a new image data storage section 349, and a synthesizing section 321 are explained in the same way as in the first embodiment.

Thus, according to the fourth embodiment, since the sections relevant to the calculation of the pixel area are deleted based on the premise that the pixel area is fixed, the apparatus can be simplified for the deletion.

The attenuation factor calculating section and the pixel area calculating section can be used in a state that the contribution rate and the pixel area calculated in advance are written in a ROM table in order to reduce the circuit scale.

Industrial Applicability

The moving picture display method of the present invention is useful for restraining the false contour generated when displaying the moving picture by the sub-field method, and is suitable for generating drive data of the sub-field in PDP.

What is claimed is:

1. A method for displaying a moving picture having a proper tone by changing a combination of subfields comprising a field of the moving picture, said subfields each having a different luminance weight, said method comprising:

detecting a motion vector indicating a movement direction of the image and a movement quantity of the image from the input image data;

generating new image data for making a received tone equal to a tone of the input image data based on an amount of light received from display pixels located along a path on which a retina pixel corresponding to a retina acceptable region reflected in a retina has moved according to the motion vector; and determining the combination of subfields based on the new image data.

2. The moving picture display method according to claim 1, wherein a pixel density of an object retina pixel is distributed to a display image region that affects a tone of the object retina pixel moved in a subfield period, and determining whether to generate an emission at the subfield according to a sum of pixel densities of pixels to which pixel densities are distributed from peripheral retina pixels.

3. The moving picture display method according to claim 2, wherein a degree of contribution is determined for each of pixels included in said display image region said degree of contribution indicating an influence from each of the pixels included in said display image region to a retina pixel that is moved when an emission is generated at the subfield and the pixel density of the object retina pixel is distributed to pixels included in said display image region corresponding to said degree of contribution.

4. The moving picture display method according to claim 1, wherein the distribution of pixel density of the object retina pixel is performed for each subfield sequentially.

5. The moving picture display method according to claim 1, wherein the generation of an emission in an upper subfield is reflected in new image data for determining whether or not the emission is generated in a lower subfield.

6. The moving picture display method according to claim 5, further comprising:

performing a feedback of the same pixel density as the distributed pixel density from the pixel in an upper subfield of which the lighting is not performed; and performing a feedback of a pixel density obtained by multiplying the distributed pixel density by a predetermined attenuation factor from the pixel in an upper field of which the emission is generated, thereby generating new image data for the object retina pixel in the lower subfield.

7. The moving picture display method according to claim 5, wherein the determination whether or not the emission is generated in the subfield is performed by comparing a sum of pixel densities distributed from the peripheral retina pixels with a predetermined threshold value corresponding to a weight of the subfield.

8. The moving picture display method according to claim 1, wherein a display pixel position where a pixel density of the object retina pixel is distributed and a distribution ratio are determined based on the movement direction and the movement quantity of the detected motion vector.

9. The moving picture display method according to claim 8, wherein the display pixel position where pixel density of the object retina pixel is distributed and the distribution ratio are determined so as to be respectively matched with a display pixel position and a distribution ratio having influence on a visual point region on the retina, when a line of sight follows an image region movement along the motion vector.

10. The moving picture display method according to claim 8, wherein when a region having a predetermined area is moved from starting to ending points of the detected motion vector, a pixel at the display pixel position where pixel density of the object retina pixel is distributed is a pixel in an area overlapped with at least a part of the region.

11. The moving picture display method according to claim 8, wherein when a region having a predetermined area is moved from starting to ending points of the detected motion vector, the distribution ratio for distributing the pixel density of the object retina pixel is a value obtained by integrating an area where the region and pixels are overlapped with each other by an emission time of each field.

12. The moving picture display method according to claim 1, wherein a four-corner motion vector indicating movement directions and movement quantities of four corners is detected for each pixel, and the display image region influenced by the object retina pixel movement for the sub-field period using the detected four-corner motion vector is specified.

13. The moving picture display method according to claim 12, wherein the display pixel position where pixel density of the object retina pixel is distributed and the distribution ratio are determined based on the movement directions and the movement quantities of the detected four-corner motion vector.

14. The moving picture display method according to claim 13, wherein when a region having four corners each corresponding to a respective staring point and a respective ending point of the detected four-corner motion vector is moved, the display pixel position where pixel density of the object retina pixel is distributed is a pixel which is overlapped with at least a part of said region.

15. The moving picture display method according to claim 13, wherein when a region having four corners each corresponding to a respective staring point and a respective ending point of the detected four-corner motion vector is moved, the distribution ratio for distributing the pixel density of the object retina pixel is a value obtained by integrating an area where the region and pixels are overlapped with each other by an emission time of each field.

16. The moving picture display method according to claim 1, wherein a motion of the pixel close to a signal level at which a false contour is generated is detected as a motion vector.

17. The moving picture display method according to claim 16, wherein a present field image and a previous field image are each converted into respective binary images with a threshold value close to the signal level at which the false contour is generated, the binary images are compared so as to detect the motion vector from the number of the motion pixels and the movement direction, and the motion vector having the signal level at which the false contour is generated in the present field image is corrected in accordance with the motion vector, thereby generating new image data.

18. The moving picture display method according to claim 16, wherein the binary image of the present field is divided into a plurality of blocks, a plurality of reference regions associated with the divided blocks respectively are set in the binary image of the previous field, each degree of matching between the divided block and each of the plurality of the reference blocks set in the reference region associated with the divided block is evaluated, and the number of the motion pixels and the movement direction are detected from the positional relationship between the divided block and the reference block having the highest evaluation value.

19. The moving picture display method according to claim 16, wherein the number of motion pixels and the movement direction are detected for each detection block for each of color components of R, G and B, and the number of motion pixels of the detection block and the movement direction thereof are determined by a majority determination.

20. The moving picture display method according to claim 16, a present field image and a previous field image are converted into respective binary images with a threshold value of a multi-level including mainly signal levels N power of 2 or a combination of these signal levels, and the motion vector is detected for each multi-hierarchical image data.

21. The moving picture display method according to claim 16, wherein a present field image and a previous field image are each subjected to smoothing processing before being converted into to the binary image.

22. The moving picture display method according to claim 16, wherein correction data for the motion vector is stored in a correction table corresponding to a signal level at which the false contour is generated, and new image data is extracted from the correction table based on the number of the detected motion pixels and the movement direction thereof.

23. The moving picture display method according to claim 1, wherein when the motion vector is detected respectively from a present field image and a previous field image in a block unit, and the motion vector is detected based on a correlation value of identification codes respectively provided to the present field image and the previous field image corresponding to the pixel level.

24. The moving picture display method according to claim 23, wherein the identification code is provided to each of the present field image and the previous field image corresponding to the pixel level, an identification code image of the present field is divided into a plurality of detection blocks, a reference region is set in an identification code image of the previous field for each detection block, a matching degree between each of the plurality of reference blocks set in the reference region and the detection block is evaluated based on the identification codes, and the motion vector is detected from the positional relationship between the reference block having the highest evaluation value with the detection block and the detection block.

25. The moving picture display method according to claim 23, wherein the identification codes are provided corresponding to the pixel level, said identification codes belonging to two or more groups having different regions to which each of said identification codes is assigned, and the motion vectors obtained for each group are integrated so as to obtain the motion vector of the pixel.

26. The moving picture display method according to claim 23, wherein with respect to a block having the same identification codes, the motion vector detection is not performed.

27. The moving picture display method according to claim 23, wherein the present field image and the previous field image each have equivalent luminance image signals which are converted to equalize a component ratio of each of R, G and B image signals.

28. The moving picture display method according to claim 23, wherein a density gradient of the image is detected, and a flat portion of the density gradient is subjected to data distribution processing of the present field imager independent of the motion detection.

29. A moving picture display apparatus for displaying a moving picture having a proper tone by changing a combination of subfields comprising a field of the moving picture, said subfields each having a different luminance weight, said apparatus comprising:

a motion vector detector that detects a motion vector of image data in neighboring fields;

a reproducer that generates new image data to make a perceived tone equal to a tone of the input image data based on an amount of light received from display pixels located along a path on which a retina pixel corresponding to a retina acceptable region reflected in a retina has moved, according to the detected motion vector; and a determiner that determines drive data of a subfield based on the new generated image data.

30. The moving picture display apparatus according to claim 29, the reproducer comprising:

intermediate coordinate extractors each for calculating each coordinate value of emission starting and ending positions in a respective subfield for each subfield based on the detected motion vector;

a bit map that outputs binary data for controlling whether or not the emission is generated in the subfield based on the coordinate values output from the respective intermediate coordinate extractor, and for outputting image data given to a lower subfield, wherein said determiner comprises a synthesizer that synthesizes the drive data of a subfield using binary data from the bit map outputs over the entire output subfields.

31. The moving picture display apparatus according to claim 30, wherein the number of the intermediate coordinate extractors and the bit map outputs are the same as the number of subfields comprising one field image.

32. The moving picture display apparatus according to claim 30, the bit map outputs each comprising:

a contribution rate calculator that calculates a rate for distributing image data to a predetermined subfield plane based on the respective coordinate value output from the respective intermediate coordinate extractor;

a plurality of multipliers each for multiplying image data by the contribution rate;

an attenuation factor calculator that calculates an attenuation factor used in the processing for outputting binary data for controlling whether or not the emission is generated in the subfield based on a distributed data value obtained by multiplying image data by the contribution rate, and fetching the distributed data, so as to generate image data to be given to the lower subfield;

a plurality of multipliers each for multiplying the distributed image data by the attenuation factor; and a new image data storage that receives image data multiplied by the attenuation factor so as to generate image data for the lower subfield.

33. The moving picture display apparatus according to claim 30, the bit map outputs each comprising:

a contribution rate output that stores the value of the contribution rate in a ROM table in advance and that outputs a rate for distributing image data to a predetermined subfield plane from the ROM table based on the respective coordinate value output from the respective intermediate coordinate extractor;

a plurality of multipliers each for multiplying image data by the contribution rate;

an attenuation factor calculator that calculates an attenuation factor used in the processing for outputting binary data for controlling whether or not the emission is generated in the subfield based on a distributed data value obtained by multiplying image data by the contribution rate, and fetching the distributed data, so as to generate image data to be given to the lower subfield;

a plurality of multipliers each for multiplying the distributed image data by the attenuation factor; and a new image data storage that receives image data multiplied by the attenuation factor so as to generate image data for the lower subfield.

34. The moving picture display apparatus according to claim 29, the generator comprising:

four-corner motion vector calculator that calculates a four-corner motion vector indicating the movement directions of the four corners and the shift quantity thereof for each pixel based on the detected motion vector;

intermediate coordinate extractors that calculate each coordinate value of an emission starting position and an emission ending position for each subfield based on the detected four-corner motion vector; and bit map outputs each for outputting binary data for controlling whether or not the emission is generated in the subfield based on the respective coordinate value, and for outputting image data given to lower subfield.

35. The moving picture display apparatus according to claim 34, the bit map outputs each comprising:

a pixel area calculator that integrates an area of a region, in which the intermediate coordinate values of the four-corner vector output from the intermediate coordinate extractors are set as four corners over a fixed period of time;

a contribution rate calculator that calculates a rate for distributing image data to a predetermined subfield plane based on the intermediate coordinate values of the four-corner vector;

a plurality of multipliers each for multiplying image data by the contribution rate;

an attenuation factor calculator that calculates an attenuation factor used in the processing for outputting binary data for controlling whether or not the emission is generated in the subfield based on a distributed data value obtained by multiplying image data by the contribution rate, and fetching the distributed data, so as to generate image data to be given to the lower subfield;

a plurality of multipliers each for multiplying the distributed image data by the attenuation factor;

a plurality of dividers each for dividing image data multiplied by the attenuation factor by a component value calculated by the pixel area calculator; and a new image data storage that receives the divided image data so as to generate image data for the lower subfield.

36. The moving picture display apparatus according to claim 34, the bit map output sections each comprising:

a pixel area calculator that integrates an area of a region, in which the intermediate coordinate values of the four-corner vector output from the intermediate coordinate extractors are set as four corners over a fixed period of time;

a contribution rate calculator that stores the value of the contribution rate in a ROM table in advance and that outputs a rate for distributing image data to a predetermined subfield plane from the ROM table based on the coordinate values of the four-corner vector;

a plurality of multipliers each for multiplying image data by the contribution rate;

an attenuation factor calculator that calculates an attenuation factor used in the processing for outputting binary data for controlling whether or not the emission is generated in the subfield based on a distributed data value obtained by multiplying image data by the contribution rate, and fetching the distributed data, so as to generate image data to be given to the lower subfield;

a plurality of multipliers each for multiplying the distributed image data by the attenuation factor;

a plurality of dividers each for dividing image data multiplied by the attenuation factor by a component value calculated by the pixel area calculator; and a new image data storage that receives the divided image data so as to generate image data for the lower subfields.

37. The moving picture display apparatus according to claim 34, the bit map outputs each comprising:

a pixel area calculator that stores a value of a pixel area in a ROM table and that outputs an area of a region, in which the intermediate coordinate values of the four-corner vector output from the intermediate coordinate extractors are set as four corners, from the ROM table;

a contribution rate calculator that calculates a ratio for distributing image data to a predetermined subfield plane based on the intermediate coordinate values of the four-corner vector;

a plurality of multipliers each for multiplying image data by the contribution rate;

an attenuation factor calculator that calculates an attenuation factor used in the processing for outputting binary data for controlling whether or not the emission is generated in the subfield based on a distributed data value obtained by multiplying image data by the contribution rate, and fetching the distributed data, so as to generate image data to be given to the lower subfield;

a plurality of multipliers each for multiplying the distributed image data by the attenuation factor;

a plurality of dividers each for dividing image data multiplied by the attenuation factor by a component value calculated by the pixel area calculator; and a new image data storage that receives the divided image data so as to generate image data for the lower subfield.

38. The moving picture display apparatus according to claim 29, the motion vector detector comprising:

a binary processor that converts a present field image and a previous field image into respective binary images with a threshold value close to a signal level at which a false contour is generated; and a motion detector that detects the motion of the pixel by comparing the binary images between the fields, and the reproducer comprising:

a correction table having correction data corresponding to the number of motion pixels and the movement direction stored for each signal level at which the false contour is generated;

an extractor that extracts the pixel having the signal level at which the false contour is generated from the present field image; and a corrector that extracts the detected result of the motion of the extracted pixel and correction data corresponding to the signal level from the correction table so as to correct the extracted pixel.

\* \* \* \* \*